(12) United States Patent
Pan et al.

(10) Patent No.: US 12,476,912 B2
(45) Date of Patent: Nov. 18, 2025

(54) DATA TRANSMISSION METHOD AND ELECTRONIC DEVICE

(71) Applicant: Huawei Technologies Co., Ltd., Shenzhen (CN)

(72) Inventors: Yinhai Pan, Shanghai (CN); Maobin Fan, Shenzhen (CN); Ming Chang, Shanghai (CN); Xiaowen Cao, Shanghai (CN); Hongli Wang, Shanghai (CN); Siqing Du, Nanjing (CN); Peiyu Yue, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 18/315,746

(22) Filed: May 11, 2023

(65) Prior Publication Data

US 2023/0291688 A1      Sep. 14, 2023

Related U.S. Application Data

(63) Continuation of application No. PCT/CN2021/128820, filed on Nov. 4, 2021.

(30) Foreign Application Priority Data

Nov. 12, 2020   (CN) .......................... 202011263644.1
Dec. 17, 2020   (CN) .......................... 202011496824.4

(51) Int. Cl.
*H04L 45/74*      (2022.01)
*H04L 1/1607*     (2023.01)
*H04L 49/90*      (2022.01)

(52) U.S. Cl.
CPC ............ *H04L 45/74* (2013.01); *H04L 1/1607* (2013.01); *H04L 49/90* (2013.01)

(58) Field of Classification Search
CPC ......... H04L 45/74; H04L 49/90; H04L 49/65; H04L 49/9023; H04L 49/25; H04L 49/35;
(Continued)

(56) References Cited

U.S. PATENT DOCUMENTS

| 2015/0092545 A1 | 4/2015 | Katar et al. |
| 2015/0244632 A1 | 8/2015 | Katar et al. |

(Continued)

FOREIGN PATENT DOCUMENTS

| CN | 1742473 A | 3/2006 |
| CN | 103442091 A | 12/2013 |

(Continued)

OTHER PUBLICATIONS

Zhang Linlin, "Digital Communication Technology and SystemView Software Simulation," Beijing Institute of Technology Press, Jan. 31, 2018, with English translation, total 3 pages.

(Continued)

*Primary Examiner* — Phong La
(74) *Attorney, Agent, or Firm* — Slater Matsil, LLP

(57) ABSTRACT

A method includes: A first transmission unit packs, at a protocol layer of the first transmission unit, to-be-transmitted data of an application layer of the first transmission unit, to generate a data packet. The data packet includes data type information, the data type information indicates an application scenario of the data packet, and the application scenario includes any one of a camera scenario, a display scenario, and a storage scenario. The first transmission unit sends the data packet to a physical layer of the first transmission unit through the protocol layer of the first transmission unit. The first transmission unit sends the data packet to a second transmission unit through the physical layer of the first transmission unit.

18 Claims, 47 Drawing Sheets

(58) Field of Classification Search
CPC ......... H04L 49/60; H04L 49/50; H04L 49/00; H04L 1/1607; H04L 1/16; H04L 1/1671; H04L 1/0015; H04L 1/0061; H04L 1/0079; H04L 1/0084; H04L 1/18; H04L 1/188

See application file for complete search history.

(56) References Cited

U.S. PATENT DOCUMENTS

| | | | |
|---|---|---|---|
| 2016/0378582 A1 | 12/2016 | Choi et al. | |
| 2019/0149449 A1* | 5/2019 | Morris | H04L 45/02 709/245 |
| 2021/0288747 A1* | 9/2021 | Yu | H04L 1/0003 |
| 2023/0291688 A1* | 9/2023 | Pan | H04L 1/1607 |

FOREIGN PATENT DOCUMENTS

| | | | | |
|---|---|---|---|---|
| CN | 103746938 | A | 4/2014 | |
| CN | 104079949 | A | 10/2014 | |
| CN | 106713415 | A | 5/2017 | |
| CN | 106851183 | A | 6/2017 | |
| CN | 107871524 | A | 4/2018 | |
| CN | 109428946 | A | 3/2019 | |
| CN | 110351024 | A * | 10/2019 | ............. H04L 1/189 |
| CN | 110475267 | A * | 11/2019 | ............ H04W 40/24 |
| CN | 111308708 | A | 6/2020 | |
| CN | 111385905 | A * | 7/2020 | .......... H04W 74/006 |
| CN | 111405040 | A * | 7/2020 | ............ H04L 67/565 |
| CN | 111491072 | A | 8/2020 | |
| CN | 111884987 | A | 11/2020 | |
| EP | 3282787 | A1 * | 2/2018 | ........ H04W 72/1268 |
| EP | 3926911 | A1 | 12/2021 | |
| WO | 2020166378 | A1 | 8/2020 | |

OTHER PUBLICATIONS

Gan Chunjiang et al., "Design of Android Display Driver Based on MIPI Interface", Apr. 2020, 3 pages.

Ou Dachen, "MIPI CSI-2 Summary: Based on DPHY2.1," https://www.ifreehub.com/archives/45/, Aug. 2020, 22 pages.

* cited by examiner (a)

(b)

DATA TRANSMISSION METHOD AND ELECTRONIC DEVICE

CROSS-REFERENCE TO RELATED APPLICATIONS

This application is a continuation of International Application No. PCT/CN2021/128820, filed on Nov. 4, 2021, which claims priority to claims priority to Chinese Patent Application No. 202011263644.1, filed on Nov. 12, 2020 and Chinese Patent Application No. 202011496824.4, filed on Dec. 17, 2020. All of the aforementioned applications are hereby incorporated by reference in their entireties.

TECHNICAL FIELD

Embodiments of this application relate to the field of terminal technologies, and in particular, to a data transmission method and an electronic device.

BACKGROUND

Currently, a plurality of modules such as a processor, a display, a camera, and a memory are integrated in an electronic device (for example, a mobile phone or a tablet computer), to meet application of the electronic device in a plurality of scenarios such as mobile communication, entertainment, and travel.

However, because there are a plurality of interaction interfaces between the processor and modules such as the display, the camera, and the memory, and interface standards between different modules are different, a designer needs to process a plurality of conflicting dedicated physical layer interfaces in a process of designing a functional system. This is difficult.

In view of this, the MIPI Alliance proposes an interface standard for consumer electronic products, to avoid a conflict of interface standards. However, the MIPI Alliance formulates different standards and protocol specifications for different camera interfaces, display interfaces, storage interfaces, and the like. Therefore, a protocol standard is complex, and a circuit area required for a function implementation is large. However, currently, a user pursues a lighter and thinner mobile electronic device. Limited by an internal space area of the electronic device, a function implementation of the electronic device is challenged.

SUMMARY

According to a data transmission method and an electronic device provided in embodiments of this application, a protocol standard can be unified, an inter-module data transmission process can be simplified, and a circuit area can be reduced.

To achieve the foregoing objectives, the following technical solutions are used in embodiments of this application.

According to a first aspect, an embodiment of this application provides a data transmission method. The method may include: A first transmission unit packs, at a protocol layer of the first transmission unit, to-be-transmitted data of an application layer of the first transmission unit, to generate a data packet. The data packet includes data type information, the data type information indicates an application scenario of the data packet, and the application scenario includes any one of a camera scenario, a display scenario, and a storage scenario. The first transmission unit sends the data packet to a physical layer of the first transmission unit through the protocol layer of the first transmission unit. The first transmission unit sends the data packet to a second transmission unit through the physical layer of the first transmission unit.

For example, in the camera scenario, the first transmission unit is, for example, a camera module, and the second transmission unit is, for example, an SOC. In the display scenario, the first transmission unit is, for example, an SOC, and the second transmission unit is, for example, a DDIC. In the storage scenario, the first transmission unit is, for example, a storage module, and the second transmission unit is, for example, an SOC. Alternatively, the first transmission unit is, for example, an SOC, and the second transmission unit is, for example, a storage module.

In this way, the first transmission unit and the second transmission unit can perform data transmission based on a same data transmission protocol by using a same data packet structure. In addition, the data type information included in the data packet indicates a current application scenario of the data packet, thereby improving data transmission efficiency. Further, the camera module, a display module, and the storage module may communicate with the SOC based on a same data transmission protocol, to implement link multiplexing, thereby reducing a circuit area.

In a possible implementation, a data packet type of the data packet includes a long packet and a short packet; the long packet includes a data packet header sub-packet, a payload data sub-packet, and a data packet footer sub-packet; and the short packet includes the data packet header sub-packet and the data packet footer sub-packet.

In some embodiments, data packets are classified into a long data packet and a short data packet based on different carried data. The long data packet may also be described as a long packet, and the short data packet may also be described as a short packet. In this embodiment of this application, the long data packet and the short data packet are not distinguished by a length of a bit occupied by the data packet.

In a possible implementation, the data type information is carried in a data type field in the data packet header sub-packet, and a first value of the data type field indicates that the application scenario is the display scenario and that the data packet is a short data packet or a long data packet.

In a possible implementation, the data type information is carried in a data type field in the data packet header sub-packet, and a second value of the data type field indicates that the application scenario is the camera scenario and that the data packet is a short control packet or a long data packet.

In a possible implementation, the data type information is carried in a data type field in the data packet header sub-packet, and a third value of the data type field indicates that the application scenario is the storage scenario and that the data packet is one of a short acknowledgment ACK packet, a short negative acknowledgment NACK packet, a long data packet, and a long control packet.

In some embodiments, a part that is of the data packet and that has specific information or a specific number is referred to as a sub-packet of the data packet. The data packet structure provided in this embodiment of this application can be applied to the camera scenario, the display scenario, and the storage scenario. A value of a field indicates a scenario to which a data packet that is being transmitted is applicable.

Therefore, based on a same protocol architecture, a general data packet structure applicable to the camera scenario, the display scenario, and the storage scenario is configured, and the data type field in the data packet is used to identify the application scenario of the data packet. Compared with the conventional technology in which different scenarios correspond to different protocol architectures, and data of different data packet structures is transmitted, this embodiment of this application provides the protocol architecture and the general data packet structure, so that circuit complexity and the circuit area can be effectively reduced, thereby reducing circuit power consumption and improving transmission efficiency.

In a possible implementation, that a first transmission unit packs, at a protocol layer of the first transmission unit, to-be-transmitted data of an application layer of the first transmission unit, to generate a data packet includes: The first transmission unit receives, at the protocol layer of the first transmission unit, the to-be-transmitted data sent by the application layer of the first transmission unit. The first transmission unit segments the to-be-transmitted data at the protocol layer of the first transmission unit, to generate payload data, and generate a data packet header, a cyclic redundancy check CRC code, and a data packet footer; and generates the data packet after packing the payload data, the data packet header, and the data packet footer, where the data packet footer includes a CRC field indicating the CRC code.

In some embodiments, the application layer of the first transmission unit transmits the data to the protocol layer. The protocol layer needs to frame the segmented data, add a required packet header and a required packet footer to the data packet, and then send the data packet to a physical layer of the second transmission unit through the physical layer. The physical layer of the second transmission unit sends the received data packet to a protocol layer, and the protocol layer unpacks the data packet to generate segmented data and reassembled data to be transmitted to an application layer, to complete data transmission from the first transmission unit to the second transmission unit.

In this way, in the foregoing steps, the first transmission unit and the second transmission unit complete packet packing and unpacking of a general data packet based on the same protocol architecture, thereby implementing high-speed data transmission.

According to a second aspect, an embodiment of this application provides a data transmission method. The method may include: A first transmission unit stores a to-be-sent first data packet in a buffer of the first transmission unit. The first transmission unit sends the first data packet to a second transmission unit, and starts a timer. If the timer does not expire and a size of remaining free space in the buffer of the first transmission unit is greater than or equal to a size of a to-be-sent second data packet, the first transmission unit sends the second data packet to the second transmission unit, and restarts the timer.

In some embodiments, if the size of the remaining free space in the buffer of the first transmission unit can be used to buffer a next to-be-sent data packet, the data packet continues to be sent. In addition, a timer is configured at a data link layer of the first transmission unit. Each time a data packet is sent, the timer is refreshed to restart timing, until all data packets are sent. For example, if it is determined that the remaining free space in the buffer of the first transmission unit is greater than or equal to a size of space that needs to be occupied by the next to-be-sent data packet, the to-be-sent data packet is stored in the buffer of the first transmission unit, the to-be-sent data packet is transmitted, and the timer is restarted. For another example, in a data transmission process, sizes of data packets that need to be sent are all the same. Therefore, a size of buffer space of the buffer of the first transmission unit may be configured to be an integer multiple of the size of the data packet. In this case, in the data transmission process, the first transmission unit only needs to determine that the buffer of the first transmission unit is not full, to continue to transmit a next data packet (e.g., the size of the remaining free space in the buffer of the first transmission unit is the integer multiple of the size of the data packet).

In this way, the first transmission unit uses a buffer mechanism to send a subsequent data packet without waiting for the second transmission unit to feed back a response signal, thereby improving data transmission efficiency.

In a possible implementation, after the first transmission unit sends the first data packet to the second transmission unit, and starts the timer, the method further includes: The first transmission unit receives a first acknowledgment ACK signal sent by the second transmission unit, removes the first data packet from the buffer of the first transmission unit, and restarts the timer, where the first ACK signal is a feedback signal corresponding to the first data packet.

For example, after receiving a correct data packet, the second transmission unit places a frame number of the data packet as a parameter in an ACK packet, and feeds back the frame number to the first transmission unit. Alternatively, after receiving a group of data packets, a data link layer of the second transmission unit correspondingly returns one ACK packet that includes a frame number of a packet footer of the group of data packets, to indicate that all data packets before the frame number are correctly received.

Correspondingly, the first transmission unit receives the corresponding ACK packet based on a frame number sequence, and removes a corresponding data packet from the buffer of the first transmission unit after receiving an ACK, to obtain more buffer space for transmitting a subsequent data packet.

In a possible implementation, the method further includes: If the size of the remaining free space in the buffer of the first transmission unit is less than the size of the to-be-sent second data packet, the first transmission unit stops sending a data packet. If the timer expires and the first transmission unit still does not receive a second ACK signal, the first transmission unit obtains a fourth data packet with a smallest frame number in one or more third data packets buffered in the buffer of the first transmission unit. The first transmission unit retransmits the fourth data packet to the second transmission unit, and restarts the timer.

In a possible implementation, after the first transmission unit retransmits the fourth data packet to the second transmission unit, the method further includes: The first transmission unit retransmits the one or more third data packets to the second transmission unit in ascending order of frame numbers, and restarts the timer each time a third data packet is sent.

For example, in the data transmission process, if a data packet transmission error occurs and data retransmission needs to be performed, a data retransmission mechanism includes timeout retransmission. Specifically, if the first transmission unit does not receive the ACK, the first transmission unit cannot remove the data packet. As a result, the buffer of the first transmission unit may be fully filled with data. After the buffer of the first transmission unit is fully filled with data, data packet sending is stopped, and the timer is not refreshed when no data packet is sent. Therefore, timing is accumulated until preset time is exceeded. The first transmission unit determines that data transmission is abnormal and retransmission is required, and performs data retransmission starting from a minimum frame number based on a frame number of a data packet that is not removed from the buffer of the first transmission unit.

In a possible implementation, the method further includes: The first transmission unit receives a first negative acknowledgment NACK signal sent by the second transmission unit, and stops sending a data packet. The first transmission unit determines a fifth data packet corresponding to the first NACK signal. The first transmission unit retransmits the fifth data packet to the second transmission unit, and restarts the timer.

In a possible implementation, after the first transmission unit retransmits the fifth data packet to the second transmission unit, the method further includes: The first transmission unit retransmits one or more sixth data packets buffered in the buffer of the first transmission unit to the second transmission unit in ascending order of frame numbers of the one or more sixth data packets, and restarts the timer each time a sixth data packet is sent, where a frame number of the fifth data packet is less than the frame number of the one or more sixth data packets.

For example, the data retransmission mechanism further includes NACK retransmission. Specifically, after receiving a NACK, the first transmission unit determines that transmission of a data packet corresponding to a frame number of the NACK is abnormal, stops sending the data packet, and stops timing of the timer. Then, the data packet corresponding to the frame number of the NACK is retransmitted. If the buffer of the first transmission unit further includes other buffered data packets, these buffered data packets are retransmitted in ascending order of frame numbers of the buffered data packets in the buffer of the first transmission unit. After that, transmission of all packets is completed.

According to a third aspect, an embodiment of this application provides an electronic device, including a processor and a memory. The memory is coupled to the processor, the memory is configured to store computer program code, and the computer program code includes computer instructions. When the processor reads the computer instructions from the memory, the electronic device is enabled to perform the following operations: A first transmission unit packs, at a protocol layer of the first transmission unit, to-be-transmitted data of an application layer of the first transmission unit, to generate a data packet, where the data packet includes data type information, the data type information indicates an application scenario of the data packet, and the application scenario includes any one of a camera scenario, a display scenario, and a storage scenario. The first transmission unit sends the data packet to a physical layer of the first transmission unit through the protocol layer of the first transmission unit. The first transmission unit sends the data packet to a second transmission unit through the physical layer of the first transmission unit.

In a possible implementation, a data packet type of the data packet includes a long packet and a short packet; the long packet includes a data packet header sub-packet, a payload data sub-packet, and a data packet footer sub-packet; and the short packet includes the data packet header sub-packet and the data packet footer sub-packet.

In a possible implementation, the data type information is carried in a data type field in the data packet header sub-packet, and a first value of the data type field indicates that the application scenario is the display scenario and that the data packet is a short data packet or a long data packet.

In a possible implementation, the data type information is carried in a data type field in the data packet header sub-packet, and a second value of the data type field indicates that the application scenario is the camera scenario and that the data packet is a short control packet or a long data packet.

In a possible implementation, the data type information is carried in a data type field in the data packet header sub-packet, and a third value of the data type field indicates that the application scenario is the storage scenario and that the data packet is one of a short acknowledgment ACK packet, a short negative acknowledgment NACK packet, a long data packet, and a long control packet.

In a possible implementation, that a first transmission unit packs, at a protocol layer of the first transmission unit, to-be-transmitted data of an application layer of the first transmission unit, to generate a data packet includes: The first transmission unit receives, at the protocol layer of the first transmission unit, the to-be-transmitted data sent by the application layer of the first transmission unit. The first transmission unit segments the to-be-transmitted data at the protocol layer of the first transmission unit, to generate payload data, and generate a data packet header, a cyclic redundancy check CRC code, and a data packet footer; and generates the data packet after packing the payload data, the data packet header, and the data packet footer, where the data packet footer includes a CRC field indicating the CRC code.

In addition, for technical effect of the electronic device according to the third aspect, refer to technical effect of the data transmission method according to the first aspect. Details are not described herein again.

According to a fourth aspect, an embodiment of this application provides an electronic device, including a processor and a memory. The memory is coupled to the processor, the memory is configured to store computer program code, and the computer program code includes computer instructions. When the processor reads the computer instructions from the memory, the electronic device is enabled to perform the following operations: A first transmission unit stores a to-be-sent first data packet in a buffer of the first transmission unit. The first transmission unit sends the first data packet to a second transmission unit, and starts a timer. If the timer does not expire and a size of remaining free space in the buffer of the first transmission unit is greater than or equal to a size of a to-be-sent second data packet, the first transmission unit sends the second data packet to the second transmission unit, and restarts the timer.

In a possible implementation, when the processor reads the computer instructions from the memory, the electronic device is further enabled to perform the following operations: The first transmission unit receives a first acknowledgment ACK signal sent by the second transmission unit, removes the first data packet from the buffer of the first transmission unit, and restarts the timer, where the first ACK signal is a feedback signal corresponding to the first data packet.

In a possible implementation, when the processor reads the computer instructions from the memory, the electronic device is further enabled to perform the following operations: If the size of the remaining free space in the buffer of the first transmission unit is less than the size of the to-be-sent second data packet, the first transmission unit stops sending a data packet. If the timer expires and the first transmission unit still does not receive a second ACK signal, the first transmission unit obtains a fourth data packet with a smallest frame number in one or more third data packets buffered in the buffer of the first transmission unit. The first transmission unit retransmits the fourth data packet to the second transmission unit, and restarts the timer.

In a possible implementation, when the processor reads the computer instructions from the memory, the electronic device is further enabled to perform the following operations: The first transmission unit retransmits the one or more third data packets to the second transmission unit in ascending order of frame numbers, and restarts the timer each time a third data packet is sent.

In a possible implementation, when the processor reads the computer instructions from the memory, the electronic device is further enabled to perform the following operations: The first transmission unit receives a first negative acknowledgment NACK signal sent by the second transmission unit, and stops sending a data packet. The first transmission unit determines a fifth data packet corresponding to the first NACK signal. The first transmission unit retransmits the fifth data packet to the second transmission unit, and restarts the timer.

In a possible implementation, when the processor reads the computer instructions from the memory, the electronic device is further enabled to perform the following operations: The first transmission unit retransmits one or more sixth data packets buffered in the buffer of the first transmission unit to the second transmission unit in ascending order of frame numbers of the one or more sixth data packets, and restarts the timer each time a sixth data packet is sent, where a frame number of the fifth data packet is less than the frame number of the one or more sixth data packets.

In addition, for technical effect of the electronic device according to the fourth aspect, refer to technical effect of the data transmission method according to the second aspect. Details are not described herein again.

According to a fifth aspect, an embodiment of this application provides an electronic device. The electronic device has a function of implementing the data transmission method according to any one of the first aspect and the possible implementations of the first aspect, or the electronic device has a function of implementing the data transmission method according to any one of the second aspect and the possible implementations of the second aspect. The function may be implemented by hardware, or may be implemented by hardware executing corresponding software. The hardware or the software includes one or more modules corresponding to the function.

According to a sixth aspect, an embodiment of this application provides a chip. The chip includes a processor, the processor is coupled to a memory, and the memory stores program instructions. When the program instructions stored in the memory are executed by the processor, a function of the data transmission method according to any one of the first aspect and the possible implementations of the first aspect is implemented. Alternatively, when the program instructions stored in the memory are executed by the processor, a function of the data transmission method according to any one of the second aspect and the possible implementations of the second aspect is implemented.

According to a seventh aspect, an embodiment of this application provides a computer-readable storage medium, including computer instructions. When the computer instructions are run on an electronic device, the electronic device is enabled to perform the data transmission method according to any one of the first aspect and the possible implementations of the first aspect, or the electronic device is enabled to perform the data transmission method according to any one of the second aspect and the possible implementations of the second aspect.

According to an eighth aspect, an embodiment of this application provides a computer program product. When the computer program product runs on an electronic device, the electronic device is enabled to perform the data transmission method according to any one of the first aspect and the possible implementations of the first aspect, or the electronic device is enabled to perform the data transmission method according to any one of the second aspect and the possible implementations of the second aspect.

According to a ninth aspect, a circuit system is provided. The circuit system includes a processing circuit, and the processing circuit is configured to perform the data transmission method according to any one of the first aspect and the possible implementations of the first aspect or is configured to perform the data transmission method according to any one of the second aspect and the possible implementations of the second aspect.

According to a tenth aspect, an embodiment of this application provides a chip system, including at least one processor and at least one interface circuit. The at least one interface circuit is configured to perform a transceiver function and send instructions to the at least one processor. When the at least one processor executes the instructions, at least one processor performs the data transmission method according to any one of the first aspect and the possible implementations of the first aspect, or the at least one processor performs the data transmission method according to any one of the second aspect and the possible implementations of the second aspect.

DETAILED DESCRIPTION OF ILLUSTRATIVE EMBODIMENTS

The following describes in detail a data transmission method and an electronic device provided in embodiments of this application with reference to the accompanying drawings.

The terms "include", "have", and any variation thereof mentioned in the descriptions of embodiments of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

It should be noted that in embodiments of this application, words such as "example" or "for example" are used to represent giving an example, an illustration, or a description. Any embodiment or design solution described as an "example" or "for example" in embodiments of this application should not be explained as being more preferred or having more advantages than another embodiment or design solution. Exactly, use of the words such as "example" or "for example" is intended to present a related concept in a specific manner.

In the descriptions of embodiments of this application, unless otherwise stated, "a plurality of" means two or more than two. A term "and/or" in this specification describes only an association relationship between associated objects and indicates that there may be three relationships. For example, A and/or B may represent the following three cases: Only A exists, both A and B exist, and only B exists.

Figure 1:
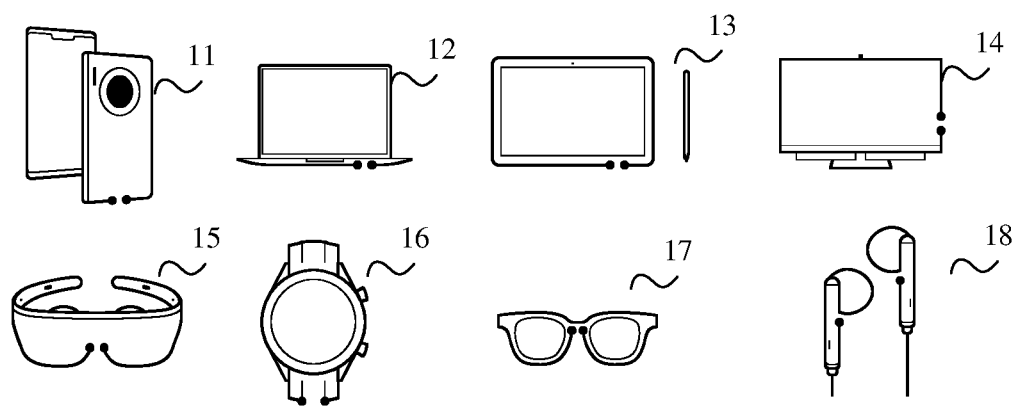
FIG. 1 is a schematic diagram of forms of an electronic device according to an embodiment of this application.

The data transmission method provided in embodiments of this application may be applied to an electronic device. For example, as shown in FIG. 1, the electronic device may be specifically a terminal device having one or more functions of a photographing function, a storage function, and a display function, such as a mobile phone 11, a notebook computer 12, a tablet computer 13, a large-screen display device 14, an augmented reality (AR)/virtual reality (VR) device 15, a wearable device (such as a smartwatch 16, smart glasses 17, and an earphone 18), a vehicle-mounted device, an ultra-mobile personal computer (UMPC), a netbook, a personal digital assistant (PDA), an artificial intelligence device, or a dedicated camera (for example, a single reflex camera or a card camera). A specific type of the electronic device is not limited in embodiments of this application.

Figure 2:
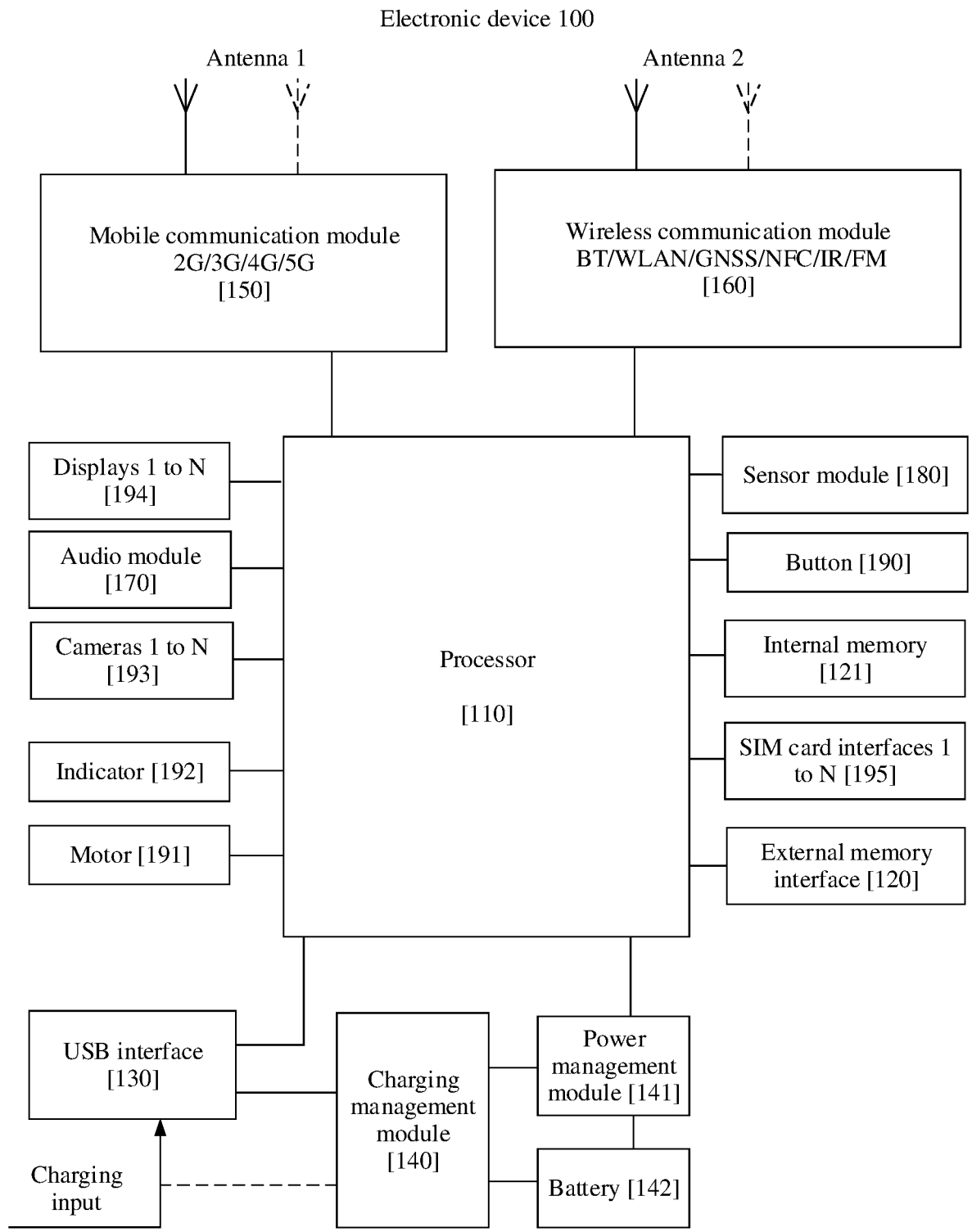
FIG. 2 is a schematic diagram of a structure of an electronic device according to an embodiment of this application.

For example, FIG. 2 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a sensor module 180, a button 190, a motor 191, an indicator 192, a camera 193, a display 194, a subscriber identification module (SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent components, or may be integrated into one or more processors.

The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (pulse code modulation, PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the camera 193, the sensor module 180, a charger, a flash, and the like through different I2C bus interfaces. For example, the processor no may be coupled to the camera 193 through the I2C interface, so that the processor no communicates with the camera 193 through the I2C bus interface, to implement a photographing function of the electronic device 100.

The MIPI interface may be configured to connect the processor 110 to a peripheral component such as the display 194 or the camera 193. The MIPI interface includes a camera serial interface (CSI), a display serial interface (DSI), and the like. In some embodiments, the processor no communicates with the camera 193 through the CSI interface, to implement the photographing function of the electronic device 100. The processor no communicates with the display 194 through the DSI interface, to implement a display function of the electronic device 100.

The GPIO interface may be configured through software. The GPIO interface may be configured as a control signal, or may be configured as a data signal. In some embodiments, the GPIO interface may be configured to connect the processor no to the camera 193, the display 194, the wireless communication module 160, the audio module 170, the sensor module 180, and the like. The GPIO interface may alternatively be configured as an I2C interface, an I2S interface, a UART interface, a MIPI interface, or the like.

The USB interface 130 is an interface that conforms to a USB standard specification, and may be specifically a mini USB interface, a micro USB interface, a USB type-C interface, or the like. The USB interface 130 may be configured to connect to the charger to charge the electronic device 100, or may be configured to transmit data between the electronic device 100 and a peripheral device, or may be configured to connect to a headset for playing audio through the headset. Alternatively, the interface may be configured to connect to another electronic device, for example, an AR device.

It may be understood that an interface connection relationship between the modules shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. The charging management module 140 supplies power to the electronic device by using the power management module 141 while charging the battery 142.

The power management module 141 is configured to connect to the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communication module 160, and the like. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution that is applied to the electronic device 100 and that includes wireless communication technologies such as 2G, 3G, 4G, and 5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same device.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and connects the display 194 to the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, quantum dot light-emitting diodes (QLED), or the like.

In some embodiments, the electronic device 100 may include one or N displays 194, where N is a positive integer greater than 1. In this embodiment of this application, locations and a quantity of displays 194 configured for display in a data transmission process are not specifically limited.

Figure 3A:
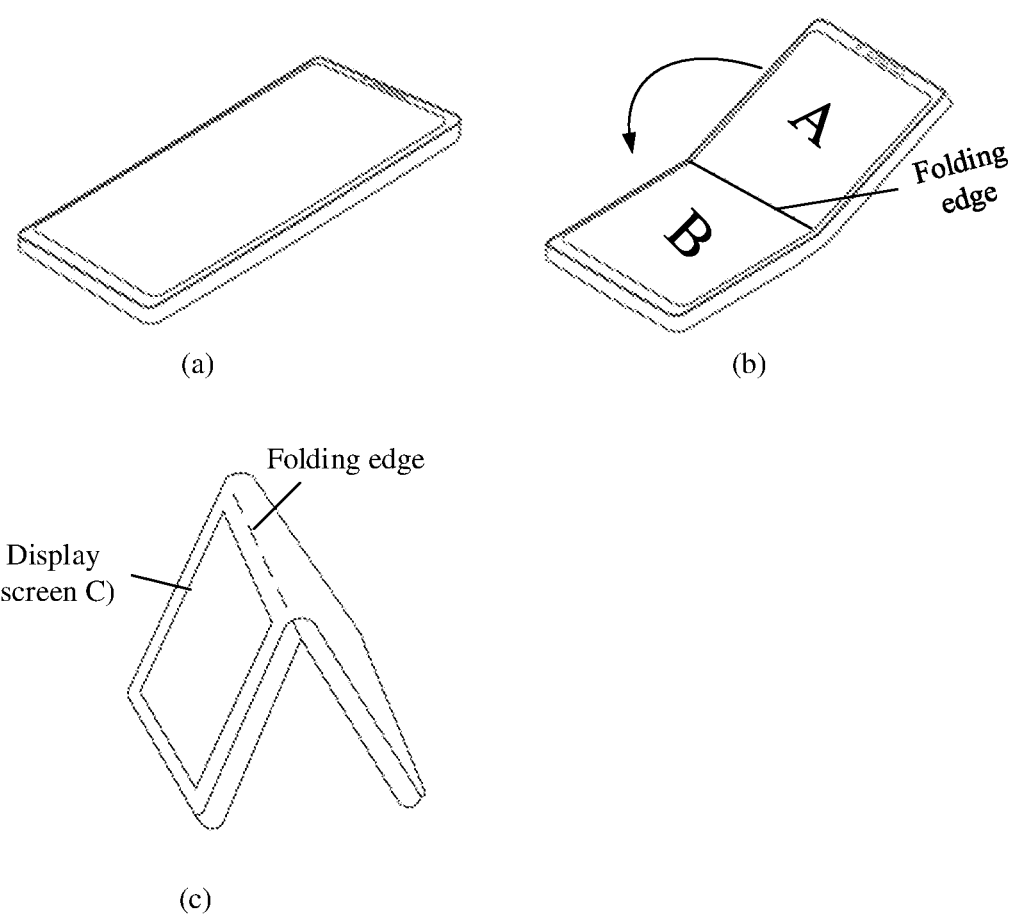
FIG. 3A is a schematic diagram of positions of a display according to an embodiment of this application.

For example, as shown in (a) in FIG. 3A, the electronic device 100 includes one display 194. As shown in (b) in FIG. 3A, the electronic device 100 is a foldable-screen electronic device including a plurality of displays 194 (in other words, the display 194 can be folded). The foldable-screen electronic device 100 shown in (b) in FIG. 3A folds the display inward (or outward) along a folding edge in response to an operation of a user, so that the display forms at least two screens (for example, a screen A and a screen B). As shown in (c) in FIG. 3A, there is a display (for example, a screen C) on an outer side when the display is in a folded state.

The sensor module 180 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

The touch sensor is also referred to as a "touch component". The touch sensor may be disposed on the display 194, and the touch sensor and the display 194 form a touchscreen, which is also referred to as a "touch screen". The touch sensor is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor may alternatively be disposed on a surface of the electronic device 100, and is at a location different from that of the display 194.

The electronic device 100 may implement the photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a camera scenario. In some embodiments, the ISP may be disposed in the camera 193.

The camera 193 is configured to capture a static image or a video. An optical image of an object is generated through the lens, and is projected onto a photosensitive element. The light-sensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as an RGB format or a YUV format.

In some embodiments, the electronic device 100 may include one or N cameras 193, where N is a positive integer greater than 1. In this embodiment of this application, locations and a quantity of cameras 193 configured for photographing in the data transmission process are not specifically limited.

The camera 193 may be located in an edge area of the electronic device 100, may be an off-screen camera, or may be a pop-up camera. The cameras 193 may include a rear-facing camera, and may further include a front-facing camera. A specific location and form of the camera 193 are not limited in embodiments of this application.

Figure 3B:
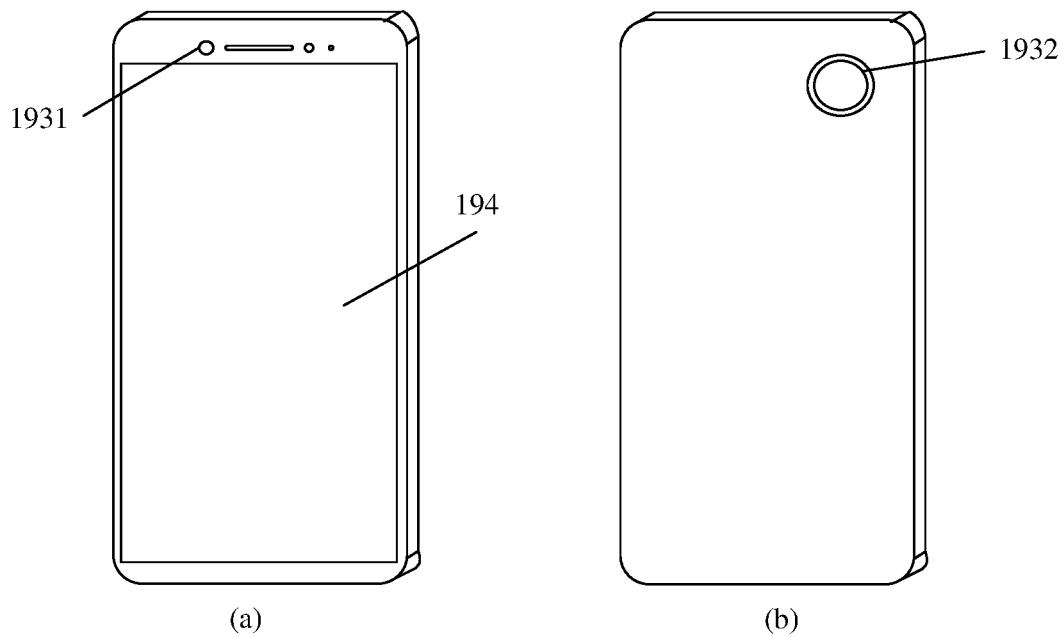
FIG. 3B is a schematic diagram of positions of a camera according to an embodiment of this application.

For example, for a layout of the camera on the electronic device 100, refer to FIG. 3B. A front surface of the electronic device 100 is a plane on which the display 194 is located. As shown in (a) in FIG. 3B, a camera 1931 is located on the front surface of the electronic device 100, and the camera is a front-facing camera. As shown in (b) in FIG. 3B, a camera 1932 is located on a rear surface of the electronic device 100, and the camera is a rear-facing camera.

The digital signal processor is configured to process a digital signal, and may process another digital signal in addition to the digital image signal. For example, when the electronic device 100 selects a frequency, the digital signal processor is configured to perform Fourier transform on frequency energy, or the like.

The video codec is configured to compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (NN) computing processor. The NPU quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, voice recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code, and the executable program code includes instructions. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, and may further include a nonvolatile memory, for example, at least one magnetic disk storage device, a flash memory device, or a universal flash storage (UFS). The processor 110 runs the instructions stored in the internal memory 121 and/or the instructions stored in the memory disposed in the processor, to perform various function applications of the electronic device 100 and data processing.

The audio module 170 includes a speaker, a receiver, a microphone, a headset jack, and the like, is configured to convert digital audio information into an analog audio signal for output, and is also configured to convert an analog audio input into a digital audio signal. The audio module 170 may further be configured to encode and decode an audio signal. In some embodiments, the audio module 170 may be disposed in the processor 110, or some function modules in the audio module 170 are disposed in the processor 110. The electronic device 100 may implement an audio function, for example, music playing and recording, through the audio module, the speaker, the receiver, the microphone, the headset jack, the application processor, and the like.

The button 190 includes a power button, a volume button, and the like. The button 190 may be a mechanical button or a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, shooting and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1.

The following describes the data transmission method provided in embodiments of this application by using an example in which an electronic device is a mobile phone having the structure shown in FIG. 2.

In some embodiments, a user may indicate, by using a touch operation, a button operation, an air gesture operation, a voice operation, or the like, the mobile phone to start a camera, and display a photographing preview interface. For example, on a home screen 401 shown in FIG. 4A(a), in response to an operation of tapping a camera icon 41 by the user, the mobile phone starts the camera, and displays a photographing preview interface 402 shown in FIG. 4A(b). Alternatively, in response to a voice instruction operation of opening the camera by the user, the mobile phone starts the camera, and displays the photographing preview interface 402 shown in FIG. 4A(b). In response to an operation of tapping a photographing control 42 by the user, the mobile phone invokes the camera to photograph an image, and sends photographed original image data to a processor for processing. After processing the original image data, the processor generates an image visible to the user, and stores the image in a memory. The mobile phone displays an interface 403 shown in FIG. 4A(c), and displays a thumbnail 43 of a previously photographed image.

Figure 4A:
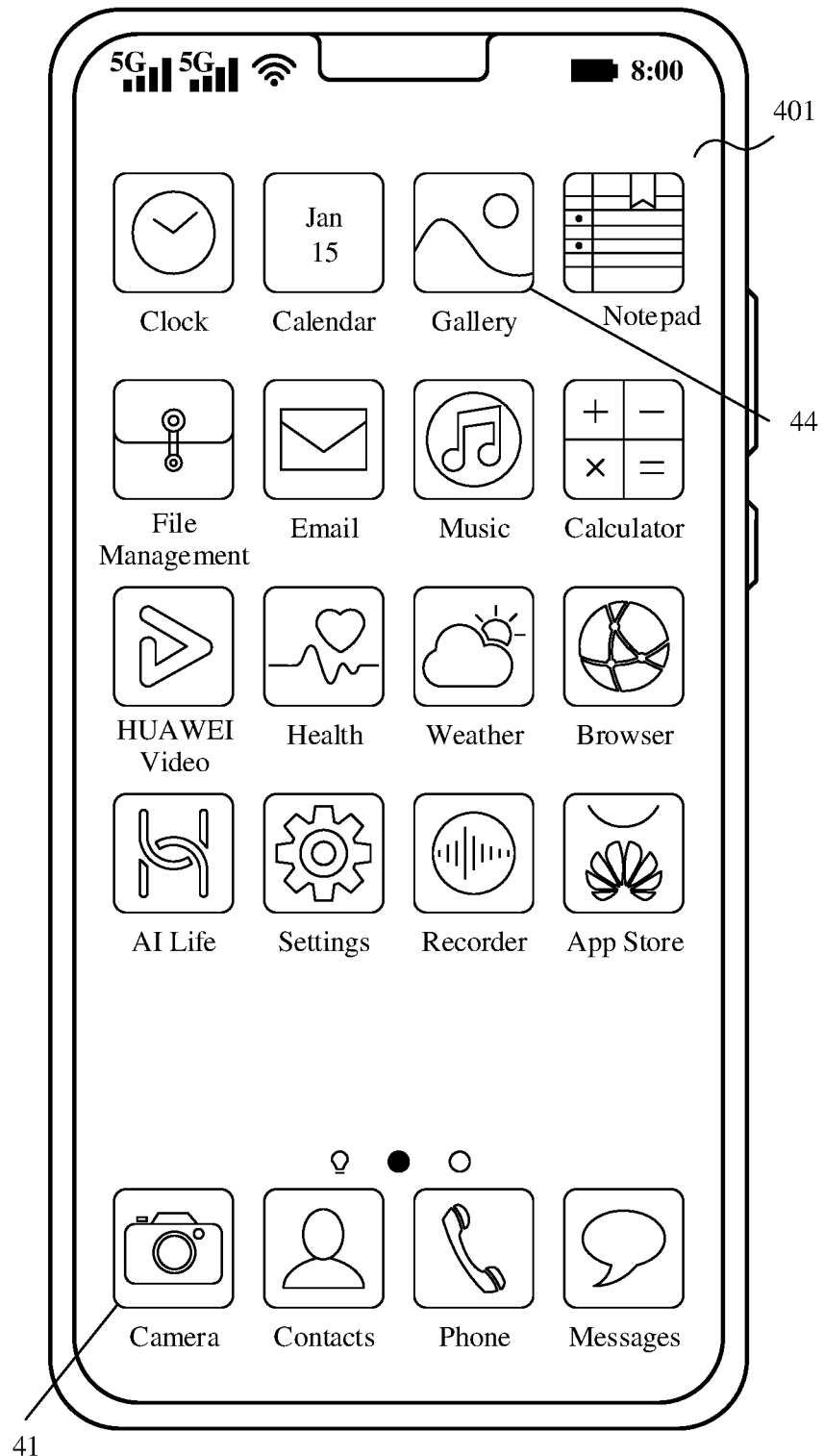
FIG. 4A(a) to FIG. 4A(c) are a schematic diagram 1 of a group of interfaces according to an embodiment of this application.
Figure 4A:
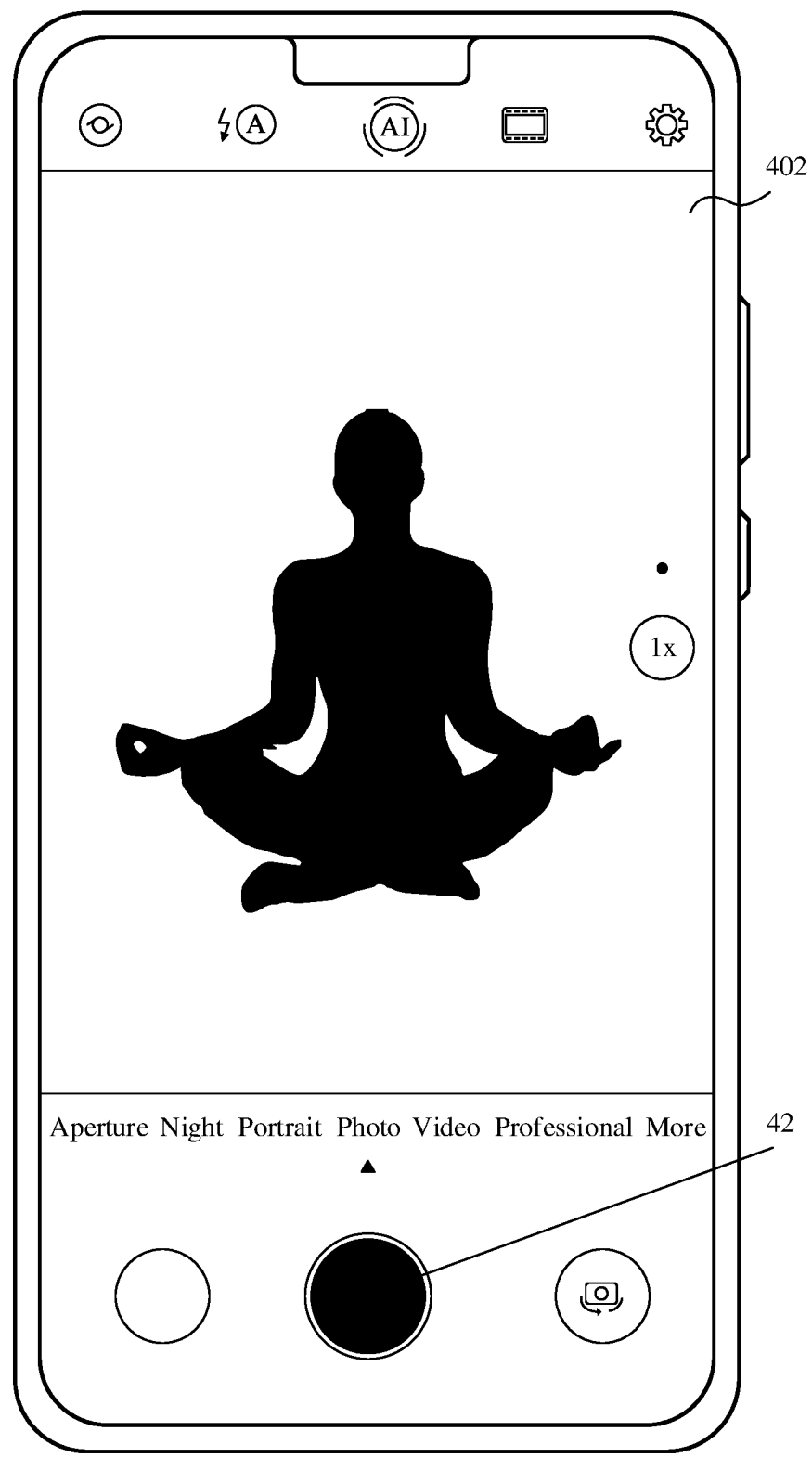
Figure 4A:
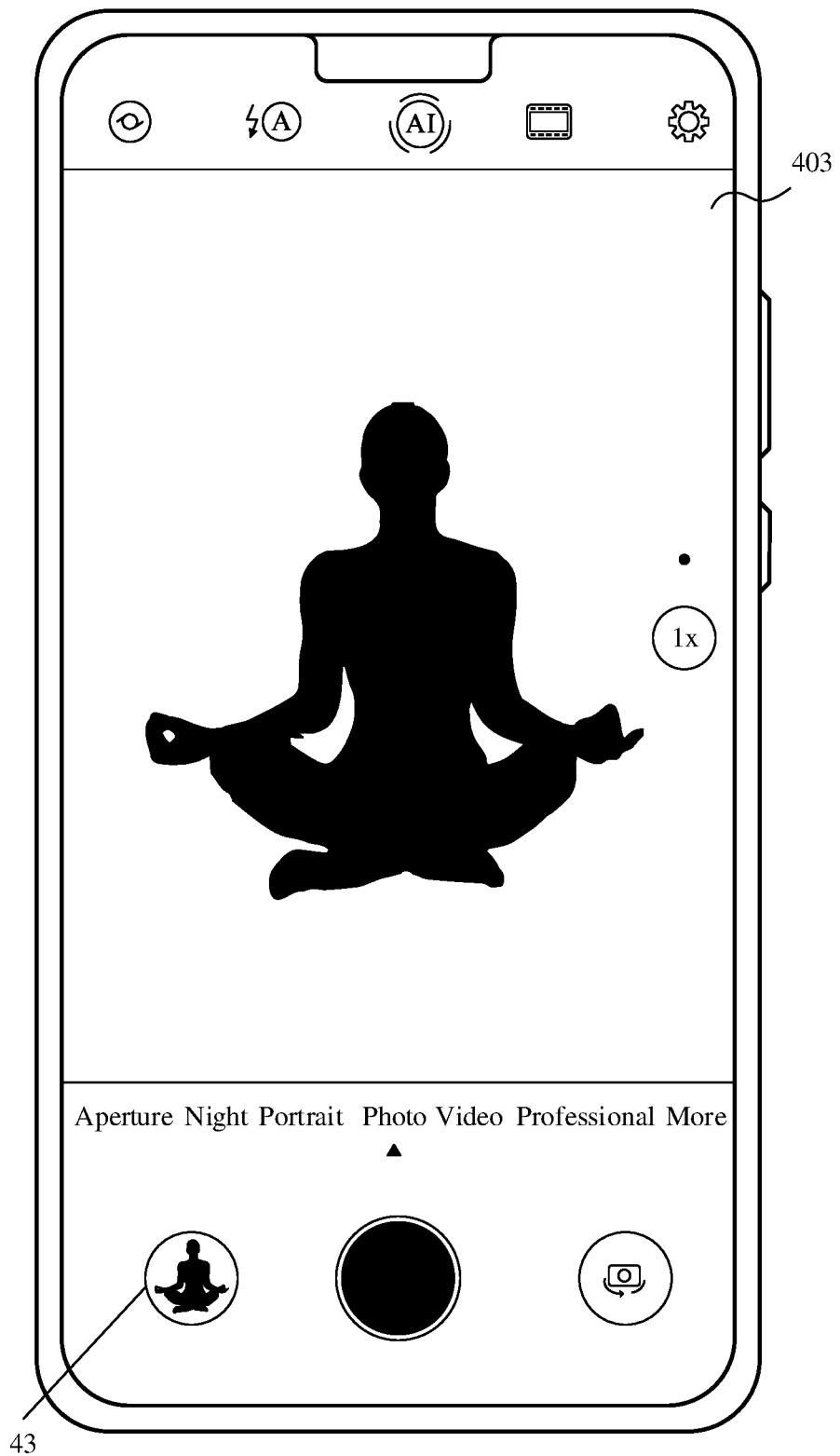
Figure 4B:
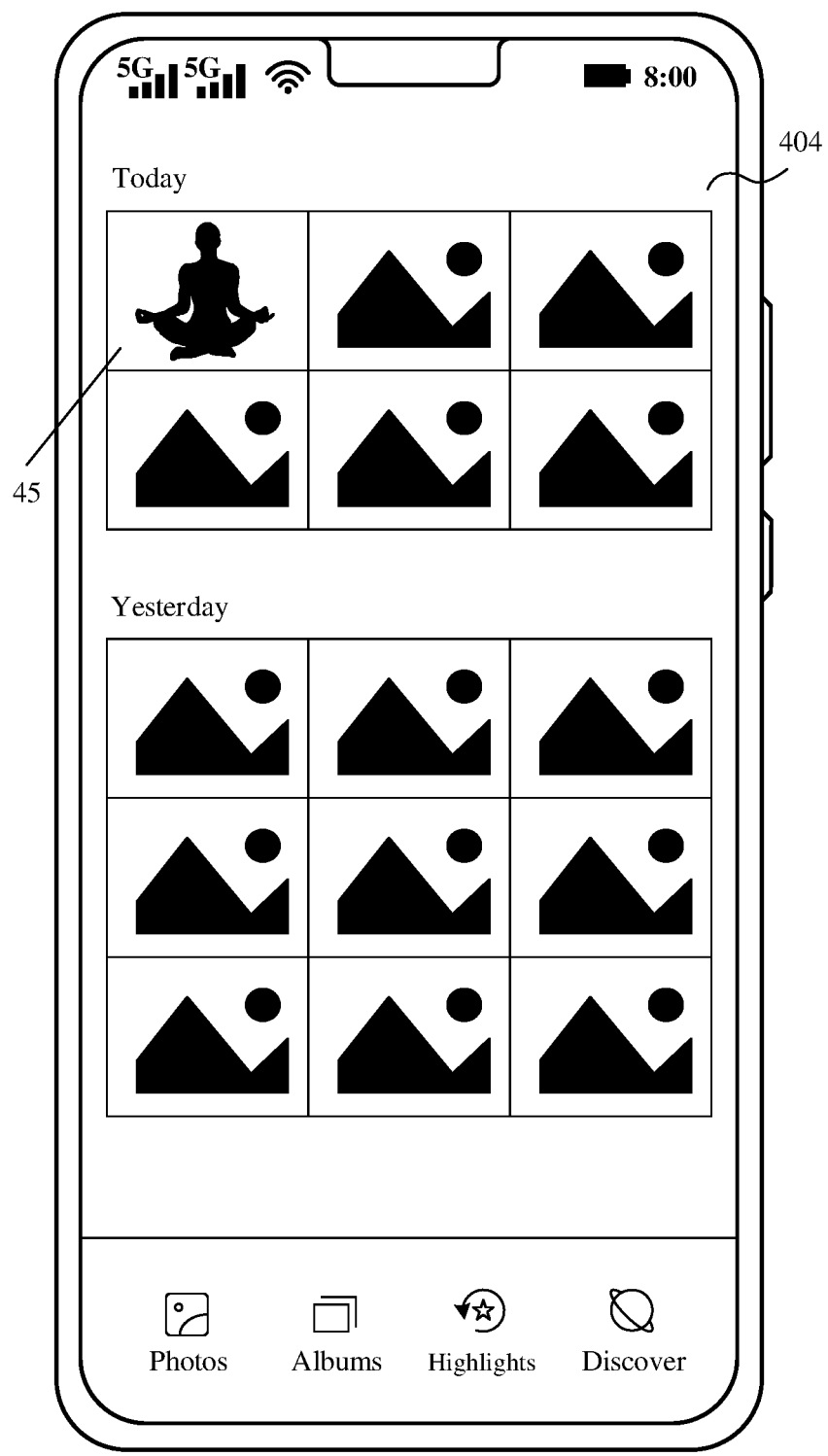
FIG. 4B(a) and FIG. 4B(b) are a schematic diagram 2 of a group of interfaces according to an embodiment of this application.
Figure 4B:
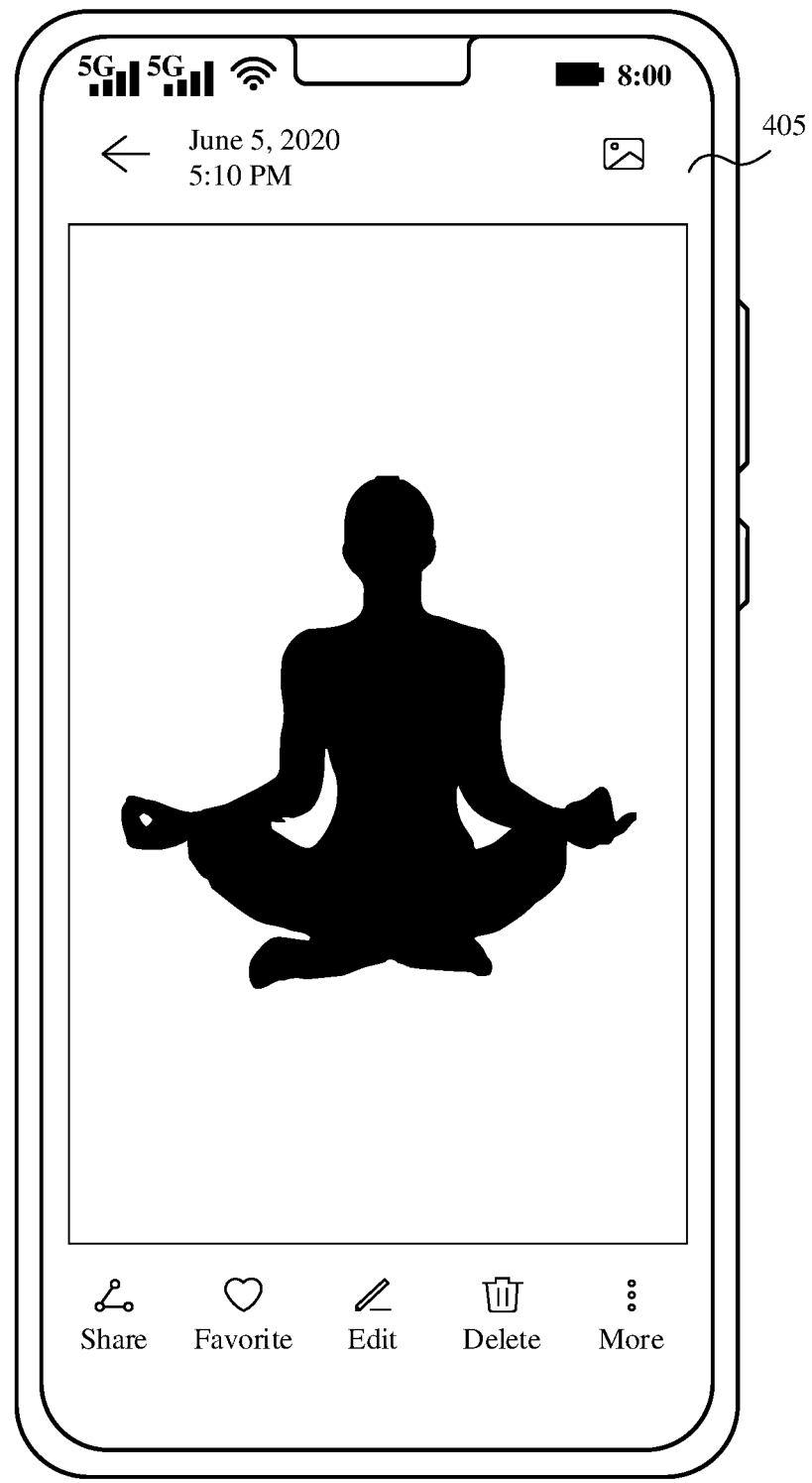

Alternatively, on the home screen 401 shown in FIG. 4A(a), in response to an operation of tapping a gallery icon 44 by the user, the mobile phone starts a gallery, and displays a gallery interface 404 shown in FIG. 4B(a). A photographed image or a video preview image stored in the memory is displayed on the gallery interface 404. In response to an operation of tapping a preview image 45 by the user, the mobile phone invokes, by using the processor, corresponding image data stored in the memory, and displays the image data by using a display unit. An interface 405 shown in FIG. 4B(b) is displayed.

It can be learned that, in the foregoing image photographing, image storage, and image display processes, at least interaction between a processing unit, a photographing unit, the display unit, and a storage unit is included. If data transmission between different units is based on different protocol standards, a data transmission process is complex, and an error is prone to occur. The processing unit includes, for example, a CPU or a system on chip (SOC). The photographing unit includes, for example, the camera. The display unit includes, for example, a display. The storage unit includes, for example, the memory.

In some embodiments, the MIPI Alliance formulates different protocol specifications based on different application scenarios, to resolve an interface conflict problem and reduce design difficulty of a functional system. For example, standards and protocol specifications for a storage interface, a camera interface, a display interface, and another aspect are formulated.

Based on a storage scenario, the MIPI Alliance formulates Unipro technical specifications. The Unipro protocol defines a 6+1 layer data transmission structure, including an application layer, a transport layer, a network layer, a data link layer, a physical layer adapter layer, and a physical layer. Main functions include message segmentation and reassembly, packet header format generation and parsing, error processing, cyclic redundancy check (CRC) code generation and check, control packet generation and parsing, data buffering, data retransmission, traffic control, and link management and configuration. Optionally, a device management entity (DME) is configured to control and configure the Unipro, for example, control power-on, power-off, and reset of the UniPro, lower-layer link startup, and a change of a power consumption mode.

Figure 5:
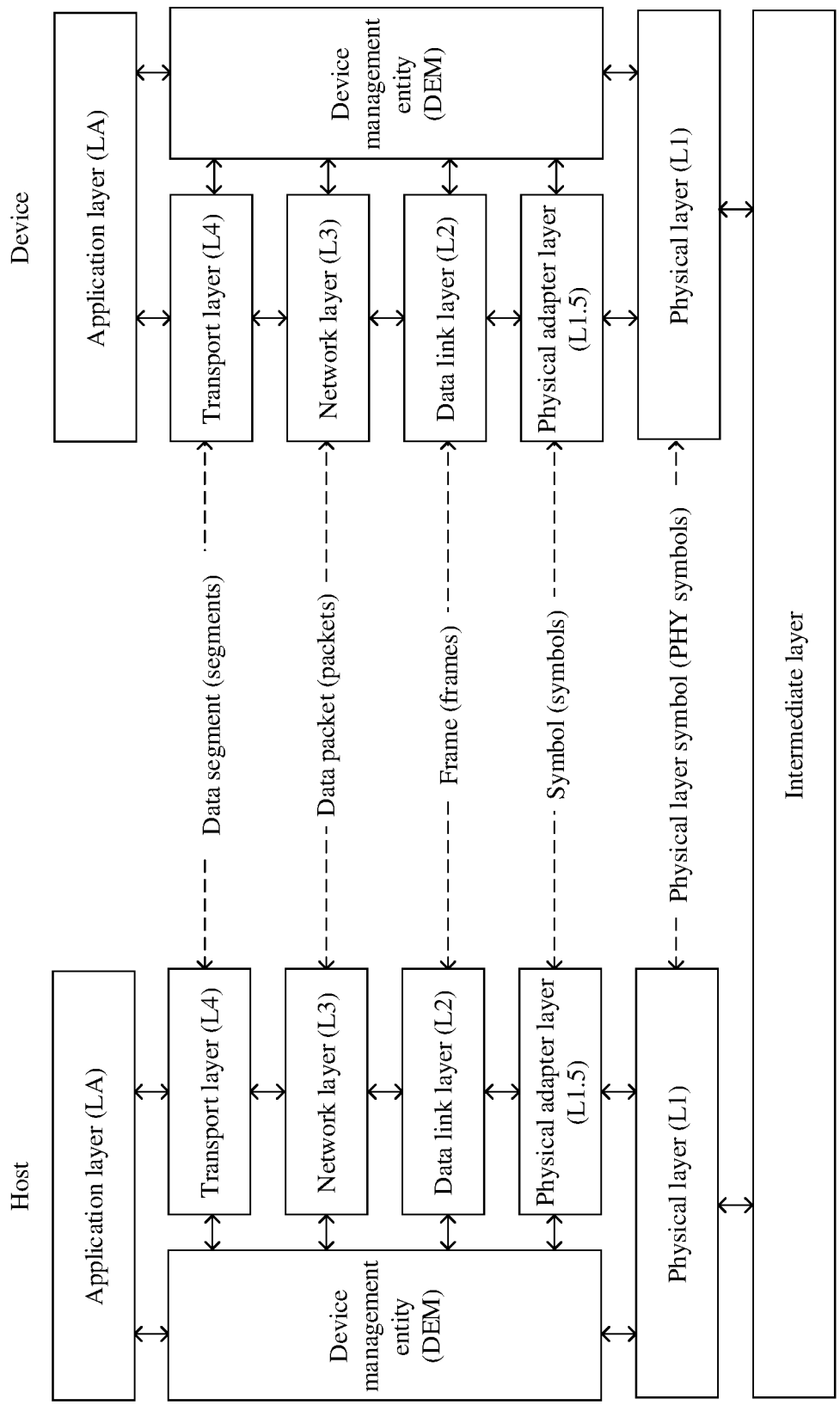
FIG. 5 is a schematic diagram of a UniPro structure according to an embodiment of this application.

For example, FIG. 5 is a schematic diagram of a UniPro structure according to an embodiment of this application. As shown in FIG. 5, a host includes, for example, a processing unit such as a CPU or a SoC. For example, a device includes a storage unit such as a universal flash storage (UFS) or an embedded multimedia card (eMMC). The host and the device perform data transmission based on the UniPro protocol. The host and the device perform bidirectional transmission. In other words, the host and the device each may be either a transmitter or a receiver.

An L1 layer is a physical layer, for example, an M-PHY. The L1 layer uses a serial interface technology developed specifically for mobile devices, only two differential signal lines are required for each link, and the L1 layer has a plurality of power saving modes. A data unit transmitted at the L1 layer is a physical symbol (PHY symbol).

An L1.5 layer is a physical adapter (PHY adapter) layer, is configured to detect a quantity of bidirectional links, can allow access to a control parameter and a status of a peer end, and can change a power mode. A data unit transmitted at the L1.5 layer is a symbol with a length of 17 bits. A first bit indicates a symbol type. For example, a value of the first bit being 0 indicates that a symbol being transmitted is a data symbol, and remaining bits indicate transmitted data. The value of the first bit being 1 indicates that a symbol being transmitted is a control symbol, the following 8 bits indicate a control instruction, and the last 8 bits indicate a control parameter. In addition, the control parameter varies based on a control instruction.

An L2 layer is a data link layer, and is configured to ensure validity and robustness of data transmission in a communication process. Main functions of the L2 layer include framing and deframing, PHY initialization, traffic control, priority division, CRC generation, data retransmission, and the like. A data unit transmitted at the L2 layer is a frame. Based on the L1.5 layer, independent symbols are packed, and each frame may be packed with a maximum of 144 symbols, occupying 288 bytes. A header field is added to a frame header of the frame, and a trailer field is added to a frame trailer. In addition, a CRC field is further included in a frame structure, and occupies 16 bits. Correspondingly, the frame at the L2 layer also includes a data frame and a control frame. The control frame includes an acknowledgment and flow control frame (AFC) and a negative acknowledgment frame (NAC). Specifically, the receiver sends an AFC or a NAC to the transmitter, where the AFC indicates that receiving is correct and indicate available space of a buffer at the L2 layer. The NAC indicates a reception error.

An L3 layer is a network layer, and is configured to route data to a correct target device. A data unit transmitted at the L3 layer is a data packet. A shorter header field is added based on the frame at the L2 layer, occupies 7 bits, and is used to identify a destination address of data routing.

An L4 layer is a transport layer, and main functions include addressing, decomposition and reassembly, error processing, packet composition and decomposition, format identification, and end-to-end flow control. A data unit transmitted at the L4 layer is a data segment. A port identification code field is added based on the package at the L3 layer, occupies 5 bits, and is used to identify different ports.

Figure 6:
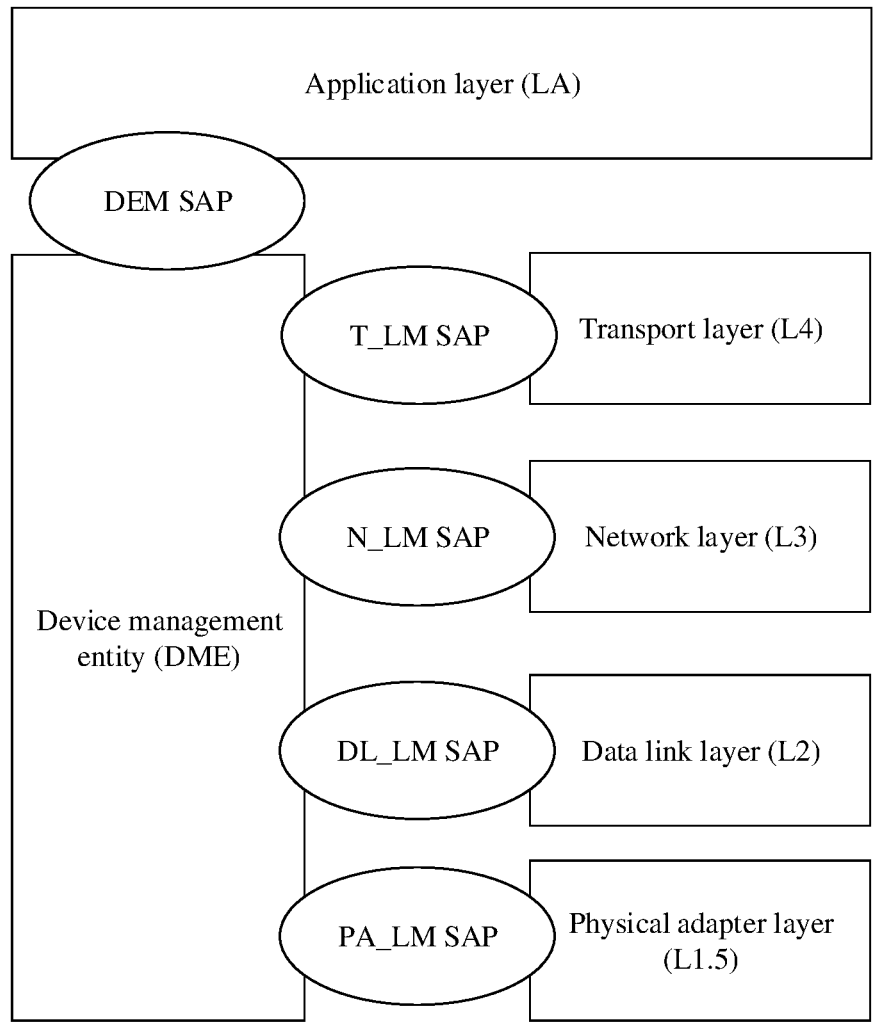
FIG. 6 is a schematic diagram of a DME interface according to an embodiment of this application.

In addition, as shown in FIG. 6, a layer management (LM) service access point (SAP) interface is configured between the DME and each of the layers. An SAP design enables the layers to be implemented independently, and when functionality is ensured, allows the layers to be combined or split. Based on SAP, the DME may access a control parameter and a status parameter of each layer, manage a power consumption mode of each layer, control power-on, power-off, and reset of the Unipro, end point reset, lower-layer link startup, and sleep mode switching, and configure an attribute of each layer. In addition, the DME may access and control a Unipro module of a peer device.

It can be learned that a data transmission structure specified in the UniPro protocol standard is complex. In a point-to-point storage scenario, many functions at each layer are redundant, for example, a port management function applicable to a multi-port scenario. There are a plurality of layers in the UniPro, each layer requires a logical interface and needs to be connected to the DME, and the DME manages an entire link. Consequently, a circuit occupies a large area. In addition, a link management process is complex and time-consuming. Further, a complex structure causes a large quantity of error types that may occur, and this increases difficulty in error processing. In addition, a data coding manner in the UniPro is 8B10B, and has low coding efficiency, thereby affecting a data transmission rate.

Figure 7:
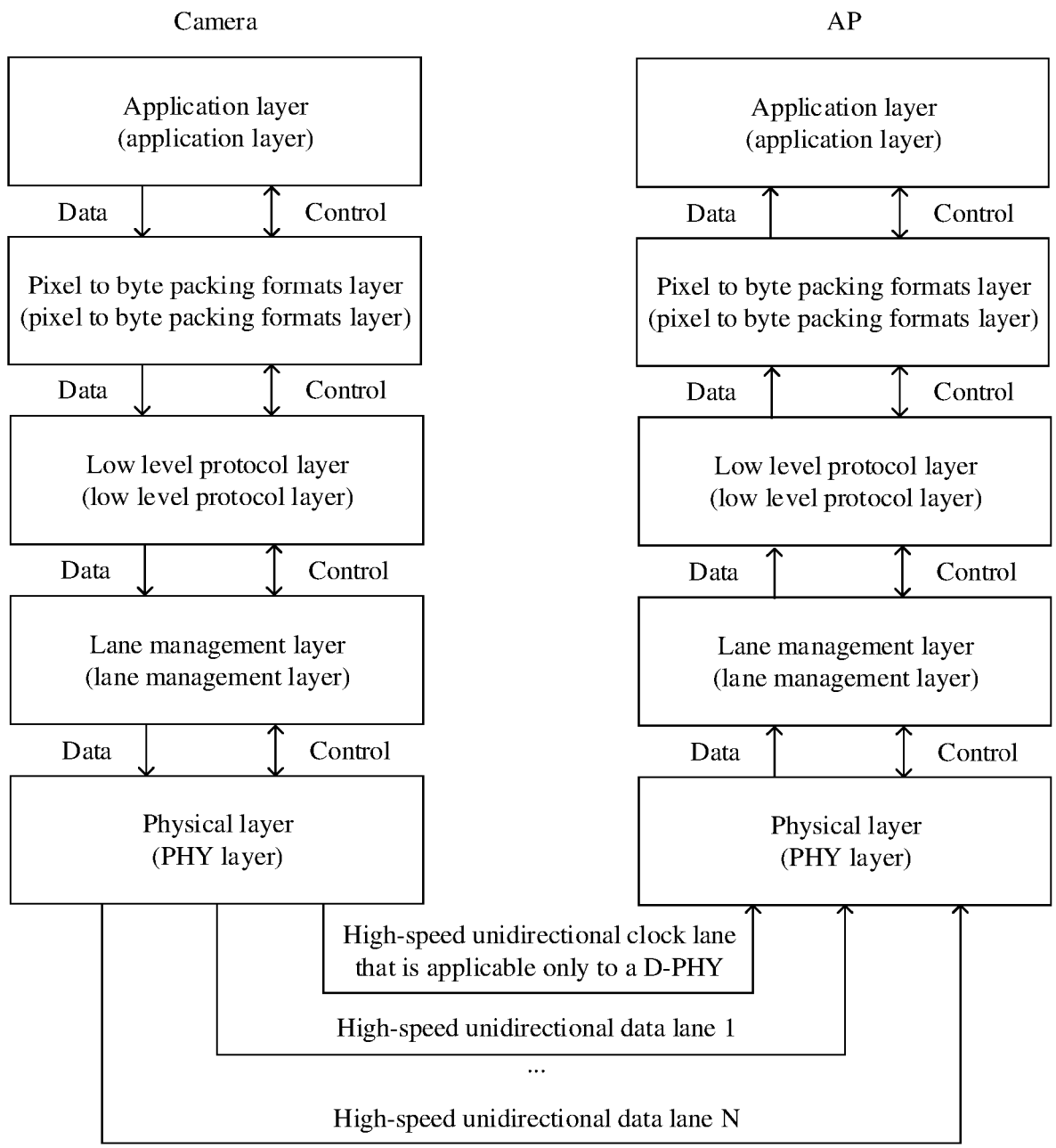
FIG. 7 is a schematic diagram of a CSI-2 protocol architecture according to an embodiment of this application.

Based on a camera scenario, the MIPI Alliance formulates a camera serial interface 2 (CSI-2) protocol. The CSI-2 protocol defines a high-speed serial interface between the processor and a camera module. As shown in FIG. 7, in a communication system to which the CSI-2 protocol is applicable, a transmitter is a camera module, and a receiver is a wireless access point (AP) end (for example, a CPU). A CSI-2 protocol architecture is divided into three layers: an application layer, a protocol layer, and a physical layer. The protocol layer includes a pixel to byte packing formats layer, a low level protocol layer, and a lane management layer. The physical layer may be a C-PHY or a D-PHY.

Figure 8:
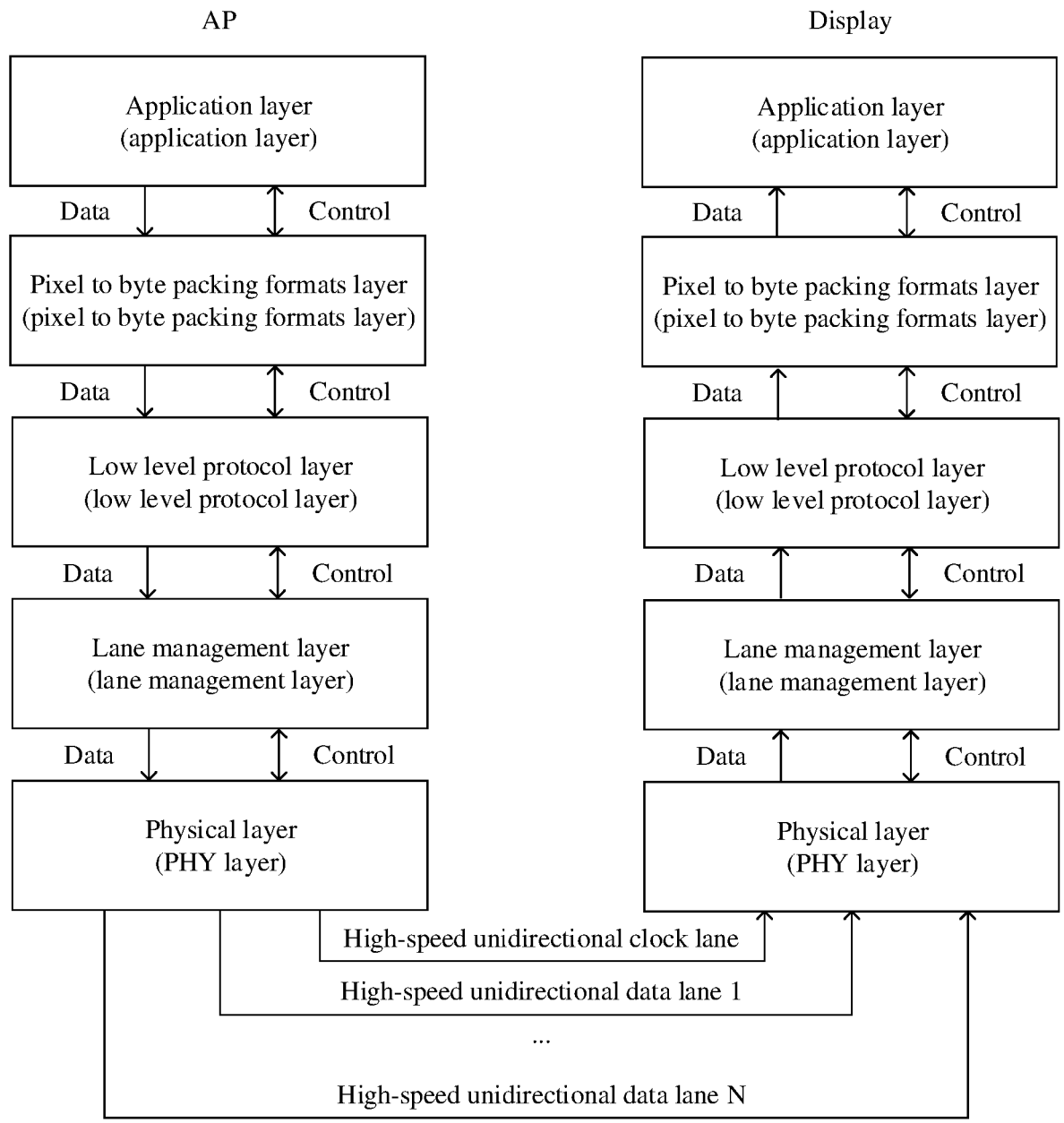
FIG. 8 is a schematic diagram of a DSI-2 protocol architecture according to an embodiment of this application.

Based on a display scenario, the MIPI Alliance formulates a display serial interface 2 (DSI-2) protocol, and the protocol defines a high-speed serial interface between the processor and a display module. As shown in FIG. 8, in a communication system to which the DSI-2 protocol is applicable, a transmitter is an AP end (for example, a CPU), and a receiver is a display module. Similar to the CSI-2 protocol architecture, the DSI-2 protocol architecture also includes three layers: an application layer, a protocol layer, and a physical layer. The protocol layer includes a pixel to byte packing formats layer, a low level protocol layer, and a lane management layer. The physical layer may be a C-PHY or a D-PHY.

For example, as shown in Table 1, content and functions defined in the CSI-2 protocol architecture and the DSI-2 protocol architecture are described.

TABLE 1

| Structure | Function or meaning |
| --- | --- |
| Application layer | Including various algorithm modules for processing original image data |
| Packing/Unpacking layer | Configured to segment pixel data into 8-bit data in a specific sequence |
| Low level protocol layer | Configured to add a packet header and a packet trailer to newly generated data, to form a data stream that complies with the protocol |
| Lane management layer | Configured to perform read/write management on a generated data stream based on a specific sequence and a requirement, and output the data stream |
| Physical layer | Configured to generate a final signal waveform of a MIPI |
| Pixel data | Data stream processed by an image module or data stream of an original image |
| Transmission data | Data segmented by a MIPI module or added with a header and a trailer |
| Control signal | Inter-module control signaling stream |
| Transmitter | Including a MIPI digital part, a transfer board, or another part to implement MIPI source transmission |
| Receiver | Including a transfer board and a commercial receiver module, and is responsible for parsing a received MIPI signal source |

Based on the description of the Unipro protocol, the CSI-2 protocol, and the DSI-2 protocol, it can be learned that, currently in an electronic device, protocol architectures used by a camera module, a display module, and a storage module are different. In addition, various physical interfaces are different from each other, resulting in a completely different circuit structure for each part. In a schematic diagram of a circuit link shown in FIG. 9, three parts, e.g., a camera module, a display module, and a storage module, need to separately use different link lanes to communicate with an SOC. As a result, a circuit structure is complex, an interconnection area is increased, and a transmission rate is low. Further, error processing is complex, link transmission is complex, and various interference problems are easily generated. The camera module includes, for example, a camera sensor chip. The display module includes, for example, a display driver IC (DDIC). The storage module includes, for example, a storage sensor chip.

Therefore, embodiments of this application provide a data transmission protocol architecture for a point-to-point transmission scenario. The protocol architecture may be applied in a storage scenario, a camera scenario, and a display scenario. The architecture is simple, and can effectively simplify a circuit structure and improve transmission efficiency.

Figure 10:
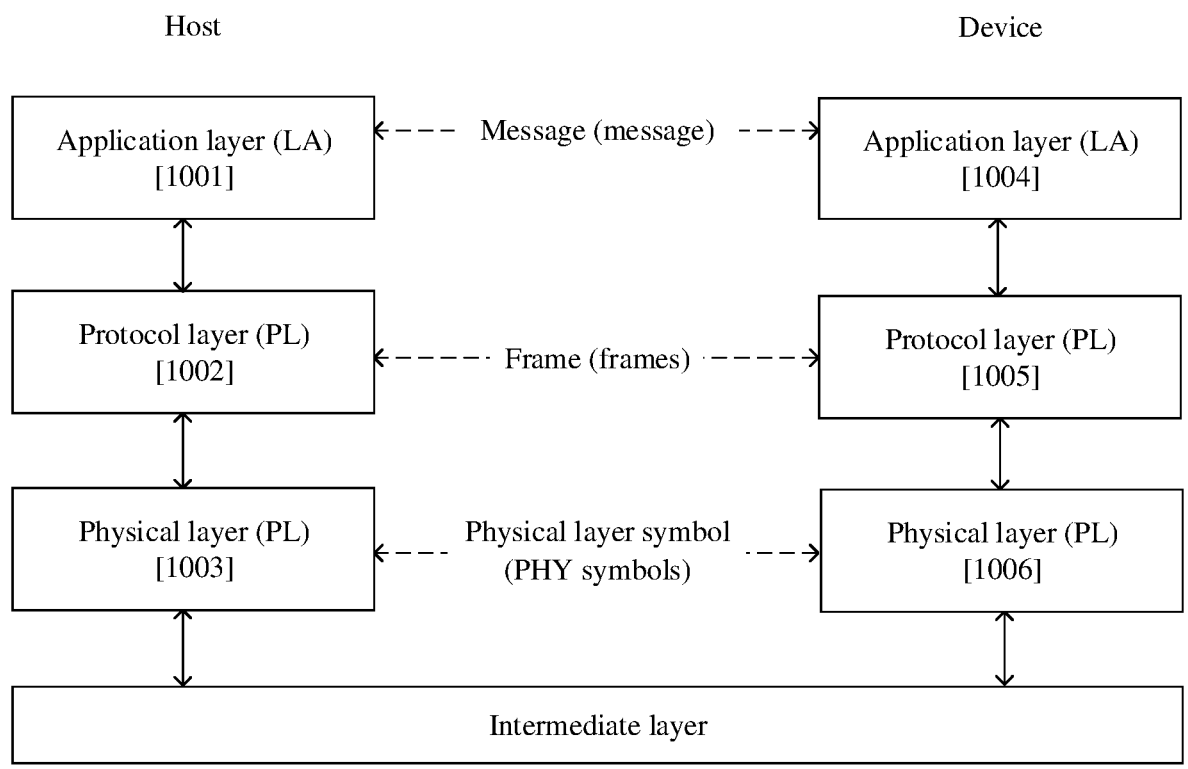
FIG. 10 is a schematic diagram of a general data transmission protocol architecture according to an embodiment of this application.

For example, as shown in FIG. 10, a general data transmission protocol architecture includes an application layer (PA), a protocol layer (PL), and a physical layer (PL). The application layer is configured to invoke a basic transmission capability of the protocol layer, to implement an application function of the application layer, for example, including parameter configuration of a host for a device. The protocol layer is configured to provide a data transmission lane, for example, a transparent data transmission lane, between a transmitter and a receiver, to provide a reliable data transmission service for the application layer. Optionally, the protocol layer may further ensure reliability of data transmission through segmentation/reassembly and error control above the physical layer. The physical layer is configured to provide a mechanical characteristic, an electronic characteristic, a functional characteristic, and a specification characteristic for creating, maintaining, and tearing down a physical lane required for data transmission.

Figure 9:
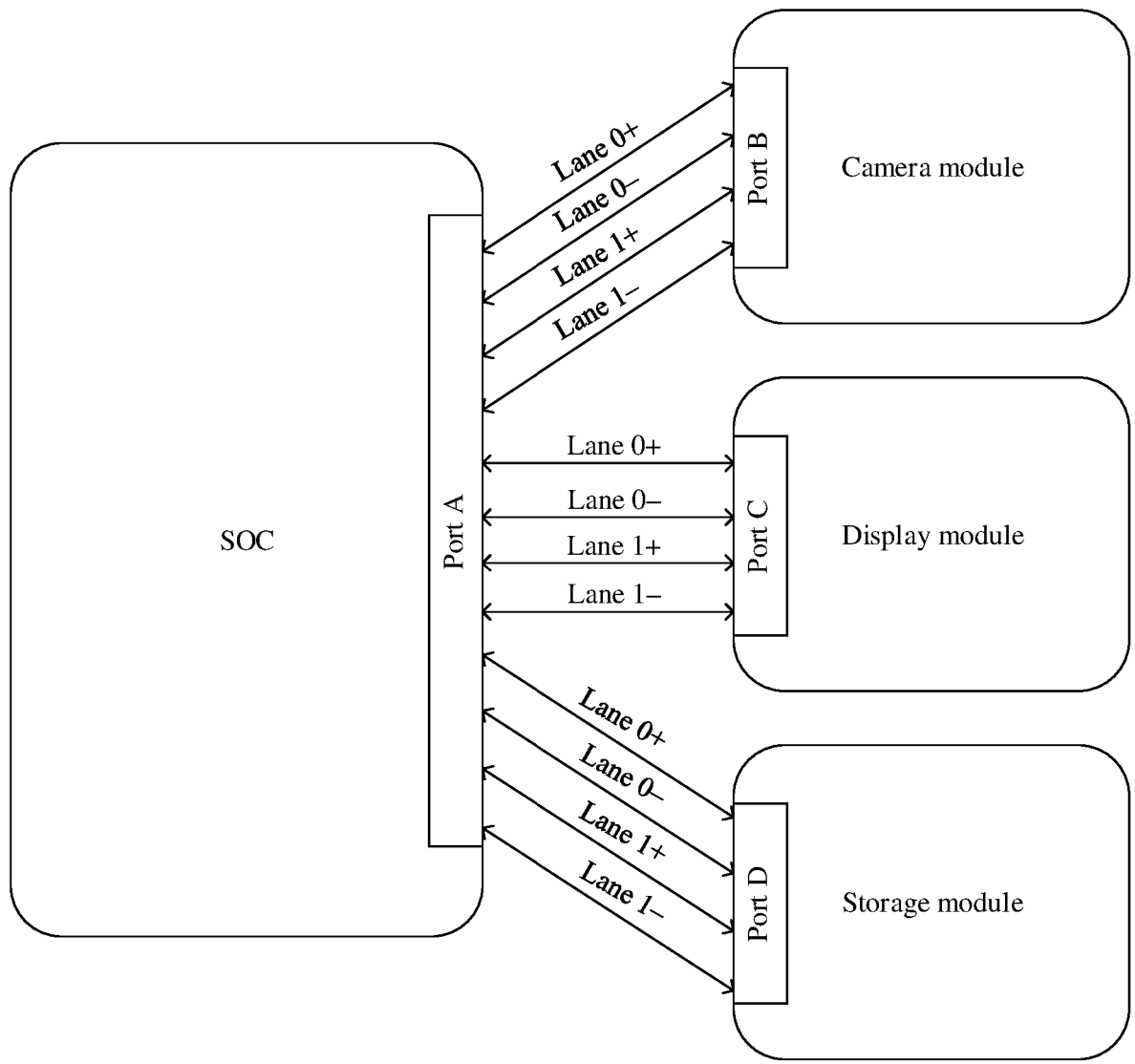
FIG. 9 is a schematic diagram of a circuit link according to an embodiment of this application.
Figure 31:
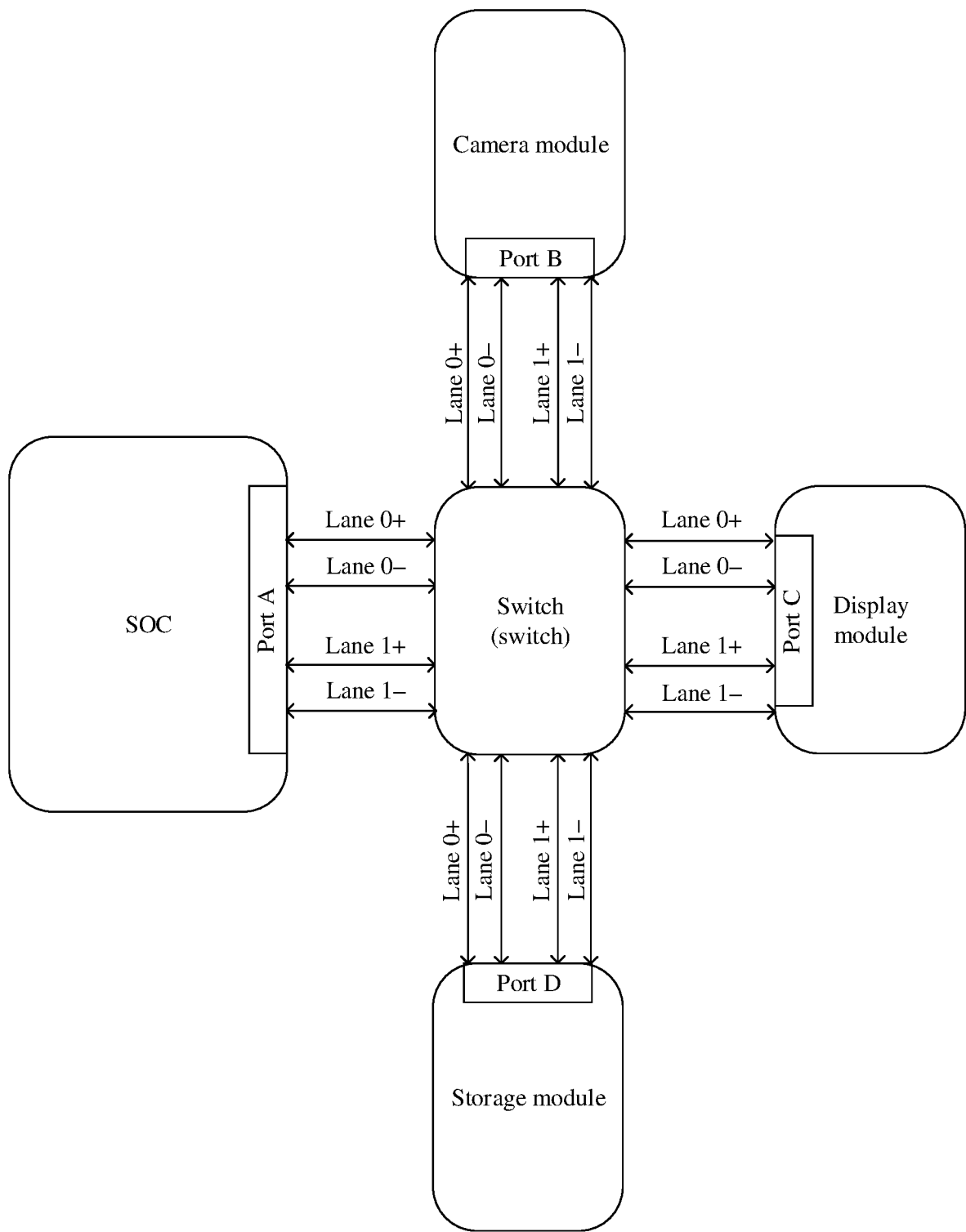
FIG. 31 is a schematic diagram of a structure of a link according to an embodiment of this application.

Optionally, the general protocol architecture provided in the embodiment of this application shown in FIG. 10 can be applied to the scenarios shown in FIG. 4A(a) to FIG. 4A(c) and FIG. 4B(a) and FIG. 4B(b) and another data transmission scenario. As shown in FIG. 31, a camera module, a display module, and a storage module all perform data transmission based on the protocol architecture provided in embodiments of this application. The same protocol architecture is applied in a transmission process of the modules, and therefore transmission interfaces are the same. Therefore, the modules do not need to be separately connected to an SOC as shown in FIG. 9, but can be connected to the SOC based on a same transmission interface, thereby implementing link multiplexing, reducing a line layout, and reducing a circuit area.

In some embodiments, the protocol architecture shown in FIG. 10 has different specific implementations for different application scenarios.

Figure 11:
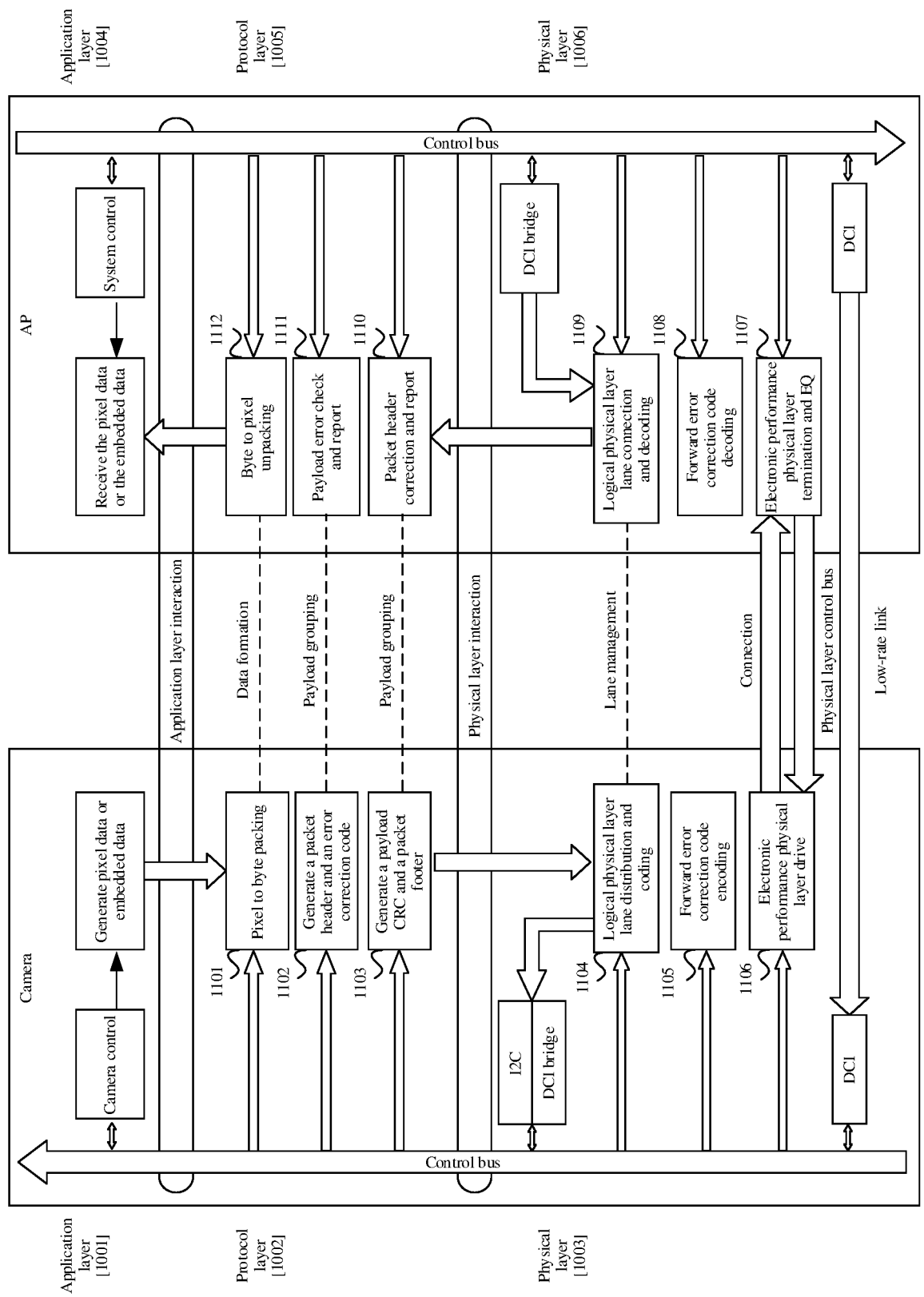
FIG. 11 is a schematic diagram of a data transmission protocol architecture in a camera scenario according to an embodiment of this application.

For example, based on the protocol architecture shown in FIG. 10, as shown in FIG. 11, in the camera scenario, a data transmission direction of the protocol architecture is from a camera end to an AP end. After a camera obtains data, a control bus controls an application layer 1001 at the camera end to generate pixel data or embedded data to be transmitted to a protocol layer 1002. The protocol layer 1002 can pack the data by using a pixel byte packing formats function 1101, a packet header and error correction code generation function 1102, and a payload CRC and packet footer generation function 1103. A specific implementation includes generation of a data packet header and an error correction code (ECC) and generation of a cyclic redundancy check (CRC) code and a data packet footer. An implementation sequence of the functions is not limited in this embodiment of this application. Then, a data packet is sent by a physical layer 1003 at the camera end to a physical layer 1006 at the AP end for processing, and then transmitted to a protocol layer 1005. The protocol layer 1005 can unpack the data packet by using a packet header correction and report function 1110, a payload error check and report function 1111, and a byte to pixel unpacking formats function 1112. A specific implementation includes check and report of the data packet header and the ECC and check and report of the CRC and the data packet footer. The protocol layer 1005 transmits generated pixel data or embedded data to an application layer 1004. An implementation sequence of functions of the protocol layer 1002 at the camera end and the protocol layer 1005 at the AP end is not limited in this embodiment of this application. For specific steps of data transmission in the camera scenario, refer to related content of the procedure shown in FIG. 35 below. Details are not described herein again.

Figure 12:
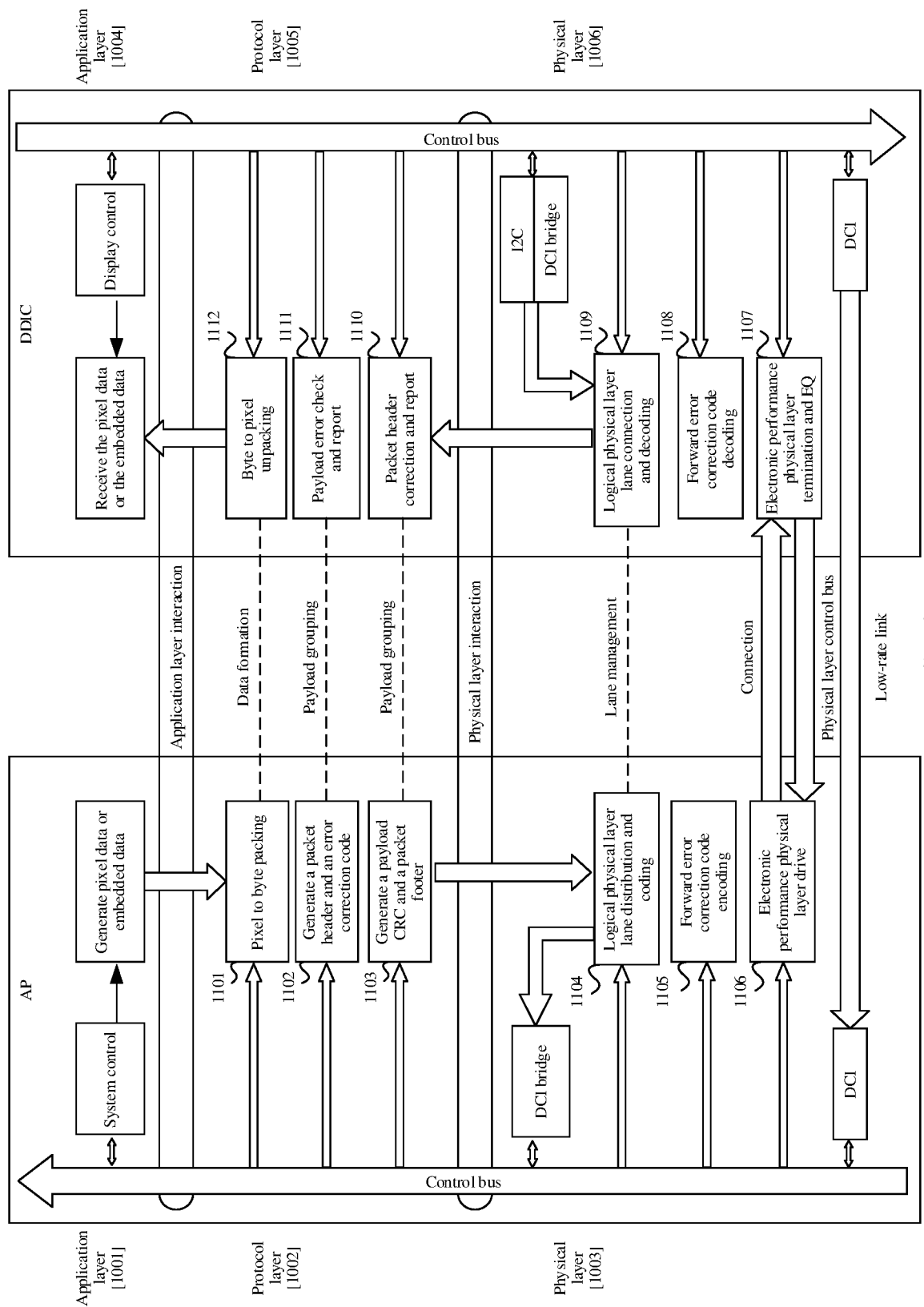
FIG. 12 is a schematic diagram of a data transmission protocol architecture in a display scenario according to an embodiment of this application.

Based on the protocol architecture shown in FIG. 10, as shown in FIG. 12, in the display scenario, a data transmission direction of the protocol architecture is from an AP end to a DDIC end. After the AP end obtains data, a control bus controls an application layer 1001 at the AP end to generate pixel data or embedded data to be transmitted to a protocol layer 1002 for data packing. Then, a data packet is sent by a physical layer 1003 to a physical layer 1006 at the DDIC end for transmission to a protocol layer 1005 for data packet unpacking, and transmitted to an application layer 1004. Main functions of the protocol layers at the AP end and the DDIC end include packing and unpacking of the pixel data, generation, check and report of a data packet header and an ECC, and generation, check and report of a CRC and a data packet footer. An implementation sequence of functions of the protocol layer 1002 at the AP end and the protocol layer 1005 at the DDIC end is not limited in this embodiment of this application. For specific steps of data transmission in the display scenario, refer to related content of the procedure shown in FIG. 37 below. Details are not described herein again.

Figure 13:
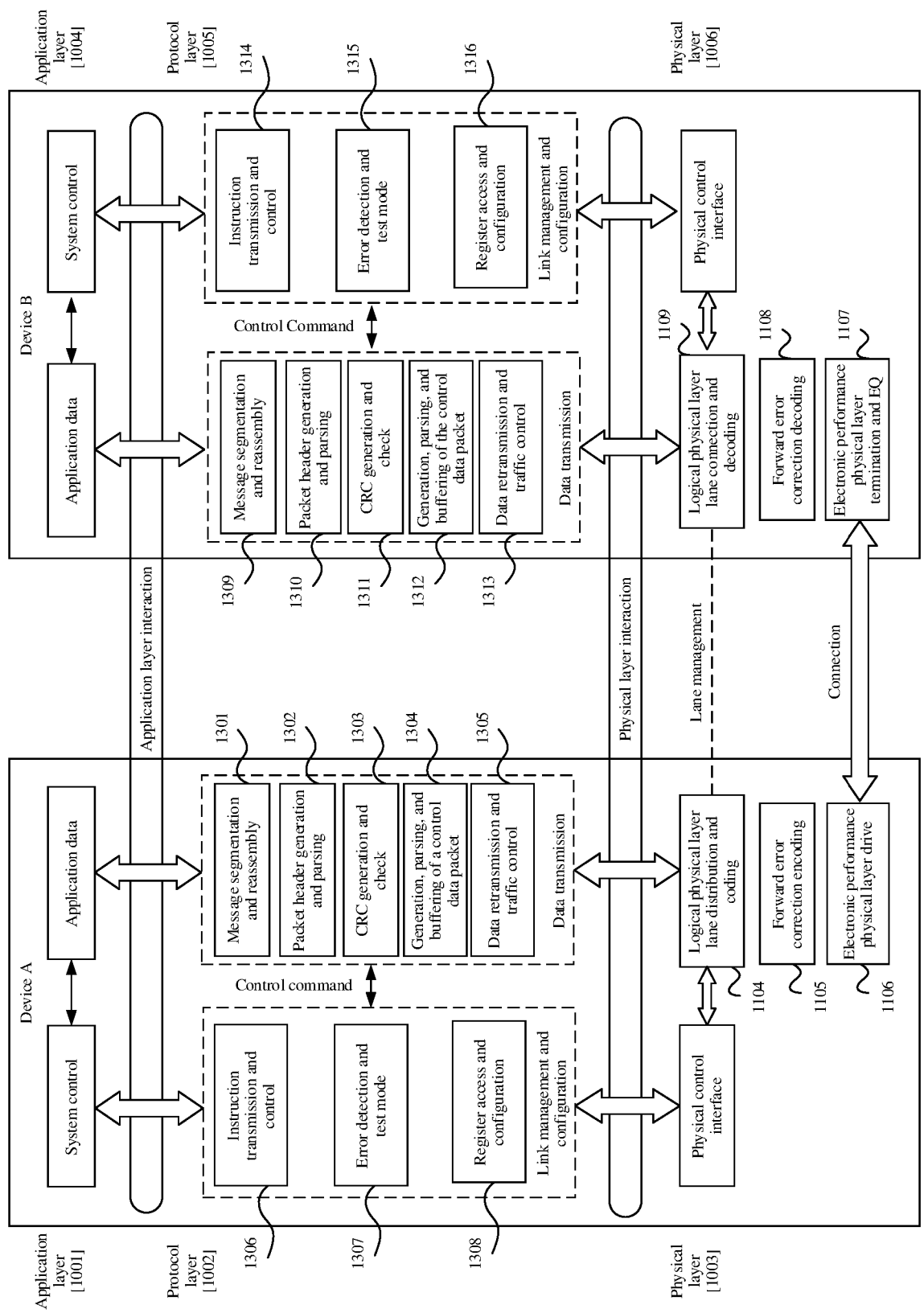
FIG. 13 is a schematic diagram of a data transmission protocol architecture in a storage scenario according to an embodiment of this application.

Based on the protocol architecture shown in FIG. 10, as shown in FIG. 13, in the storage scenario, a data transmission direction of the protocol architecture is bidirectional transmission, and application data between two devices can be mutually transmitted, to implement data storage. The protocol layer is mainly divided into two parts. One part is a data transmission part, and main functions include a message segmentation and reassembly function, a packet header format generation and parsing function, a CRC generation and check function, a control data packet generation, a parsing and data buffering function, and a data retransmission and traffic control function. The other part is a link management and configuration part, and main functions include an instruction transmission and control function, an error detection and test mode function, a register access and configuration function. The protocol layer is mainly configured to implement a data packing and unpacking process. An implementation sequence of the functions is not specifically limited in this embodiment of this application. For specific steps of data transmission in the storage scenario, refer to related content of the procedure shown in FIG. 38 below. Details are not described herein again.

Further, for ease of the following description, protocols of interfaces in different scenarios are defined as a consuming electronic device interface (CEDI) standard protocol. Specifically, the standard protocol may be divided into two parts: a physical layer protocol and a protocol layer protocol. A physical layer (PHY) protocol includes a C-PHY, a D-PHY, and an M-PHY. A protocol layer protocol includes a dedicated protocol formulated for a camera, such as the CEDI protocol for camera (PRL-C), a dedicated protocol formulated for a display, such as the CEDI protocol for display (PRL-D), and a dedicated protocol formulated for a memory, such as the CEDI protocol for storage (PRL-S). The CEDI standard protocol is a protocol standard used to standardize interface transmission, and may also be described as an electronic device interface standard, an interface standard protocol, or the like. This is not specifically limited in this embodiment of this application.

It can be learned that, compared with that in a MIPI protocol architecture, in the protocol architecture provided in embodiments of this application, for the point-to-point transmission scenario, a physical adapter layer, a data link layer, a transport layer, and a network layer are not distinguished. Based on the general protocol architecture, data packing and unpacking processes can be implemented at the protocol layer in each data transmission scenario, to complete data transmission. In other words, the PRL-C, the PRL-D, and the PRL-S may be directly combined to implement transmission in three modes in a same link structure.

In view of this, in the protocol architecture provided in embodiments of this application, a necessary function is directly implemented by using the protocol layer, thereby simplifying the protocol architecture and eliminating redundant functions. Further, simplification of a circuit structure and functions can reduce logic resources by about 18.7% and power consumption by about 9.6%.

In addition, in this embodiment of this application, data coding can be performed in a 128B/132B coding manner, and coding efficiency reaches 96.97%. However, a coding manner used in the MIPI protocol architecture is 8B10B, and has a low coding efficiency of 80%. Therefore, compared with the MIPI protocol architecture, the protocol architecture provided in embodiments of this application can improve coding efficiency by 17%. In addition, based on the high coding efficiency, data transmission efficiency can be further improved.

Figure 32:
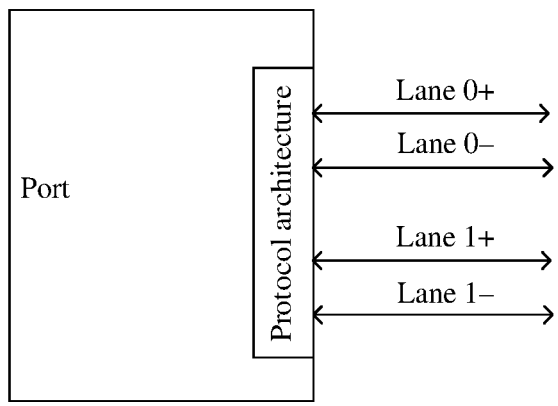
FIG. 32 is a schematic diagram of a structure of a link port according to an embodiment of this application.

In some embodiments, the protocol layer in the protocol architecture provided in embodiments of this application can be established based on various physical layers, and different physical layers have corresponding physical layer matching interfaces. Main functions of the physical layer include, for example, a lane distribution and combination function and a forward error correction (FEC) function. For example, as shown in FIG. 31 and FIG. 32, ports in all modules can perform data transmission based on a same physical layer. In this case, only one port A including four pins needs to be configured in an SOC, and data transmission with a camera module, a display module, a storage module may be implemented through physical layer multiplexing. In this way, costs at the physical layer are reduced, and links at the physical layer are reduced.

For example, based on the protocol architectures shown in FIG. 11, FIG. 12, and FIG. 13, it can be learned that, in different scenarios, physical layers in the protocol architectures are unified. In addition, the physical layer has the lane distribution and combination function. As shown in FIG. 11, the physical layer 1003 at the transmitter has a logical physical layer lane distribution and coding function 1104, and the physical layer 1006 at the receiver has a logical physical layer lane distribution and coding function 1109. In addition, the physical layer supports the forward error correction function. As shown in FIG. 11, the physical layer 1003 at the transmitter supports a forward error correction code encoding function 1105, and the physical layer 1006 at the receiver supports a forward error correction code decoding function 1108.

Optionally, for example, the physical layer in the protocol architecture provided in embodiments of this application is implemented as a serializer-deserializer (Serdes) architecture. A serializer is also referred to as a transmitter (Tx) in the Serdes architecture, and a deserializer is also referred to as a receiver (Rx) in the Serdes architecture.

A single-lane rate of the protocol architecture provided in embodiments of this application based on the Serdes architecture is 16 Gbps, and a single-lane rate of the MIPI protocol architecture is 11.6 Gbps. In comparison, the single-lane rate is improved by 37%. Further, Serdes is a time-division multiplexing (TDM) and point-to-point communication technology. To be specific, the transmitter converts a plurality of low-speed parallel signals into high-speed serial signals for sending, and transmits the signals through a transmission medium (for example, an optical cable or a copper wire). Finally, the receiver converts the high-speed serial signals into low-speed parallel signals after receiving the signals. Therefore, compared with that in the MIPI protocol architecture, in the protocol architecture provided in embodiments of this application, a differential signal instead of a single-end signal is used for transmission, thereby enhancing an anti-interference capability of a link. A clock and data recovery technology is used to replace simultaneous transmission of data and a clock, thereby resolving a problem of signal clock offset that limits a data transmission rate. A coding technology is used to reduce a signal distortion and improve an anti-interference capability of a signal. A pre-emphasis and equalization technology is used to compensate a high-frequency loss of the signal, thereby enhancing a transmission recovery capability of the signal.

Therefore, a unified physical layer is used for the PRL-C, the PRL-D, and the PRL-S. Physical layer interfaces do not need to be separately configured, and a unified physical layer interface is configured. Therefore, costs at the physical layer can be reduced, and a circuit structure at the physical layer can be reduced. In a physical implementation of a circuit design, only four pins are required to be separately connected to the camera module, the display module, the storage module, and the SOC, and a plurality of devices may be connected in series. Compared with the MIPI protocol architecture, the protocol architecture provided in embodiments of this application has characteristics of low power consumption and low electromagnetic interference (EMI), and can implement fast wakeup and a minimal circuit design. For example, the PRL-S has a 20 percent reduction in circuit area compared to the Unipro.

Figure 14:
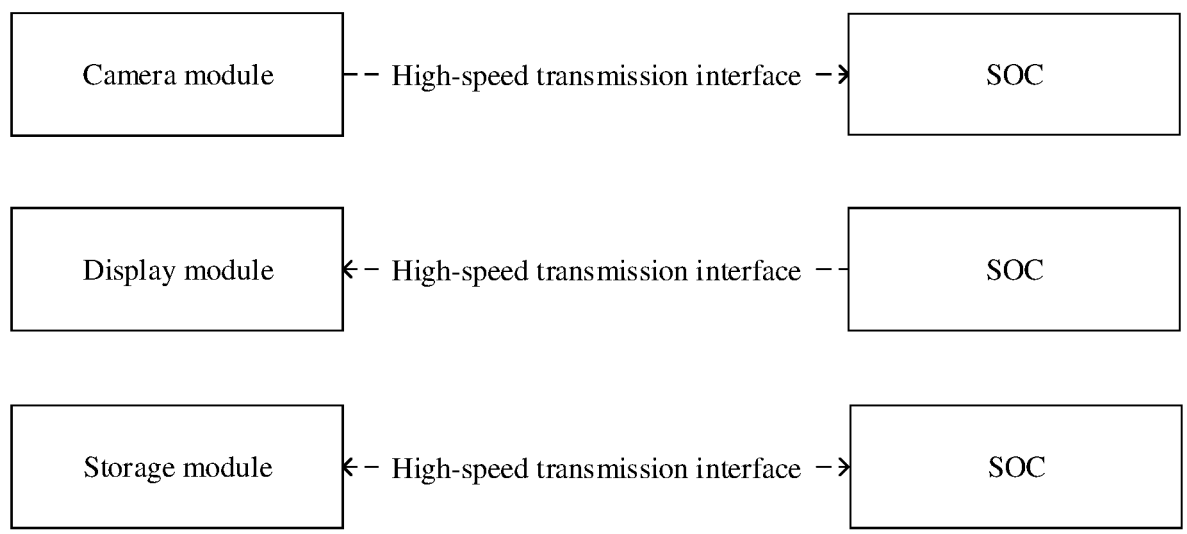
FIG. 14 is a schematic diagram of a point-to-point transmission scenario according to an embodiment of this application.

For example, with reference to the descriptions of FIG. 10, FIG. 11, FIG. 12, and FIG. 13, the protocol architecture provided in this embodiment of this application has a simplified three-layer architecture. As shown in FIG. 14, in a point-to-point transmission scenario, the protocol architecture can support any unidirectional or bidirectional high-speed data transmission, and is applicable to scenarios such as photographing, display, and storage. A plurality of different functions are implemented in the same protocol architecture, a circuit structure is simplified, and a requirement of a light and thin design of some electronic devices is met.

It should be noted that FIG. 14 is a schematic diagram of a transmission scenario between modules and SOCs, where the SOCs need to be a same SOC. FIG. 14 is used to show that the camera module, the display module, and the storage module may perform high-speed data transmission with the SOC, and is not used to limit a circuit connection relationship between the modules and the SOC.

Figure 15:
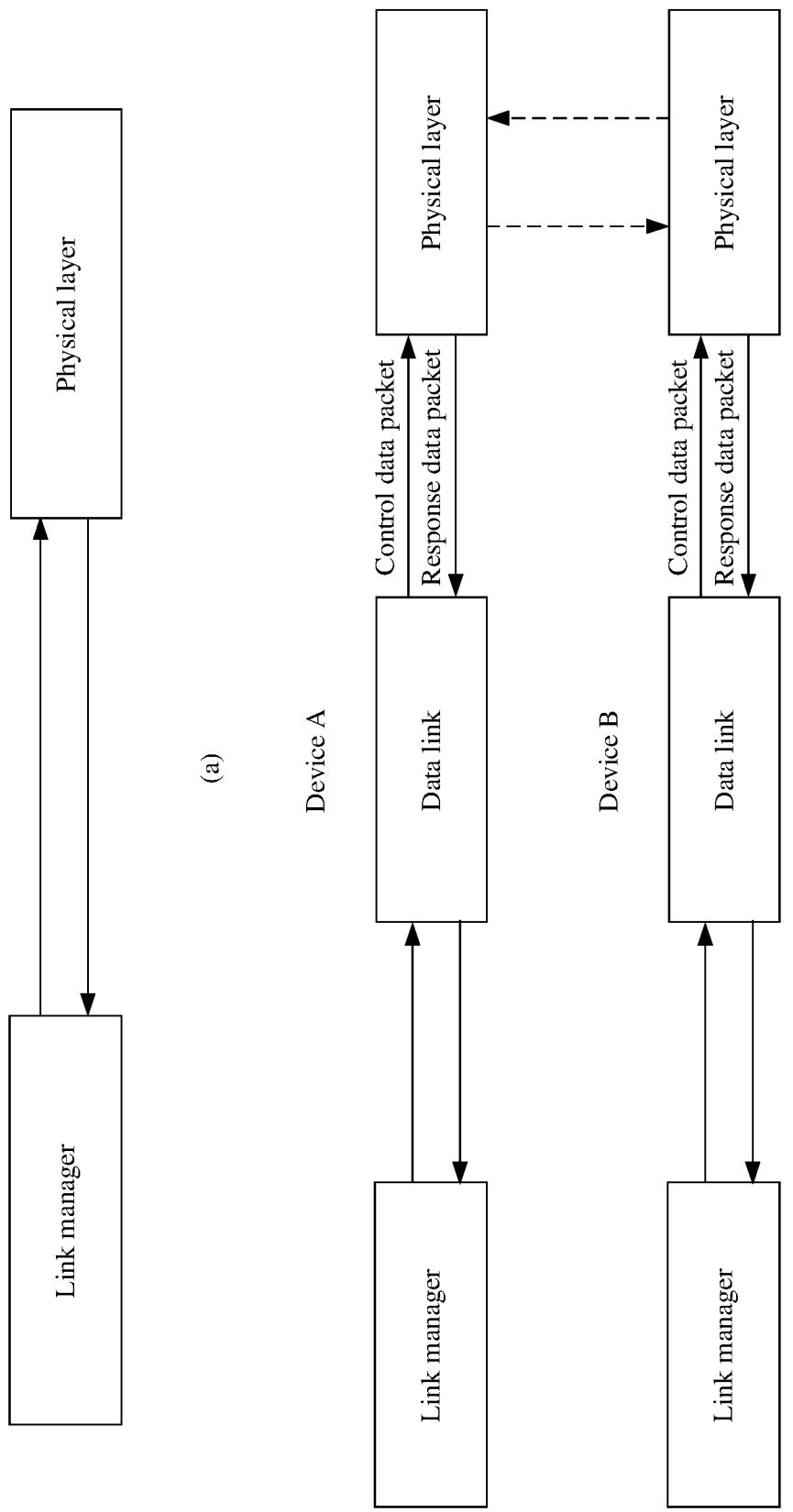
FIG. 15 is a schematic diagram of link management according to an embodiment of this application.

In some embodiments, in a data transmission process, a transmission link needs to be managed. Generally, link management includes two scenarios. One scenario is data transmission within a module, where physical layer links need to be managed. For example, as shown in (a) in FIG. 15, a link manager delivers a corresponding instruction to the physical layer, and then the physical layer returns a corresponding result. Another link management scenario is data transmission between two modules, where interaction with a data link layer of a peer module is required. For example, as shown in (b) in FIG. 15, a link manager controls a data link layer of a local end (Device A) to send a data control packet to the physical layer, and interacts with a link manager of a peer end (Device B) to obtain a response data packet. The data link layer is the protocol layer in the protocol architecture provided in embodiments of this application, or may be described as a link layer. This is not described in the following.

Therefore, in a link management process provided in this embodiment of this application, based on the simplified protocol architecture, as shown in FIG. 13, the link manager is a module at the protocol layer. Therefore, the link manager manages the data link layer and the physical layer, and communicates with the application layer through a logical interface between the data link layer and the application layer. Compared with the Unipro protocol architecture in which link management is performed by using the DME, and six logical interfaces needs to be added for the DME to communicate with each layer, the link management method provided in this embodiment of this application requires no newly added logical interface. Further, in the link management process, only the data link layer and the physical layer need to be managed, and a link management process is simple, thereby avoiding problems that a link management time is long and a response is not timely caused by multi-layer interaction.

The foregoing describes the protocol architecture and link management-related content provided in embodiments of this application. The following describes a data transmission method based on the protocol architecture.

First, a structure of a data packet in the data transmission process is introduced to ensure efficiency and reliability of data transmission.

In some embodiments, based on the protocol architecture diagrams shown in FIG. 11, FIG. 12, and FIG. 13, the application layer 1001 at the transmitter transmits data to the protocol layer 1002, and the protocol layer 1002 needs to frame segmented data. A required packet header and packet footer are added to a data packet, and then the data packet is sent to the physical layer 1006 at the receiver through the physical layer 1003. The physical layer 1006 at the receiver sends the received data packet to the protocol layer 1005, and the protocol layer 1005 unpacks the data packet to generate segmented and reassembled data to be transmitted to the application layer 1004, to complete data transmission from the transmitter to the receiver. For example, as shown in FIG. 11, the application layer 1001 of the AP generates pixel data or embedded data to be sent to the protocol layer 1002, and the protocol layer 1002 packs the data by using the pixel byte packing formats function 1101. A packet header is generated and added to a data packet by using the packet header and error correction code generation function 1102, and a packet footer is generated and added to the data packet by using the payload CRC and packet footer generation function 1103 to generate a to-be-transmitted data packet. Then, after transmission is performed through the physical layer 1003 and the physical layer 1006, the DDIC protocol layer 1005 receives the data packet, and checks and corrects the data packet by using the packet header correction and report function 1110 and the payload error check and report function 1111. The data packet is unpacked by using the byte to pixel unpacking formats function 1112, and unpacked pixel data or embedded data is sent to the application layer 1004. In this way, a data transmission process in which the camera transmits the pixel data or the embedded data to the AP is completed.

In some embodiments, based on the protocol architecture provided in embodiments of this application, data packets are classified into different "data packet types" based on different functions of signaling in an interface, e.g., whether a system command or payload data is transmitted. For example, a control packet is used to transmit a system command, and a data packet is used to transmit payload data. Each data packet type represents a predefined data packet structure used for a given data packet. Further, each type of data packet has a different function, and therefore the data packet may have a predefined length or a dynamically variable length. Optionally, a sub-packet or a field in the data packet is configured by using a byte value configured with an unsigned integer of 8 bits, 16 bits, or another quantity of bits. Based on flexible extensibility of the interface, a new packet structure may be added or a definition of a data packet field value may be changed based on an actual requirement.

Figure 16:
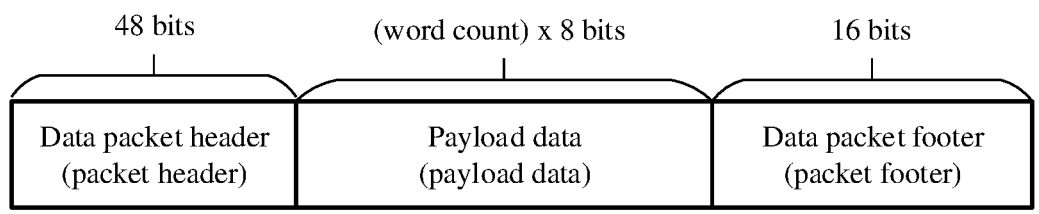
FIG. 16 is a schematic diagram 1 of a structure of a data packet according to an embodiment of this application.
Figure 16:
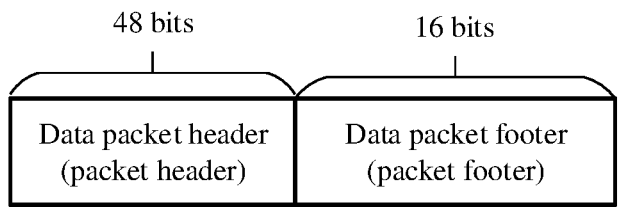

In some embodiments, data packets are classified into a long data packet and a short data packet based on different carried data, and a part that is of a data packet and that has specific information or a specific number is referred to as a sub-packet of the data packet. For example, as shown in (a) in FIG. 16, the long data packet includes a data packet header) sub-packet, a payload data sub-packet, and a data packet footer sub-packet. As shown in (b) in FIG. 16, the short data packet includes a data packet header sub-packet and a data packet footer sub-packet. Specifically, to ensure efficient and reliable transmission of a data packet, transmission of each data packet starts by using a data packet header sub-packet, and transmission of the data packet ends by using a data packet footer sub-packet. Optionally, the data packet header sub-packet occupies 48 bits. The payload data sub-packet occupies a different quantity of bits based on a quantity of payload data. The data packet footer sub-packet occupies 16 bits. It may be understood that a length of a current data packet and lengths of each sub-packet and each field in the current data packet are all examples for description in this embodiment of this application, and details are not described again in the following. In this embodiment of this application, the long data packet and the short data packet are not distinguished by a length of a bit occupied by the data packet.

Figure 17:
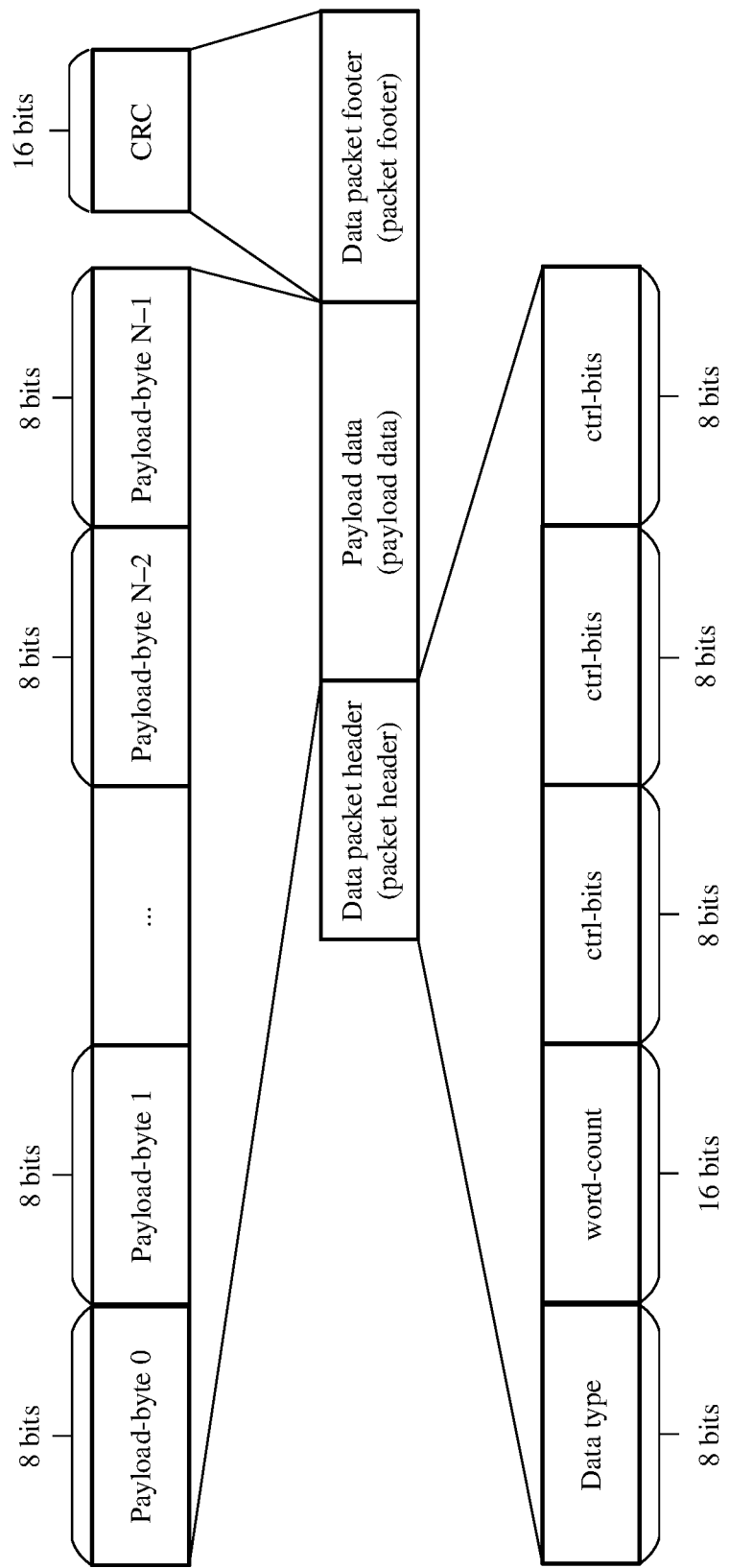
FIG. 17 is a schematic diagram 2 of a structure of a data packet according to an embodiment of this application.

As shown in FIG. 17, a payload sub-packet is a field combination of valid data, and includes some or all data that needs to be transmitted between the transmitter and the receiver. A data transfer format varies based on a data type.

The data packet footer sub-packet includes a CRC field. The CRC field occupies 16 bits, and indicates a cyclic redundancy check result obtained after the transmitter performs error detection on all content of the data packet except the CRC field, to ensure integrity and reliability of the entire data packet. Based on the CRC field, the receiver can determine the integrity of the data packet and a quantity of error bits detected through CRC. Generally, the CRC field is determined by using a CCITT-16 algorithm. For a specific algorithm, refer to the conventional technology. Details are not described again in this embodiment of this application.

In some embodiments, the data packet structure provided in this embodiment of this application can be applied to the camera scenario, the display scenario, and the storage scenario. A value of a field indicates a scenario to which a data packet that is being transmitted is applicable. For example, as shown in FIG. 17, the data packet header sub-packet includes a data type field, a data count (WORD COUNT) field, and a free bit (Ctrl-bits) field. The data type field occupies 8 bits, and indicates a scenario in which the data packet is transmitted. The Ctrl-bits field occupies 24 bits and is used to form different data packet header formats based on different photographing, display, and storage scenarios to implement functions required by the different scenarios. The data count field occupies 16 bits and is information in a basic unit in a byte value form. The information indicates a quantity of bytes occupied by the payload sub-packet in the data packet.

For example, Table 2 shows application scenarios of a transmitted data packet, data packet types, and meanings represented by the data packet when a data type field has different values. A value of the data type field being 0x01 to 0x1F (e.g., 01h to 1Fh) indicates that the transmitted data packet is a display protocol packet. A value of the data type field being 0x20 to 0x4F (e.g., 20h to 4Fh) indicates that the transmitted data packet is a camera protocol packet. A value of the data type field being 0x50 to 0x7F (e.g., 50h to 7Fh) indicates that the transmitted data packet is a storage protocol packet. A value of the data type field being 0x80 to 0x8F (e.g., 80h to 8Fh), 0x90 to 0x9F (e.g., 90h to 9Fh), and 0xA0 to 0xAF (e.g., A0h to AFh) respectively corresponds to user-defined camera, storage, and display data packets. A value of the data type field being 0xB0 to 0xFFF (e.g., B0h to FFh) indicates that the transmitted data packet is in a reserved packet format.

TABLE 2

| Value of the data type field | Application scenario | Data packet type | Meaning |
|---|---|---|---|
| 01h | Display | Short data packet | Start frame synchronization |
| 02h | Display | Short data packet | Start line synchronization |
| 03h to 0Fh | Display | Short data packet | General short packet without a parameter |
| 10h | Display | Long data packet | General short packet with one parameter |
| 11h | Display | Long data packet | General short packet with two parameters |
| 12h | Display | Long data packet | General long packet |
| 13h | Display | Long data packet | Invalid data packet with no data |
| 14h | Display | Long data packet | Blank data packet with no data |
| 15h to 18h | Display | Long data packet | Data packet in a YCbCr pixel stream |
| 19h to 1Fh | Display | Long data packet | Data packet in an RGB pixel stream |

TABLE 2-continued

| Value of the data type field | Application scenario | Data packet type | Meaning |
|---|---|---|---|
| 20h to 2Fh | Camera | Short control packet | Short control packet |
| 30h to 37h | Camera | Long data packet | Data packet with payload data |
| 38h to 3Fh | Camera | Long data packet | YUV data packet |
| 40h to 46h | Camera | Long data packet | RGB data packet |
| 47h to 4Fh | Camera | Long data packet | RAW data packet |
| 50h | Storage | Long data packet | Data packet with payload data |
| 51h | Storage | Short ACK packet | Short control packet indicating correct transmission in data retransmission |
| 52h | Storage | Short ACK traffic control packet | Short control packet used for traffic control |
| 53h | Storage | Short NACK packet | Short control packet indicating a transmission error in data retransmission |
| 54h to 5Fh | Storage | Long data packet | Reserved field, which is to be extended |
| 60h to 7Fh | Storage | Long control packet | Long packet used for link control |
| 80h to 8Fh | Camera | — | User-defined data packet |
| 90h to 9Fh | Storage | — | User-defined data packet |
| A0h to AFh | Display | — | User-defined data packet |
| B0h to FFh | — | Reserved packet | Reserved field, which is to be extended |

Further, in a process of transmitting the data packet, a low-order data bit of a field needs to be transmitted first, and then a high-order data bit of the field is transmitted. In addition, in a same data sub-packet, data bits are sequentially sent based on a field sequence. The interface of the protocol architecture provided in embodiments of this application has flexible extensibility. Therefore, a transmission rule of the field and corresponding bit data may be changed based on an actual requirement.

For example, based on Table 2, the following describes structures of a data packet in different scenarios when a data type field has different values.

Example 1: A value of the data type field is 50h, and the data packet being transmitted is a long data packet used in the storage scenario.

Figure 18:
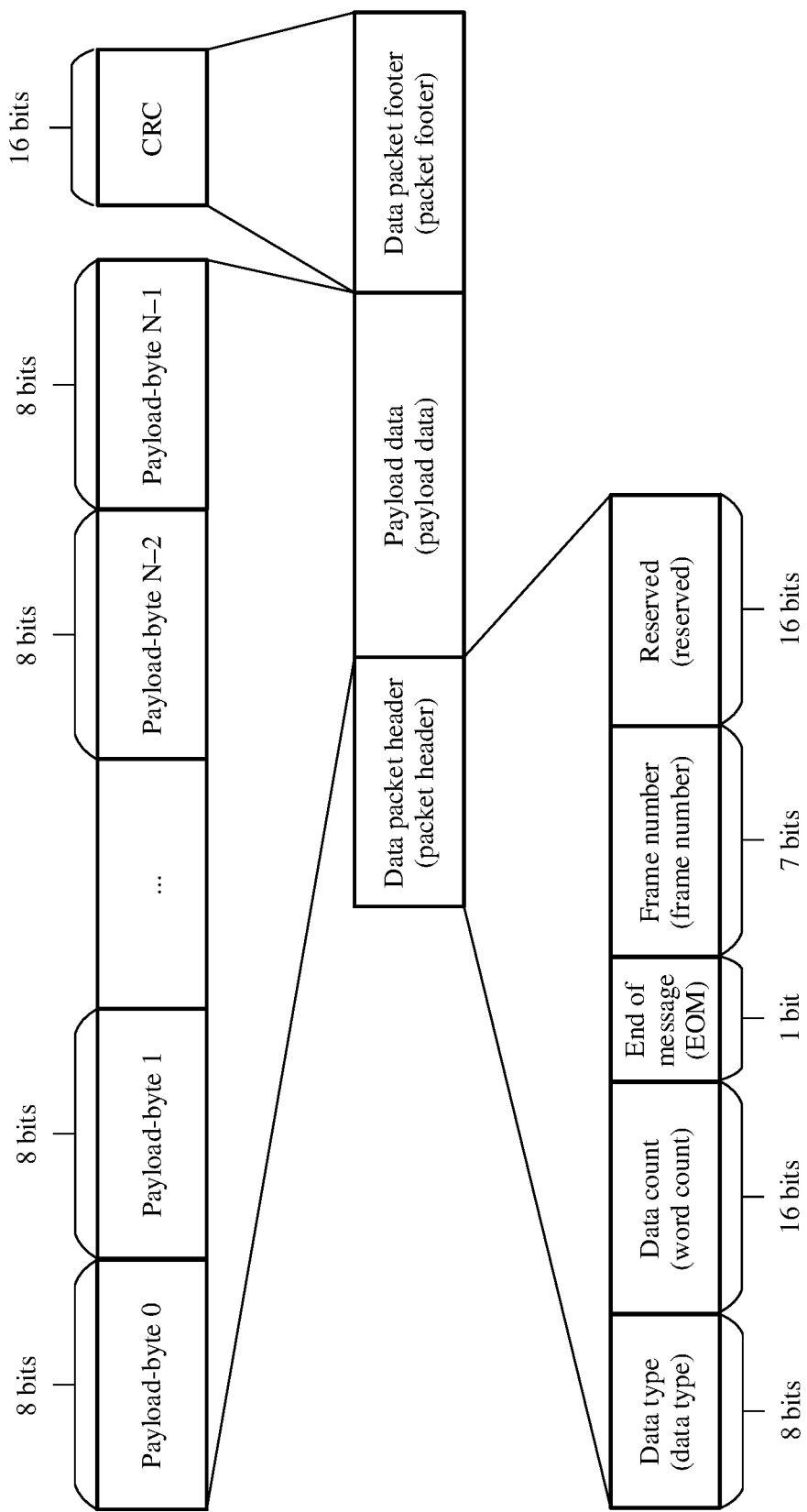
FIG. 18 is a schematic diagram 3 of a structure of a data packet according to an embodiment of this application.

As shown in FIG. 18, data in a data packet payload sub-packet of the data packet is valid storage data sent by a transmitter to a receiver. A data packet header sub-packet is a combination having a common structure or a minimum field. The minimum field includes at least the data type field, a data count field, an end of message (EOM) indication field, a frame number field, and a reserved field.

The end of message indication field occupies 1 bit, and indicates that data stream transmission ends, for example, indicates to the application layer that the data packet being transmitted is a last data packet in a transmitted data stream.

The frame number field occupies 7 bits, and indicates a frame number of the data packet. In this way, the transmitter and the receiver can record the frame number of the data packet, to prevent a loss of the data packet. Generally, a value of the frame number field starts from 1 and is incremented by 1 in sequence until the value reaches 127. Then, the value starts from 0.

Example 2: A value of the data type field is 51h or 52h, the data packet being transmitted is used in the storage scenario, and a data packet type is a short acknowledgment (ACK) packet in a short control packet, and indicates that the data packet is correctly received.

Figure 19:
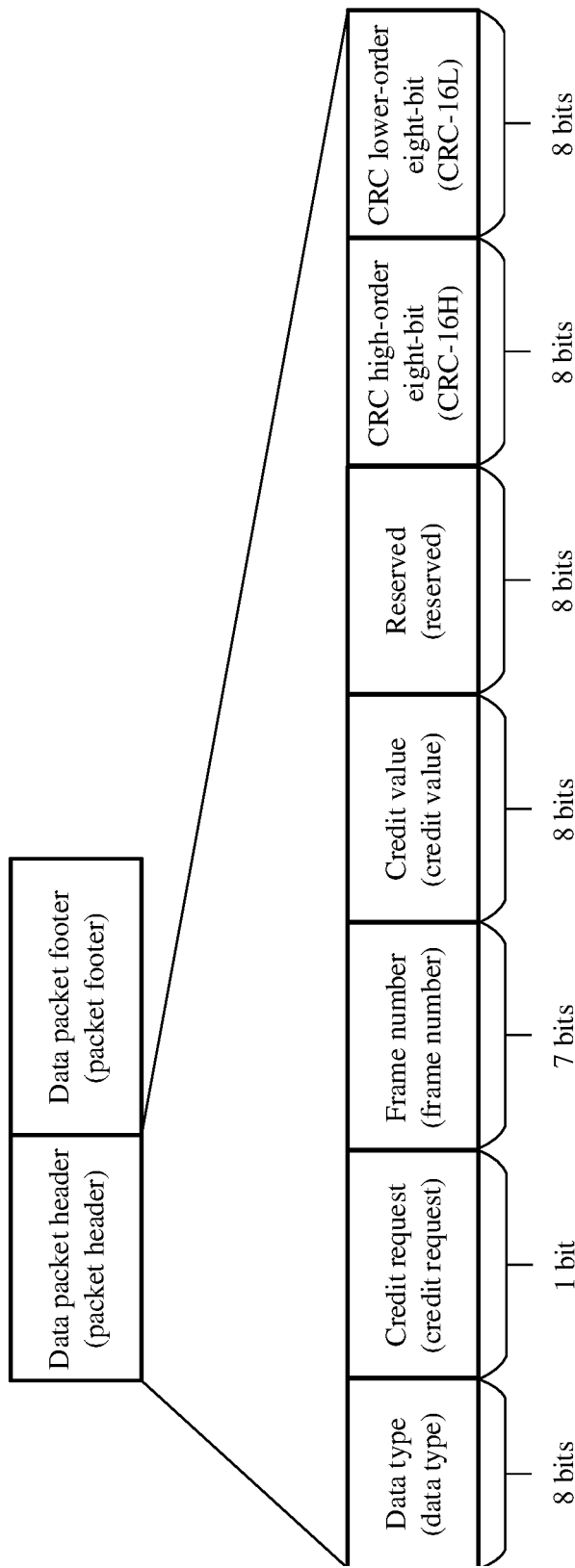
FIG. 19 is a schematic diagram 4 of a structure of a data packet according to an embodiment of this application.

For example, as shown in FIG. 19, a data packet header sub-packet in the data packet includes the data type field, a credit request (CReq) field, a frame number field, a credit value field, a reserved field, a CRC high-order eight-bit (CRC-16H) field, and a CRC low-order eight-bit (CRC-16L) field.

The CReq field occupies 1 bit, and is used to perform traffic control on transmitted data.

The frame number field occupies 7 bits. For a function of the frame number field, refer to the related description in the example 1. Details are not described herein again.

The credit value field occupies 16 bits, and indicates a credit value of the data packet.

The CRC-16H field occupies 8 bits, and indicates a value of 8 high-order bits of a cyclic redundancy check code.

The CRC-16L field occupies 8 bits, and indicates a value of 8 low-order bits of the cyclic redundancy check code.

Example 3: A value of the data type field is 53h, the data packet being transmitted is used in the storage scenario, and a data packet type is a short negative acknowledgment (NACK) packet in a short control packet, and indicates that the data packet is received abnormally.

Figure 20:
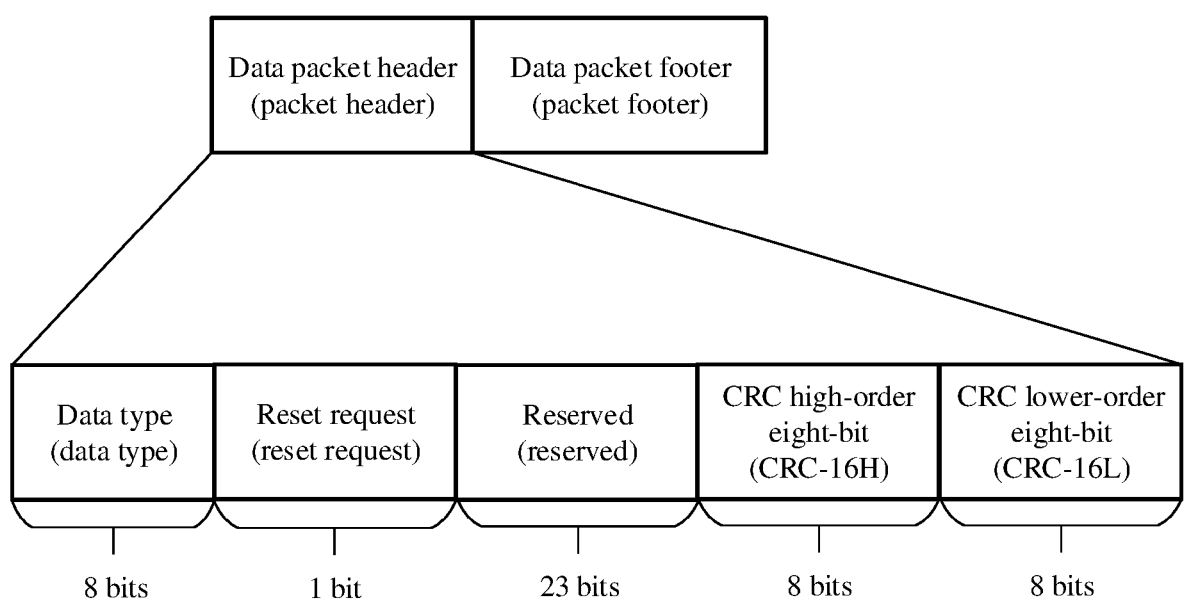
FIG. 20 is a schematic diagram 5 of a structure of a data packet according to an embodiment of this application.

For example, as shown in FIG. 20, a data packet header sub-packet in the data packet includes the data type field, a reset request (RReq) field, a reserved field, a CRC high-order eight-bit (CRC-16H) field, and a CRC low-order eight-bit (CRC-16L) field.

The RReq field occupies 1 bit. For a function of the RReq field, refer to the related description of the CReq field in the example 2. Details are not described herein again.

Example 4: A value of the data type field is 10h to 1Fh, and the data packet being transmitted is a long data packet used in the display scenario. Alternatively, a value of the data type field is 30h to 4Fh, and the data packet being transmitted is a long data packet used in the camera scenario. A data packet structure of the long data packet in the display scenario is the same as that in the camera scenario.

Figure 21:
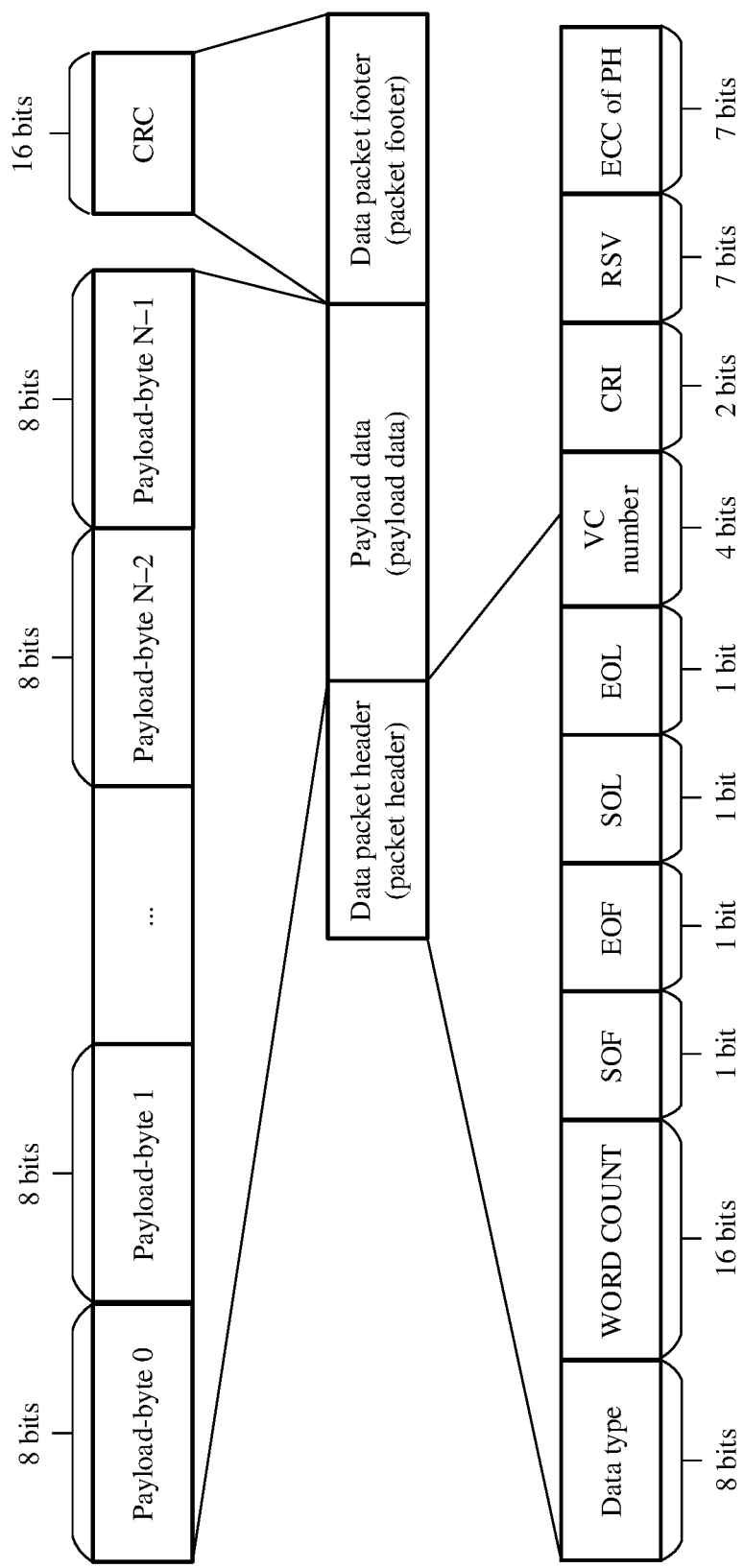
FIG. 21 is a schematic diagram 6 of a structure of a data packet according to an embodiment of this application.

For example, as shown in FIG. 21, a data packet header sub-packet in the data packet includes the data type field, a data count field, a start of frame (SOF) field, an end of frame (EOF) field, a start of line (SOL) field, an end of line (EOL) field, a virtual channel (VC) number field, a cyclic running index (CRI) field, a reserved (RSV) field, and a packet header (PH) error correction code (ECC) field.

The SOF field occupies 1 bit, and indicates a start flag of frame data.

The EOF field occupies 1 bit, and indicates an end flag of a frame of data.

The SOL field occupies 1 bit, and indicates a start flag of a line of data.

The EOL field occupies 1 bit, and indicates an end flag of a line of data.

The VC field occupies 4 bits, and indicates a lane to which the transmitted data packet belongs.

The CRI field occupies 2 bits, and indicates a cycle count of the data packet.

The packet header error correction code field occupies 7 bits, is used for error detection and correction of packet header data, and can implement 1-bit error correction and 2-bit error detection at the same time.

Example 5: A value of the data type field is 01h to 0Fh, and the data packet being transmitted is a short data packet used in the display scenario. Alternatively, a value of the data type field is 20h to 2Fh, and the data packet being transmitted is a short data packet used in the camera scenario. A data packet structure of the short data packet in the display scenario is the same as that in the camera scenario.

Figure 22:
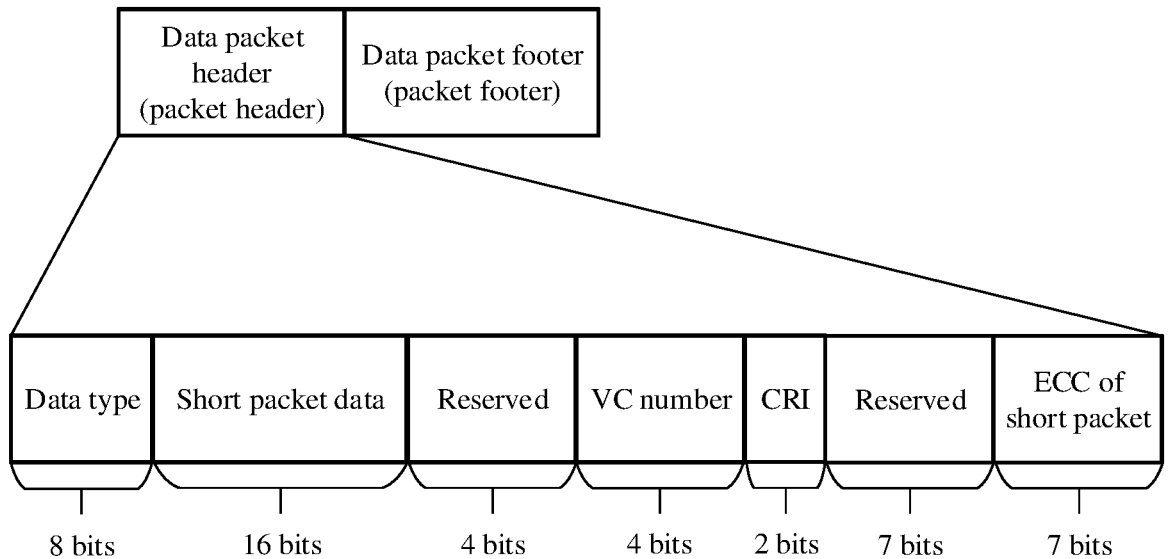
FIG. 22 is a schematic diagram 7 of a structure of a data packet according to an embodiment of this application.

For example, as shown in FIG. 22, a data packet header sub-packet in the data packet includes the data type field, a short packet data field, a reserved field, a virtual channel number (VC number) field, a CRI field, and an error correction code of short packet (ECC of short packet) field.

The short packet data field occupies 16 bits, and is valid data of the short packet.

The error correction code of short packet field occupies 7 bits, and is used for error detection and correction of data in the short data packet.

For functions of the virtual channel number field and the CRI field, refer to the related description in the example 4. Details are not described herein again.

Therefore, based on the same protocol architecture, a general data packet structure applicable to the camera scenario, the display scenario, and the storage scenario is configured, and the data type field in the data packet is used to identify the application scenario of the data packet. Compared with the conventional technology in which different scenarios correspond to different protocol architectures, and data of different data packet structures is transmitted, this embodiment of this application provides the protocol architecture and the general data packet structure, so that circuit complexity and the circuit area can be effectively reduced, thereby reducing circuit power consumption and improving transmission efficiency.

For example, based on the protocol architecture shown in FIG. 13, a transmission process of the long data packet in the storage scenario is described. The application layer 1001 at the transmitter transmits application data to the protocol layer 1002. The protocol layer 1002 packs the application data by using a message segmentation and reassembly function 1301, adds a data type field, a frame number field, an end of message indication field, and a data count field to a packet header of a data packet by using a packet header generation and parsing function 1302, and adds a cyclic redundancy check field to a packet footer of the data packet by using a CRC generation and check function 1303. The protocol layer 1002 frames the data packet to form a complete data packet, and then transmits the data packet to the physical layer 1006 at the receiver through the physical layer 1003.

Correspondingly, after receiving the data packet transmitted by the physical layer 1006, the protocol layer 1005 at the receiver distinguishes whether the data packet is a data packet or a control packet based on the data type field in the packet header by using a packet header generation and parsing function 1310. If the data packet is a data packet, packet format parsing is performed on the packet header by using the packet header generation and parsing function 1310. Alternatively, if the data packet is a control packet, an operation and a response are performed based on specific content of the control packet. In the current scenario, the transmitted data packet is a long data packet. Therefore, packet format parsing is performed on the packet header by using the packet header generation and parsing function 1310. The protocol layer 1005 reports an error to a link management part based on the cyclic redundancy check field by using a CRC generation and check function 1311, and reassembles the data packet by using a message segmentation and reassembly function 1309. In this way, the protocol layer 1005 completes a data packet unpacking process, and sends the application data generated after the unpacking to the application layer 1004, to complete transmission of the long data packet in the storage scenario.

In the foregoing general data packet structure, data is transmitted between layers, and 128B/132B coding is supported. Compared with the protocol architecture in the conventional technology in which each layer of data transmitted in a data packet structure is different, a data relationship corresponding to each layer exists, and a function format is complex, the protocol architecture and the general data packet structure provided in this embodiment of this application facilitates interaction, and can improve transmission efficiency and reduce a transmission error.

In addition, the transmitter may dynamically select or change a data packet transmission rate based on an actual use requirement without exceeding a maximum transmission capability of the transmitter.

In some cases, the transmitter sends a padding data packet to maintain a data transmission rate of each protocol link or to ensure clock synchronization, to avoid inconvenience caused to the receiver for correct decoding. In addition, because each data packet is transmitted from a data packet header sub-packet, the padding data packet may be inserted after a payload data sub-packet or a data packet footer sub-packet.

The foregoing describes the structure of the data packet transmitted based on the protocol architecture provided in embodiments of this application, and a framing and deframing process of the data packet in the transmission process. The following describes possible error types and retransmission mechanisms in the data transmission process.

In some embodiments, it can be learned from the foregoing description of the protocol architecture that the protocol architecture can combine the PRL-C, PRL-D, and PLR-S protocol architectures. Correspondingly, error types of the protocol architectures can also be combined. Therefore, the error types are reduced. In addition, the protocol architecture has a simple structure, and error processing complexity and difficulty are reduced, so that error processing efficiency can be improved, and a better error processing result can be obtained.

For example, Table 3 shows types of errors that may be generated in the protocol architecture provided in embodiments of this application. An error of entering a high-speed transmission state (enter hs request, EHR) is detected by a physical layer of a device, and other errors are detected by a data link layer of the device. After the error shown in Table 3 occurs, the device stores an error state in a register whose control interface address space is 0x0001. Error types corresponding to different bit values are shown in Table 3. After the error is reported, the error state is cleared.

It should be noted that the bit values and the corresponding error types are merely examples for description, and setting and updating of a value in the register may be changed based on an actual situation. In addition, after an error occurs and is reported, the device can take a solution based on an actual situation. This is not specifically limited in this embodiment of this application.

TABLE 3

| bit | Error type |
| --- | --- |
| 0 | EHR error |
| 1 | ECC error, 1 bit |
| 2 | ECC error, a plurality of bits |
| 3 | CRC error |
| 4 | Data type identification error |
| 5 | Virtual channel ID identification error (applicable to the display scenario and the camera scenario) |
| 6 | Transmission length error |
| 7 | Frame synchronization error (applicable to the display scenario and the camera scenario) |
| 8 | Frame data error |
| 9 | Receiver timeout |
| 10 | Frame number error (applicable to the storage scenario) |
| 11 | Count error |
| 12 | Unknown error |
| 11 to 15 | Reserved |

As shown in Table 3, the EHR error means that if an error occurs in a sequence of an EHR and is detected by the physical layer, the EHR error needs to be recorded and reported regardless of whether the error occurs in one bit of data or a plurality of bits of data. For example, a display device needs to report an EHR error when an AP queries an error state. It should be noted that even if the error occurs in the EHR, a subsequent bit (such as a synchronization code or a training code) of an error bit in the EHR and a subsequent data packet may still be correct, but confidence in data packet integrity is reduced.

The ECC error (1 bit) means that if a one-bit error is found in an ECC field in a data packet header and is corrected, the ECC error (1 bit) is recorded and reported. In other words, if the ECC error (1 bit) occurs, even if information in the packet header is corrected, the ECC error (1 bit) is still reported, for example, to an application layer of the display device and the AP.

The ECC error (a plurality of bits) means that if a multi-bit error is found in the ECC field in the data packet header, the ECC error (a plurality of bits) is recorded and reported. When the ECC error (a plurality of bits) occurs, the information in the data packet header is corrupted. Further, such an error is usually accompanied by a CRC error, and therefore the data link layer of the transmitter needs to be notified.

The CRC error means that if a CRC calculated by the device is inconsistent with a received CRC, the CRC error is reported. When the CRC error occurs, the data link layer needs to be notified that payload data is corrupted.

The data type identification error means that when a data type received by the device is inconsistent with an expected data type, the data type identification error is recorded and reported.

The virtual channel ID identification error means that when a virtual channel ID received by the device is inconsistent with an expected virtual channel ID, the data type identification error is reported.

The transmission length error means that when a data payload length received by the device is inconsistent with a length indicated by a data count field in the packet header, the transmission length error is recorded and reported.

The frame synchronization error means that when the device detects that a frame synchronization end cannot be paired with a frame synchronization start, the device records and reports the frame synchronization error.

The frame data error means that after frame synchronization ends, if an error occurs in the frame of data, the frame data error needs to be recorded and reported.

The receiver timeout error means that if a receiver does not receive data within preset time, the receiver timeout error is recorded.

The frame number error means that when a frame number recorded in stored data is inconsistent with an actual frame number, the frame number error is reported.

The count error means that when a data quantity indicated by a data record field is inconsistent with an actual data quantity, the count error is recorded and reported.

In some scenarios, if the error occurs in data transmission, data retransmission may need to be performed. Therefore, a data retransmission mechanism is described based on the protocol architecture provided in embodiments of this application.

In some embodiments, in a system architecture provided in this embodiment of this application, the data link layer needs to support data retransmission. In this case, a sufficient buffer needs to be deployed at the data link layer to buffer a data packet that is being transmitted. A size of the buffer is defined by the register. For example, the size of the buffer is 4096 bytes.

Figure 23:
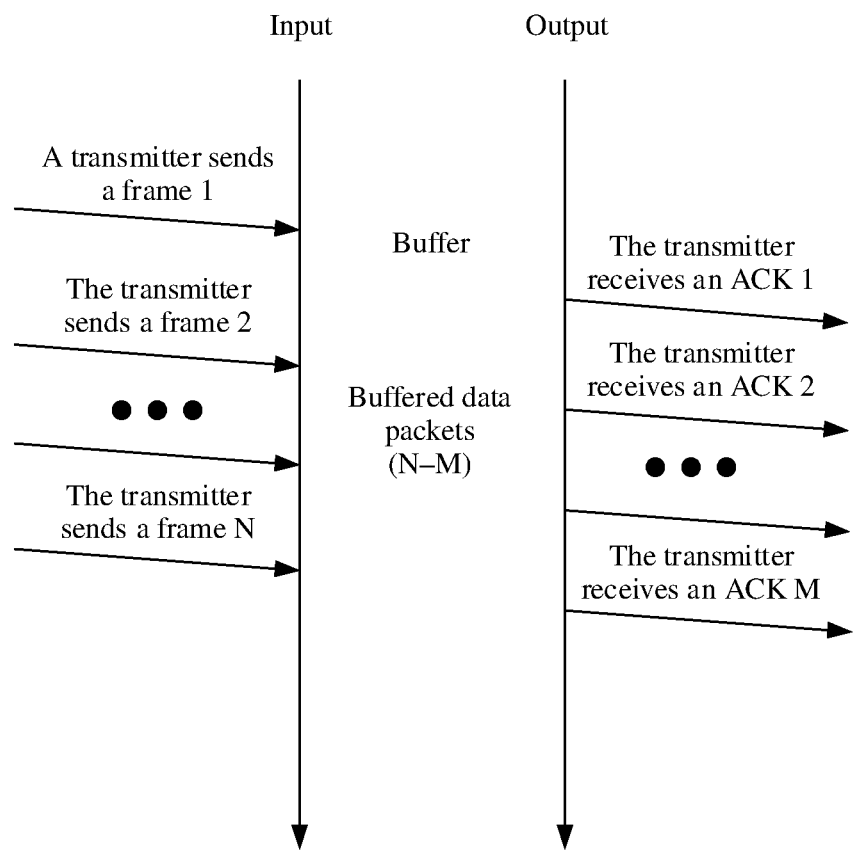
FIG. 23 is a schematic diagram of data buffering at a transmitter according to an embodiment of this application.

For example, each time the transmitter (e.g., a local end device) sends a data packet, the transmitter (e.g., the local end device) stores data in the buffer. In addition, sent data packets are strictly sorted based on frame numbers. Further, each time the transmitter receives an ACK packet corresponding to a frame number, the transmitter fetches buffered data corresponding to the frame number from the buffer. As shown in FIG. 23, if the transmitter sends N data packets (e.g., N data frames), and receives M corresponding ACK packets, there are (N−M) data packets in the buffer. N and M are positive integers, and M≤N.

Figure 24:
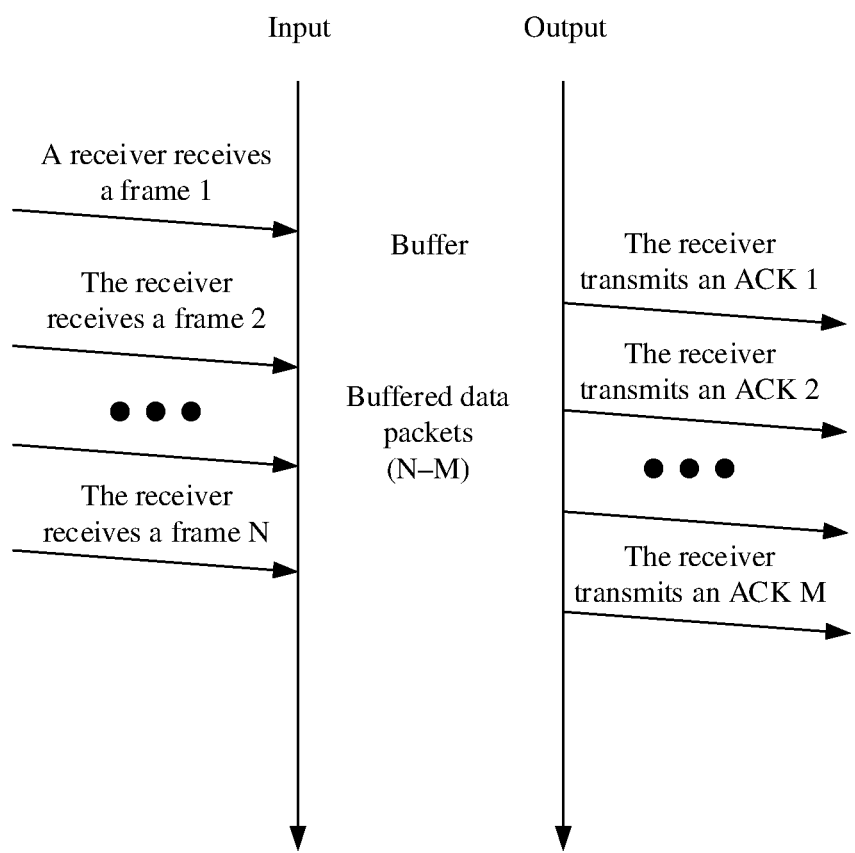
FIG. 24 is a schematic diagram of data buffering at a receiver according to an embodiment of this application.

Correspondingly, for the receiver (e.g., a peer end device), each time a data packet sent by the transmitter is received, the receiver first determines whether a frame number is strictly arranged. If the frame number is correct and strictly arranged, the frame number is buffered in the buffer of the receiver, and an ACK packet corresponding to the frame number is fed back to the transmitter. If the received frame number is incorrect, data frame receiving is stopped, and a NACK packet is fed back to the transmitter. Further, each time the receiver feeds back an ACK packet corresponding to a frame number, the receiver fetches corresponding buffered data packet from the buffer. As shown in FIG. 24, if the receiver receives N data packets (e.g., N data frames) and sends M corresponding ACK packets, there are (N−M) data packets in the buffer.

In some embodiments, after receiving a data packet, the data link layer of the receiver first stores the data packet in the buffer. If the received data packet has no error (for example, a CRC error or a length error), the data link layer of the receiver feeds back an ACK packet to the transmitter, and fetches the data packet from the buffer.

Figure 25:
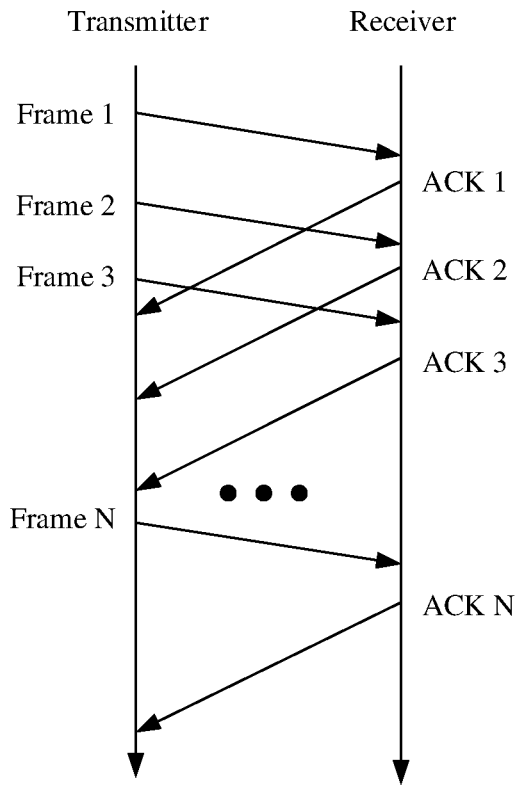
FIG. 25 is a schematic diagram of an ACK feedback mechanism according to an embodiment of this application.

For example, as shown in FIG. 25, after receiving a correct data packet, the receiver places a frame number of the data packet as a parameter in an ACK packet, and feeds back the frame number to the transmitter. Alternatively, after receiving a group of data packets, the data link layer of the receiver correspondingly returns one ACK packet that includes a frame number of a packet footer of the group of data packets, to indicate that all data packets before the frame number are correctly received. When data packet reception is determined by using a group, the ACK packet can be fed back only when it is ensured that all data packets of the group are normally received. Further, a maximum value is preset. In a subsequent grouping and determining process, a quantity of data packets in a group cannot exceed the preset maximum value. For example, if the preset maximum value is 16, a maximum quantity of data packets that are grouped into a group and determined at the same time is 16. The preset maximum value may be modified based on a specific implementation. In the grouping and determining process, if an error occurs, the receiver returns a frame number of a last data packet that is correctly received, and sends a NACK packet. In this way, the transmitter can determine a frame number of an abnormal data packet, and retransmits data packets from the frame number.

In some embodiments, if an exception occurs in a process in which the data link layer at the receiver receives the data packet, and it is determined that the data packet is incorrectly received, the data link layer feeds back a NACK packet to the transmitter device, and discards the data packet. For example, Table 4 shows some possible causes of a data packet reception error. If a data packet is incorrectly received due to an abnormal physical layer state, as shown in FIG. 20, a reset request (RReq) field is set to 1. If a data packet is incorrectly received due to another error cause, an RReq field is set to 0.

TABLE 4

| No. | Error Cause |
|---|---|
| 1 | CRC check performed on a received data packet fails |
| 2 | The buffer at the receiver overflows |
| 3 | A frame number of a received data packet does not match a frame number that needs to be received |
| 4 | A length of payload data in a data packet does not match a length indicated by a data count field in a data packet header |
| 5 | Packet lengths of ACK and NACK packets are incorrect |
| 6 | An invalid packet type is received |
| 7 | The physical layer state is abnormal |

Figure 26:
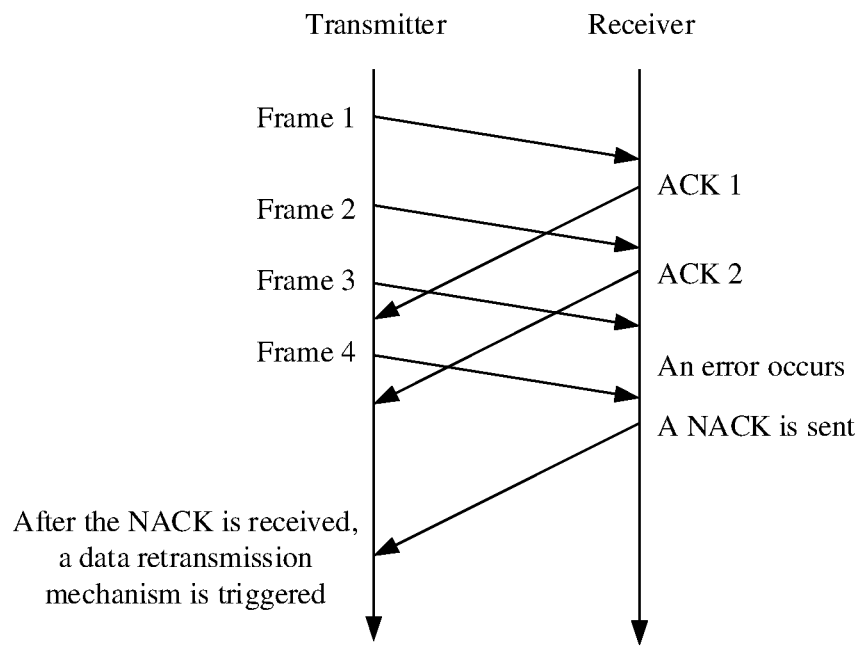
FIG. 26 is a schematic diagram of a NACK feedback mechanism according to an embodiment of this application.

Correspondingly, as shown in FIG. 26, if the transmitter receives a NACK fed back by the receiver, the retransmission mechanism is triggered. First, a value of Reset Req (e.g., the reset request field) is determined. If Reset Req=1, link repair is directly performed, and then data retransmission is performed. If Reset Req=0, the physical layer state needs to be first obtained. If the physical layer state is normal, data is directly retransmitted. If there is an error in the fed-back physical layer state, link repair is first performed, and then the data is retransmitted.

In some embodiments, the transmitter and the receiver manage the frame number of the transmitted data packet. As described in the foregoing description of the data packet structure, the frame number indication field included in the data packet header sub-packet occupies 7 bits, and indicates the frame number of the transmitted data packet. A value range of the frame number is 0 to 31. When sending each data packet, the transmitter needs to pack a frame number in a data packet header. Correspondingly, after receiving the data packet, the receiver determines that a sequence of the frame number indicated in the data packet matches a sequence of a locally recorded frame number. When an ACK packet is fed back, the frame number is increased by 1 and then packed into the ACK packet, and is sent to the transmitter. After the transmitter sends a data packet whose frame number is 31, a frame number value is configured by using a cyclic mechanism within 0 to 31, and the frame number is reset to 0, e.g., a frame number of a next sent data packet is configured to 0. Similarly, the receiver also configures a frame of an ACK packet by using the cyclic mechanism, to ensure that frame numbers at both ends are aligned.

In some embodiments, the retransmission mechanism includes timeout retransmission and NACK retransmission. The timeout retransmission means that if the transmitter does not receive a response signal within preset time after sending a data packet, the transmitter considers that the data packet fails to be sent, and starts a data retransmission mechanism to retransmit the data packet. The NACK retransmission means that the transmitter receives a NACK fed back by the receiver, confirms that transmission of a data packet indicated by the NACK is abnormal, and starts a data retransmission mechanism to retransmit the data packet.

It should be noted that, an ACK/NACK feedback manner in the timeout retransmission and the NACK retransmission may be a single data packet feedback. To be specific, the receiver feeds back an ACK/NACK each time a data packet is received. The ACK/NACK feedback manner may alternatively be a data packet grouping feedback. To be specific, data packets are grouped in the foregoing manner, and the receiver feeds back an ACK/NACK each time a group of data packets are received.

Figure 27A:
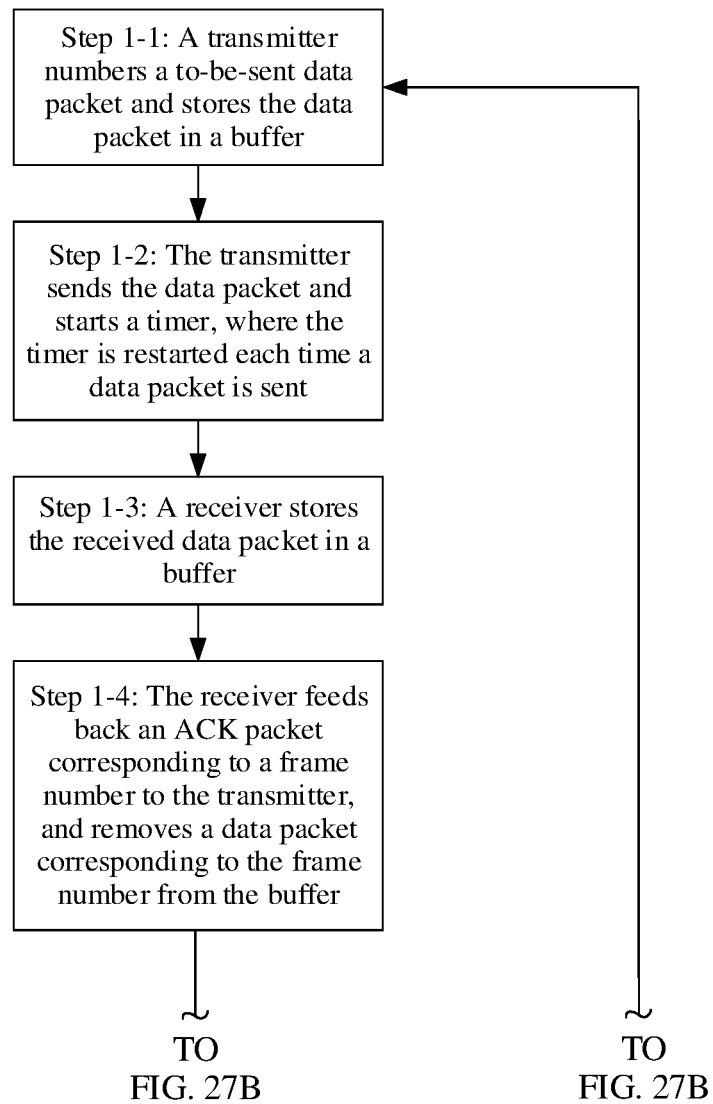
FIG. 27A and FIG. 27B are a schematic diagram 1 of a data transmission procedure based on a timeout retransmission mechanism according to an embodiment of this application.
Figure 27B:
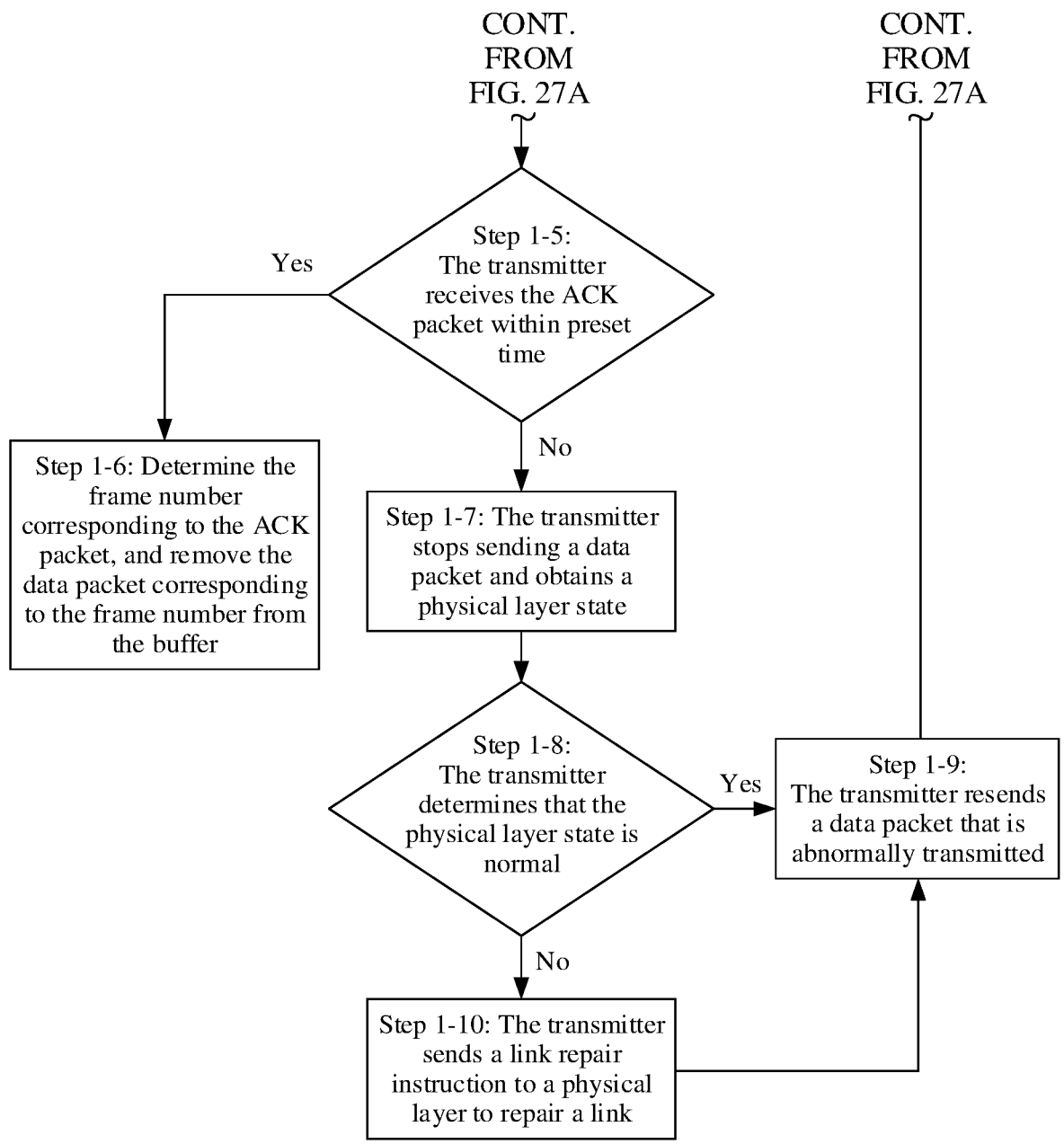

In some scenarios, FIG. 27A and FIG. 27B are a schematic diagram of a data transmission procedure based on the timeout retransmission mechanism. As shown in FIG. 27A and FIG. 27B, step 1-1 to step 1-10 are included.

Step 1-1: A transmitter numbers a to-be-sent data packet and stores the data packet in a buffer.

In some embodiments, a register is set for each of a port of the transmitter and a port of a receiver, and is configured to count frame numbers of sent or received data packets, to confirm that the frame numbers are correct.

Figure 28:
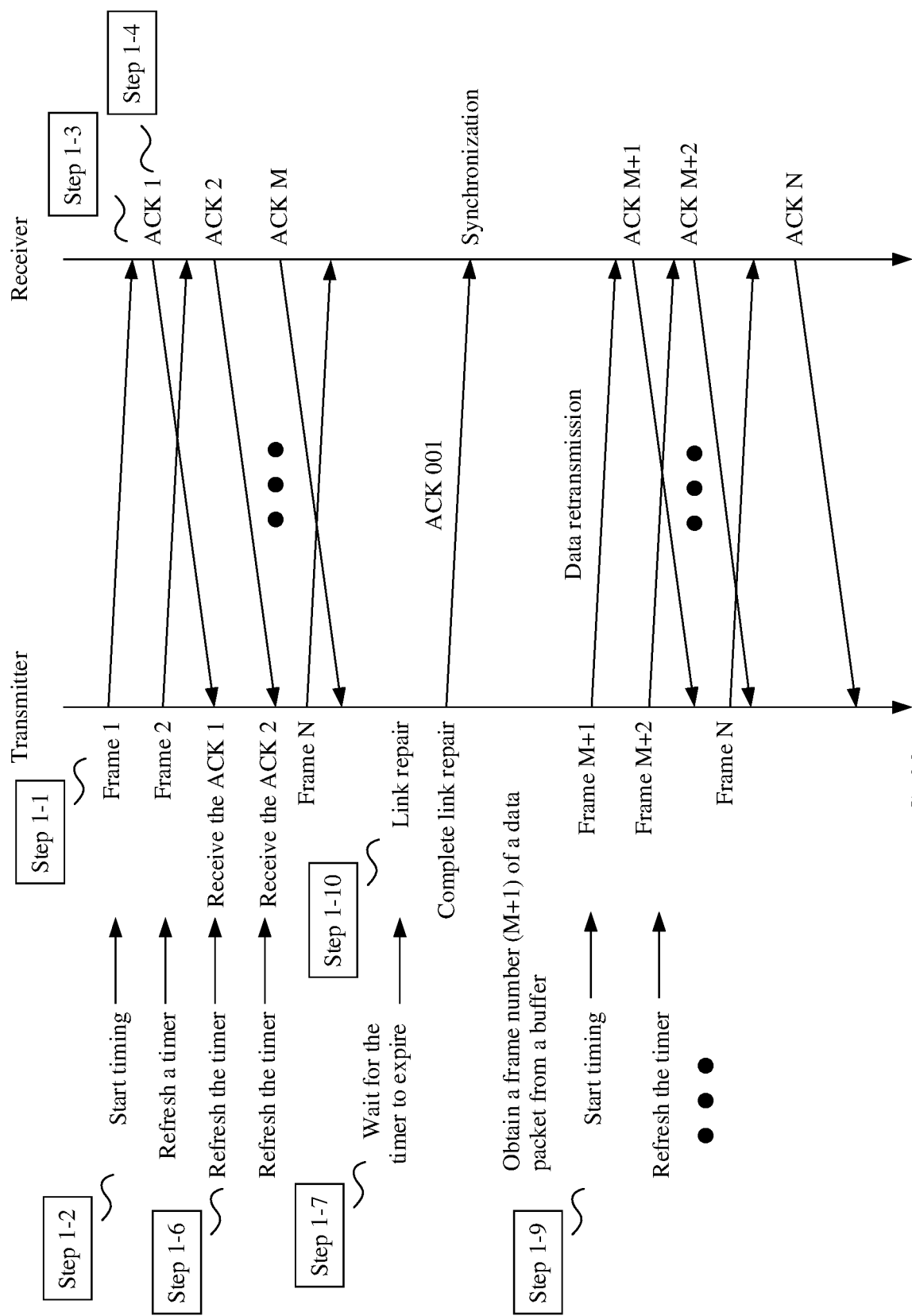
FIG. 28 is a schematic diagram 2 of a data transmission procedure based on a timeout retransmission mechanism according to an embodiment of this application.

For example, as shown in FIG. 28, the transmitter sends data packets in a sequence of frame numbers, for example, sends a frame 1 and a frame 2.

Step 1-2: The transmitter sends the data packet and starts a timer, where the timer is restarted each time a data packet is sent.

In some embodiments, when a buffer at the transmitter is completely filled with data, no data is sent. If a size of remaining space in the buffer of the transmitter can be used to buffer a next to-be-sent data packet, the data packet continues to be sent. In addition, a timer is configured at a data link layer of the transmitter. Each time a data packet is sent, the timer is refreshed to restart timing, until all data packets are sent. In other words, the transmitter may send a subsequent data packet without waiting for the receiver to feed back a response signal, thereby improving data transmission efficiency. For example, if it is determined that the remaining free space in the buffer of the transmitter is greater than or equal to a size of space that needs to be occupied by the next to-be-sent data packet, the to-be-sent data packet is stored in the buffer, the to-be-sent data packet is transmitted, and the timer is restarted. For another example, in a data transmission process, sizes of data packets that need to be sent are all the same. Therefore, a size of buffer space of the buffer may be configured to be an integer multiple of the size of the data packet. In this case, in the data transmission process, the transmitter only needs to determine that the buffer of the transmitter is not full, to continue to transmit a next data packet (e.g., the size of the remaining space in the buffer is the integer multiple of the size of the data packet).

For example, as shown in FIG. 28, the transmitter starts to send data, numbers the to-be-sent data packet as 1, and after storing the data packet 1 (e.g., the frame 1) in the buffer, sends the data packet 1, and starts the timer to start timing. Then, a next to-be-sent data packet is numbered as 2, and after the data packet 2 (e.g., the frame 2) is stored in the buffer, the data packet 2 is sent, the timer is refreshed, and timing is restarted.

Step 1-3: The receiver stores the received data packet in a buffer.

Step 1-4: The receiver feeds back an ACK packet corresponding to a frame number to the transmitter, and removes a data packet corresponding to the frame number from the buffer.

For example, as shown in FIG. 28, after receiving the data packet, the receiver feeds back an ACK of a corresponding frame number. For example, after the frame 1 is received, it is determined that the data is normal, and an ACK 1 is fed back to the transmitter.

Step 1-5: The transmitter receives the ACK packet within preset time. If yes, step 1-6 is performed. If no, step 1-7 is performed.

Step 1-6: Determine the frame number corresponding to the ACK packet, and remove the data packet corresponding to the frame number from the buffer.

Step 1-7: The transmitter stops sending a data packet and obtains a physical layer state.

In some embodiments, the transmitter receives corresponding ACK packets in the sequence of frame numbers. As shown in FIG. 28, the transmitter receives the ACK 1 and an ACK 2 in sequence. After receiving the ACK, the transmitter removes the corresponding data packet from the buffer to obtain more buffer space for transmitting a subsequent data packet. As shown in FIG. 28, after the ACK 1 is received, the frame 1 is removed from the buffer, and the timer is refreshed. After the ACK 2 is received, the frame 2 is removed from the buffer, and the timer is refreshed. When the buffer is not fully filled with data, the transmitter may continuously send data packets in sequence. However, if the transmitter does not receive an ACK, the transmitter cannot remove a data packet. As a result, the buffer may be fully filled with data. After the buffer is fully filled with data, data packet sending is stopped, and the timer is not refreshed when no data packet is sent. Therefore, timing is accumulated until preset time is exceeded. The transmitter determines that data transmission is abnormal and retransmission is required, and performs data retransmission starting from a minimum frame number based on a frame number of a data packet that is not removed from the buffer. Corresponding to step 1-2, that the buffer of the transmitter is not fully filled with data includes that the remaining free space in the buffer of the transmitter is greater than or equal to a next to-be-transmitted data packet. Alternatively, to-be-transmitted data is divided into data packets of a same size, and the size of the buffer space of the buffer is an integer multiple of the size of the data packet. In this case, that the buffer of the transmitter is not fully filled with data includes that the buffer of the transmitter is not full.

For example, as shown in FIG. 28, the transmitter sequentially receives the ACK 1, the ACK 2, . . . , and an ACK M, and determines that transmission of first M data packets is normal. Correspondingly, the first M data packets are removed from the buffer after the corresponding ACKs are received. The transmitter continues to send a frame N, but does not receive any ACK after the ACK M. As a quantity of sent data packets increases, the buffer is gradually filled by data packets, and the transmitter does not transmit data packets and waits for the timer to expire. In this case, it is determined that a data packet with a smallest frame number in the buffer is a frame M+1. In addition, the physical layer state is determined, to determine whether link repair needs to be performed. M and N are positive integers greater than 2, and N>M.

In some other embodiments, a plurality of timers are configured. Each time data is sent, one timer is started, and timing is stopped after an ACK corresponding to the data packet is received. After the timer is refreshed, the timer is used to work for another to-be-transmitted data packet. Therefore, compared with the timeout retransmission scenario with one timer, the plurality of timers work separately, and data can be retransmitted without waiting the buffer to be fully filled and the timer to time out. Instead, data transmission may be directly stopped after a timer expires. Then, an abnormal data packet corresponding to the timeout timer is determined, and after all timers are refreshed, data retransmission is performed. In this way, a waiting delay is reduced, and transmission efficiency is further improved.

Step 1-8: The transmitter determines that the physical layer state is normal. If yes, step 1-9 is performed. If no, step 1-10 is performed.

Step 1-9: The transmitter resends the data packet that is abnormally transmitted.

Content of frame number fields in a payload sub-packet and a data packet header sub-packet of a retransmitted data packet are consistent with those in an original data packet, e.g., consistent with those stored in the buffer of the transmitter.

In some embodiments, after the abnormal data packet is retransmitted, steps 1-1 is returned to, e.g., transmission of a data packet whose transmission is not completed is continued, and the foregoing steps are cyclically performed.

Step 1-10: The transmitter sends a link repair instruction to a physical layer to repair a link. After the link is repaired, step 1-9 is performed.

For example, as shown in FIG. 28, after link repair is completed, it is determined, based on the frame number of the data packet in the buffer, to retransmit the abnormal data packet from the frame M+1, and continue to transmit the data packet whose transmission is not completed.

It should be noted that the transmitter and the receiver each are configured with a buffer.

Figure 29A:
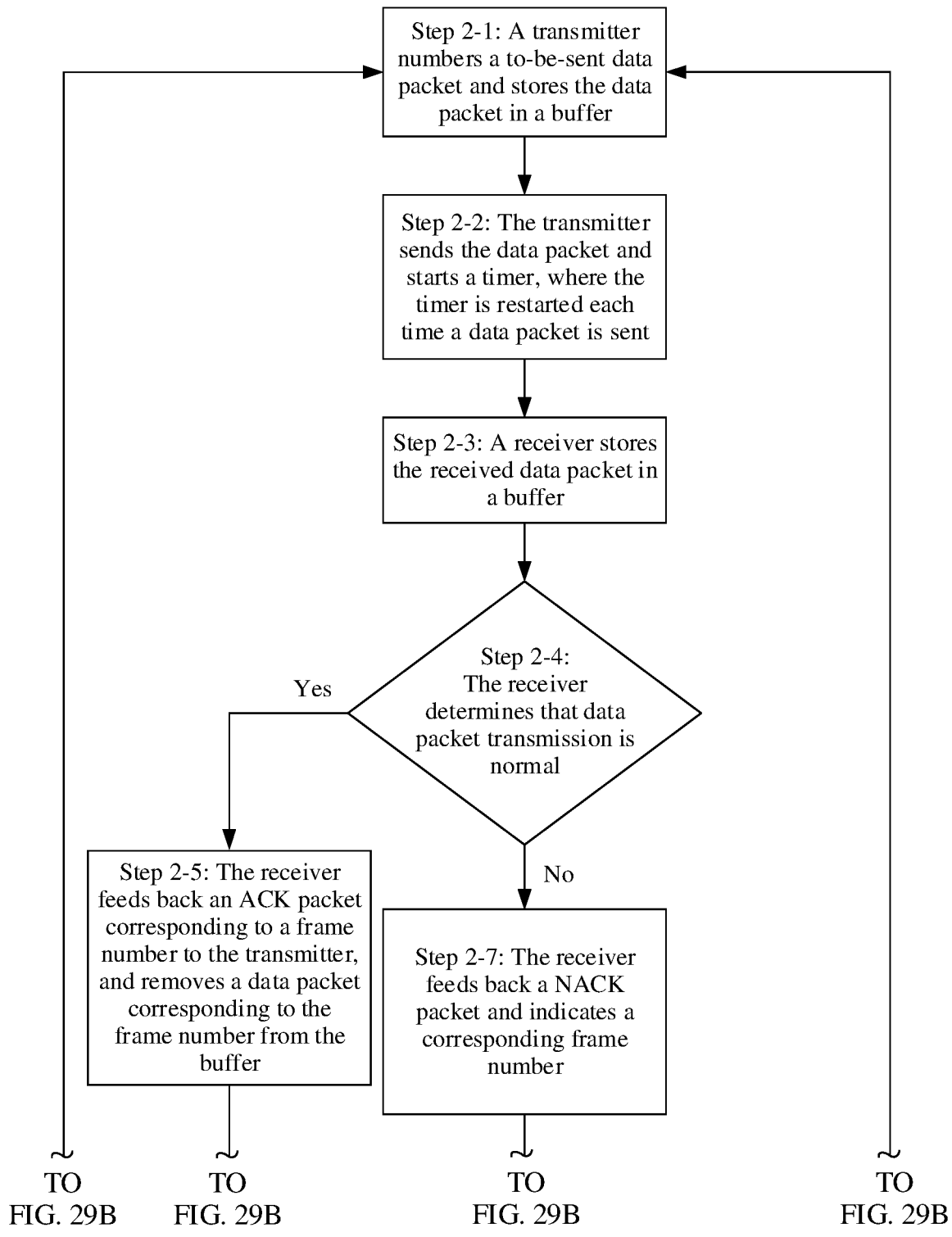
FIG. 29A and FIG. 29B are a schematic diagram 1 of a data transmission procedure based on a NACK retransmission mechanism according to an embodiment of this application.
Figure 29B:
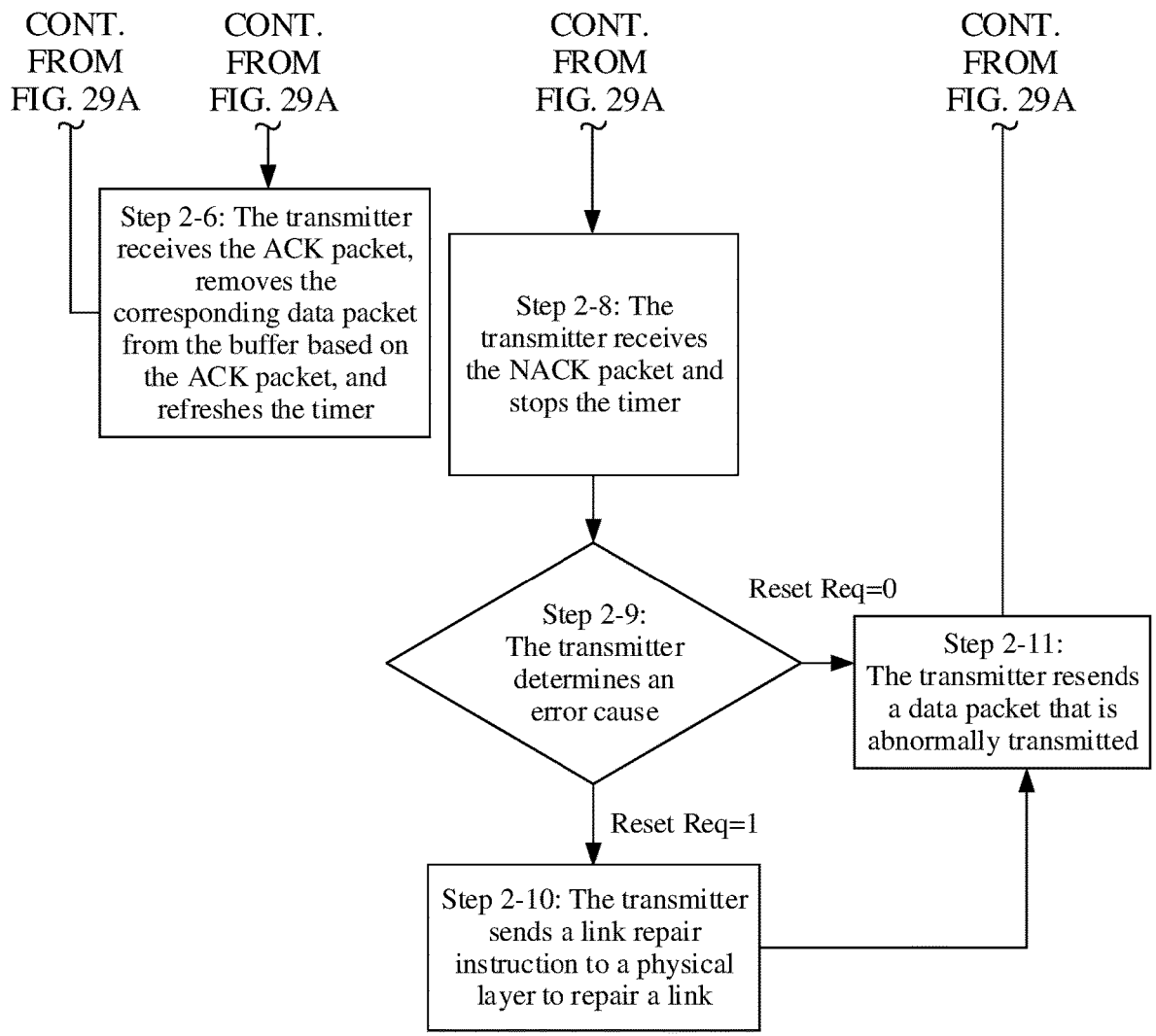

In some other scenarios, FIG. 29A and FIG. 29B are a schematic diagram of a data transmission procedure based on the NACK retransmission mechanism. As shown in FIG. 29A and FIG. 29B, step 2-1 to step 2-11 are included.

Step 2-1: A transmitter numbers a to-be-sent data packet and stores the data packet in a buffer.

Step 2-2: The transmitter sends the data packet and starts a timer, where the timer is restarted each time a data packet is sent.

In some embodiments, a data link layer of the transmitter stores data packets whose data frame numbers are 0, 1, 2, . . . , and N in the buffer of the transmitter and sends the data packets to a peer end at the same time. When the data buffer is fully filled with data, no data packet is sent. The timer is enabled during data transmission, and the timer is restarted each time a data packet is sent.

Figure 30:
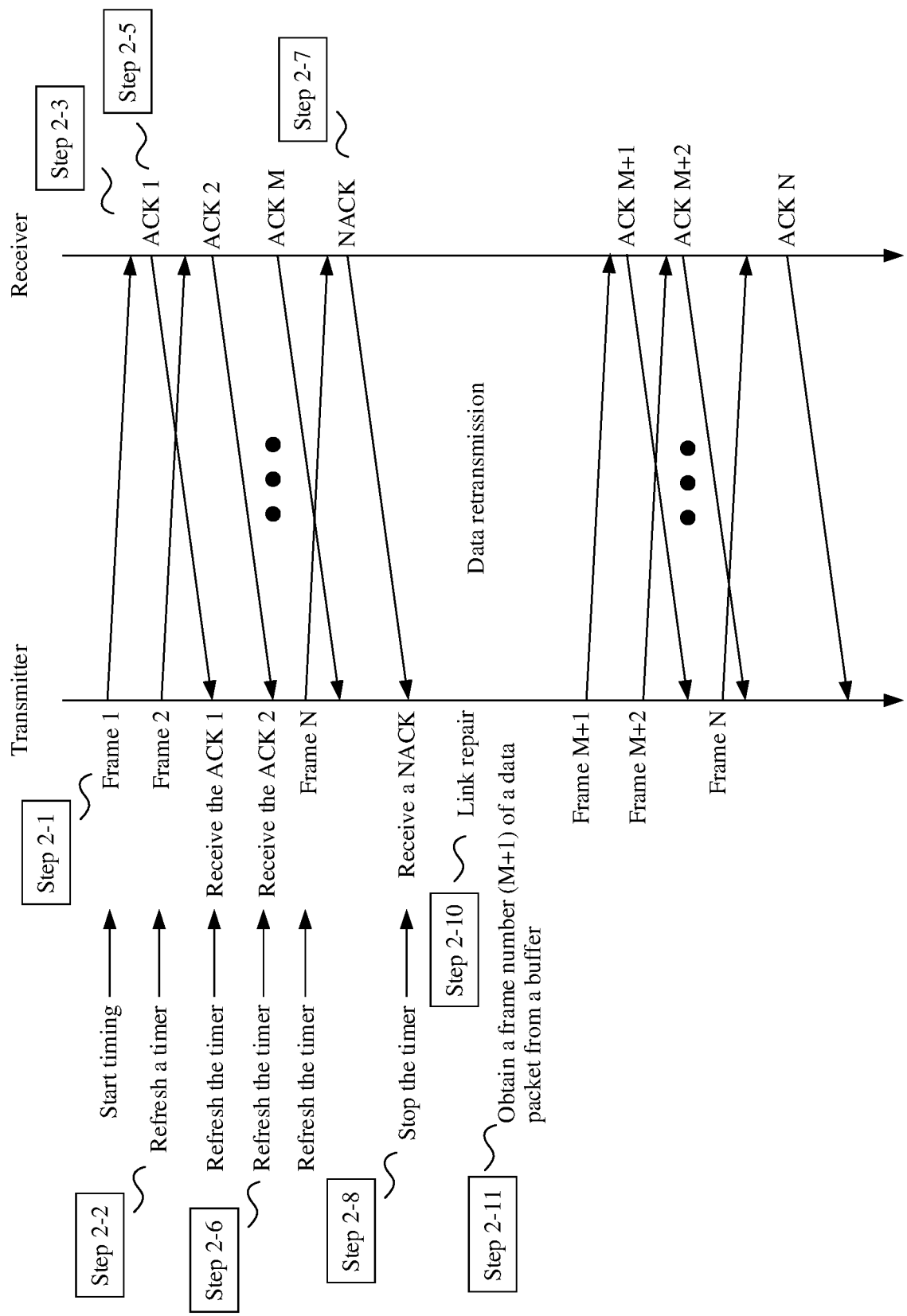
FIG. 30 is a schematic diagram 2 of a data transmission procedure based on a NACK retransmission mechanism according to an embodiment of this application.

For example, as shown in FIG. 30, the transmitter starts to send data, numbers the to-be-sent data packet as 1, and after storing the data packet 1 (e.g., a frame 1) in the buffer, sends the data packet 1, and starts the timer to start timing. Then, a next to-be-sent data packet is numbered as 2, and after the data packet 2 (e.g., a frame 2) is stored in the buffer, the data packet 2 is sent, the timer is refreshed, and timing is restarted.

Step 2-3: A receiver stores the received data packet in a buffer.

Step 2-4: The receiver determines that data packet transmission is normal. If yes, step 2-5 is performed. If no, step 2-7 is performed.

Step 2-5: The receiver feeds back an ACK packet corresponding to a frame number to the transmitter, and removes a data packet corresponding to the frame number from the buffer.

Step 2-6: The transmitter receives the ACK packet, removes the corresponding data packet from the buffer based on the ACK packet, and refreshes the timer. Then, step 2-1 is performed.

In some embodiments, each time the receiver receives a data packet, the receiver stores the data packet in the buffer of the receiver, determines that the data packet is normal, and then returns an ACK packet corresponding to a frame number. Each time the transmitter receives an ACK packet, the transmitter removes a corresponding packet from the buffer. When the data buffer is not fully filled with data, the transmitter continues to send data packets until all data packets are transmitted. In some embodiments, the transmitter continuously stores to-be-sent data packets in the buffer, and the foregoing steps are repeated until all data packets are sent.

Step 2-7: The receiver feeds back a NACK packet and indicates a corresponding frame number.

Step 2-8: The transmitter receives the NACK packet and stops the timer.

In some embodiments, after receiving a NACK, the transmitter determines that transmission of a data packet corresponding to a frame number of the NACK is abnormal, stops sending the data packet, and stops timing of the timer.

For example, as shown in FIG. 30, after receiving the NACK, the transmitter stops data transmission, stops the timer, and starts the data retransmission mechanism.

Step 2-9: The transmitter determines an error cause. If Reset Req=1, step 2-10 is performed. If Reset Req=0, step 2-11 is performed.

Step 2-10: The transmitter sends a link repair instruction to a physical layer to repair a link.

Step 2-11: The transmitter resends a data packet that is abnormally transmitted. Then, step 2-1 is performed.

In some embodiments, the transmitter continuously stores to-be-sent data packets in the buffer, and the foregoing steps are repeated until all data packets are sent.

In some embodiments, if Reset Req=1, link repair is directly performed, and then data retransmission is performed. If Reset Req=0, a physical layer state needs to be first obtained. If the physical layer state is normal, data is directly retransmitted. If there is an error in the fed-back physical layer state, link repair is first performed, and then the data is retransmitted.

For example, as shown in FIG. 30, after determining the frame number corresponding to the NACK, the transmitter starts to retransmit the abnormal data packet, and retransmits buffered data packets in the buffer in ascending order of frame numbers of the buffered data packets. After that, transmission of all packets is completed.

For other content, refer to step 1-1 to step 1-10, and details are not described herein again.

It should be noted that, in the foregoing description of content of the timeout retransmission procedure shown in FIG. 27A and FIG. 27B and the NACK retransmission procedure shown in FIG. 29A and FIG. 29B, the transmitter is a camera module, and the corresponding receiver is an SOC, or the transmitter is an SOC, and the corresponding receiver is a DDIC. Alternatively, bidirectional transmission is performed between a storage module and an SOC, the transmitter or the receiver is the storage module or the SOC. In addition, the two retransmission mechanisms, e.g., timeout retransmission and NACK retransmission, may be used in the protocol provided in this embodiment of this application, or may be used in another data transmission protocol.

In some embodiments, in the Unipro protocol, a data retransmission function is also integrated at the L2 layer. The following briefly describes a data retransmission mechanism specified in the Unipro protocol.

In the Unipro protocol, after a transmitter sends each protocol data unit (PDU) (e.g., a data packet or a data packet group), a receiver determines the received data packet separately or in groups. As described above, the transmitter of the Unipro also transmits data packets based on frame numbers, where values of the frame numbers ranges from 0 to 31. In addition, a cyclic mechanism is used. When data packets are grouped for determining, a group includes a maximum of 16 data packets.

It is assumed that the receiver determines data packets by group, and each group includes 16 data packets. After the transmitter sends 16 data packets of a first group, a timer corresponding to the first group is reset and starts timing, and the transmitter waits for an AFC fed back by the receiver. If the receiver does not detect an end of frame field or a CRC field, no AFC is sent. If the transmitter does not receive the AFC before the timer expires, the transmitter sends a request to a physical adapter layer and waits for receiving an instruction. After the instruction is received, a NAC is sent. Then, the transmitter sends a high-priority AFC and a low-priority AFC, determines a data packet that needs to be retransmitted, and starts retransmission.

It can be learned that, in the Unipro protocol, the transmitter needs to wait for an acknowledgment signal sent by the receiver before sending a subsequent data packet. By comparison, according to the retransmission mechanism provided in this embodiment of this application, after a data packet is sent, data is continuously stored in a buffer and sent without waiting for an acknowledgment signal. A buffer mechanism is used, so that data transmission efficiency is effectively improved. In addition, when data transmission is abnormal, a correct data packet can be directly obtained from the buffer for retransmission, so that it can be ensured that no data is lost, and a transmission sequence of the data packet remains unchanged.

The foregoing describes content such as the data packet structure and the retransmission mechanism for transmitting data based on the protocol architecture provided in embodiments of this application. The following describes data transmission methods in the camera scenario, the display scenario, and the storage scenario by using the system architecture.

In some embodiments, the protocol architecture provided in embodiments of this application can be applied to the camera scenario, the display scenario, and the storage scenario. Therefore, in a data transmission process, link multiplexing can be implemented, to further reduce a circuit area and improve data transmission efficiency.

For example, in a link structure shown in FIG. 31, a camera module, a display module, and a storage module are separately connected to a switch, and through the switch, transmit data to an SOC and/or receive data sent by the SOC. The camera module includes, for example, a camera sensor chip. The display module includes, for example, a display driver IC (DDIC). The storage module includes, for example, a storage sensor chip. A serial interface technology is used between the modules, and at least two transmission lanes are included, for example, a lane 0 and a lane 1 shown in FIG. 31. In addition, at least one of the transmission lanes between the modules is a bidirectional transmission lane. As described above for the physical layer, differential signal lines are used for the transmission lanes between the modules (for example, a lane 0+ and a lane 0− are a pair of differential signal lines, and a lane 1+ and a lane 1− are a pair of differential signal lines). A differential signal instead of a single-end signal is used for transmission, thereby enhancing an anti-interference capability of a link. Further, for a differential signal transmission technology, refer to the conventional technology, and details are not described herein again.

As shown in FIG. 32, transmission ports (for example, a port A, a port B, a port C, and a port D) between the modules include the protocol architecture provided in embodiment of this application.

In some embodiments, as shown in FIG. 31, after receiving a data packet, the switch can distinguish, based on a value of a data type field in the data packet, an application scenario corresponding to the data packet, and send the data packet to a corresponding module. Optionally, the switch may alternatively send the data packet to the corresponding module with reference to a physical address of each module.

It should be noted that, a data transmission direction of the camera scenario is from the camera module to the SOC, a data transmission direction of the display scenario is from the SOC to the display module, and a data transmission direction of the storage scenario is bidirectional transmission between the storage module and the SOC.

In some embodiments, at least one of the camera module, the display module, and the storage module has a to-be-transmitted data packet. For example, when a photo is shot by a mobile phone, the photo is displayed and stored at the same time. In this case, as shown in FIG. 31, the lane between the SOC and the switch needs to have a link multiplexing function.

In some scenarios, a maximum bandwidth of a multiplexed link between the SOC and the switch can meet a total bandwidth requirement for data transmission of the camera module, the display module, and the storage module. After receiving a data packet, the switch directly transmits the data packet to a lane of a corresponding module based on a value of a data type field in the data packet.

In some other scenarios, a maximum bandwidth of a multiplexed link between the SOC and the switch cannot meet a total bandwidth requirement for data transmission of the camera module, the display module, and the storage module. In this case, the SOC sends data packets to the switch in sequence based on preset priorities. Then, the switch transmits the data packet to a lane of a corresponding module based on a value of a data type field in the data packet. Preset priorities of a camera module, a display module, and a storage module in different applications may be different. The preset priorities are preconfigured in the applications by an application program developer. This is not specifically limited in this embodiment of this application. For example, after a camera application photographs an image, the captured image needs to be first displayed, and then stored for subsequent viewing by a user. Therefore, a priority of transmitting data by the display module may be preset to be higher than a priority of transmitting data by the storage module.

Figure 33:
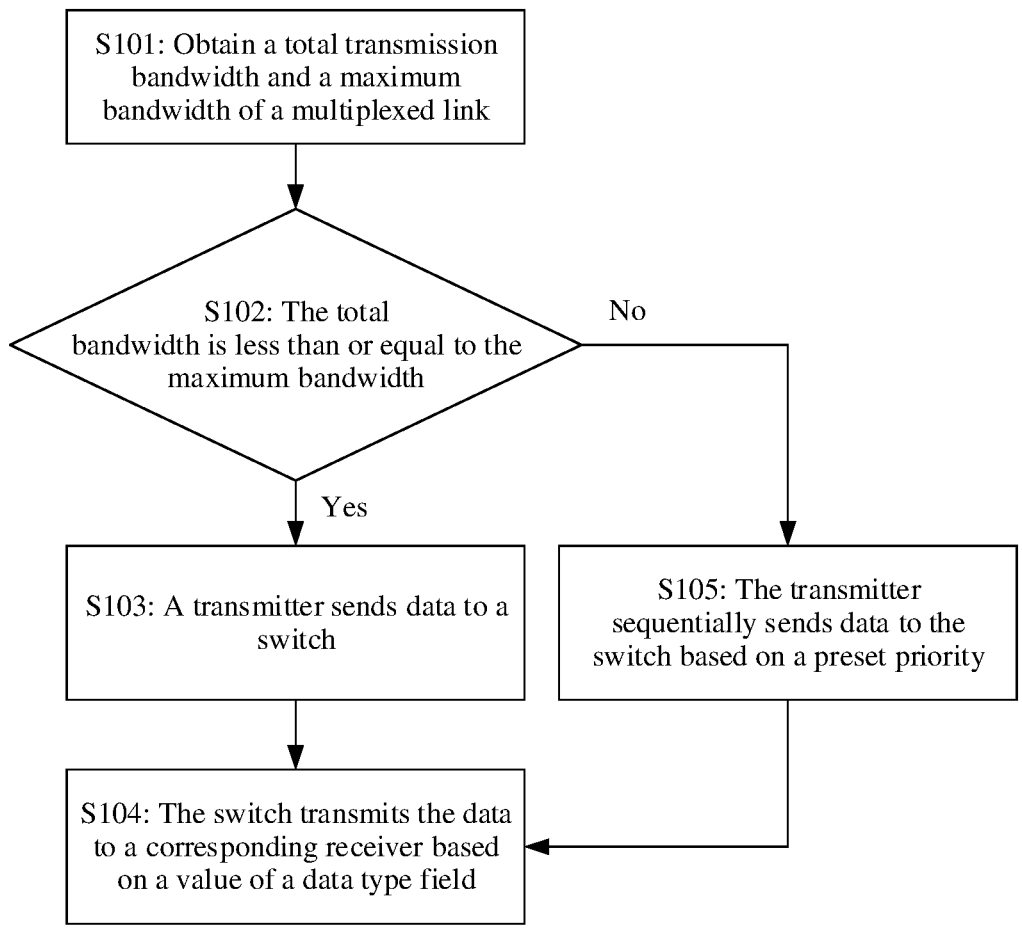
FIG. 33 is a flowchart 1 of a data transmission method according to an embodiment of this application.

For example, FIG. 33 is a schematic flowchart of a data transmission method according to an embodiment of this application. Refer to FIG. 33. The method includes S101 to S105.

S101: Obtain a total transmission bandwidth and a maximum bandwidth of a multiplexed link.

In some embodiments, a total bandwidth that is for to-be-transmitted data of a camera module, a display module, and a storage module and that is obtained by an SOC in this case is S0. At least one of the camera module, the display module, and the storage module has a to-be-transmitted data packet.

In some embodiments, the SOC obtains the maximum bandwidth of the multiplexed link as S1. The maximum bandwidth of the multiplexed link is a maximum bandwidth that can be carried by the multiplexed link.

It should be noted that, before the total transmission bandwidth and the maximum bandwidth of the multiplexed link are obtained, it needs to be determined that configuration of a parameter in a module of to-be-transmitted data in an electronic device is completed, and data transmission can be implemented. For example, the SOC configures parameters of the camera module, the display module, and the storage module.

S102: The total bandwidth is less than or equal to the maximum bandwidth. If yes, step S103 is performed. If no, step S105 is performed.

In some embodiments, a comparison module (for example, a register) in the SOC compares a value of S0 with a value of S1, and determines a transmission manner. If S0≤S1, all to-be-transmitted data packets are transmitted at the same time, and the switch routes the data packets to corresponding modules, e.g., step S104 is performed. If S0>S1, to-be-transmitted data packets are sent in a sequence of preset priorities, e.g., step S105 is performed. In this way, it is avoided that if the transmission bandwidth is greater than the maximum bandwidth of the multiplexed link, data transmission may fail or data transmission efficiency may be affected.

S104: The switch transmits data to a corresponding receiver based on a value of a data type field.

In some embodiments, after receiving a data packet, the switch parses a data packet header sub-packet of the data packet to obtain a value of a data type field, and routes the data packet to a corresponding module based on different scenarios indicated by different values of the data type field shown in Table 2.

Figure 34A:
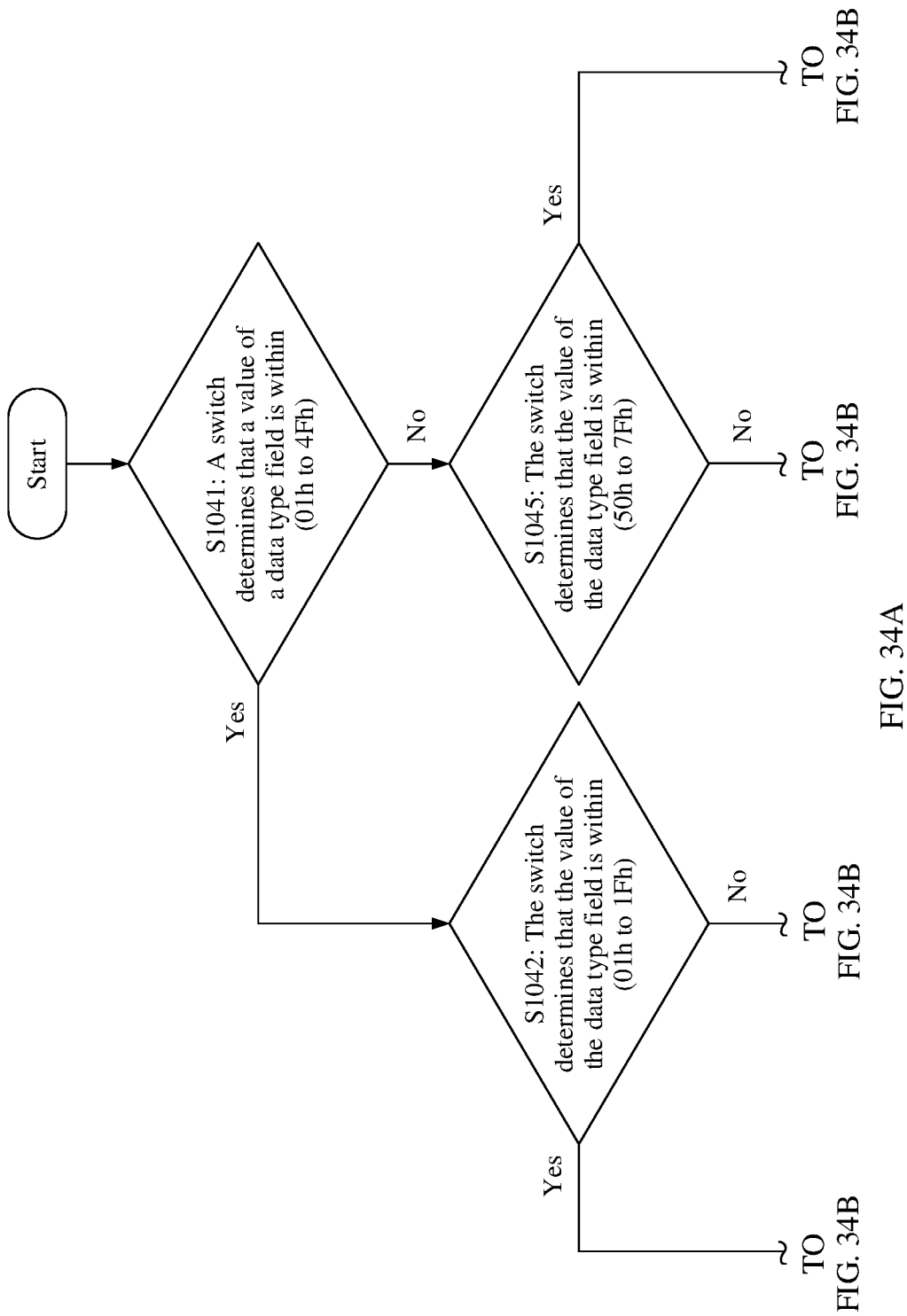
FIG. 34A and FIG. 34B is a flowchart 2 of a data transmission method according to an embodiment of this application.
Figure 34B:
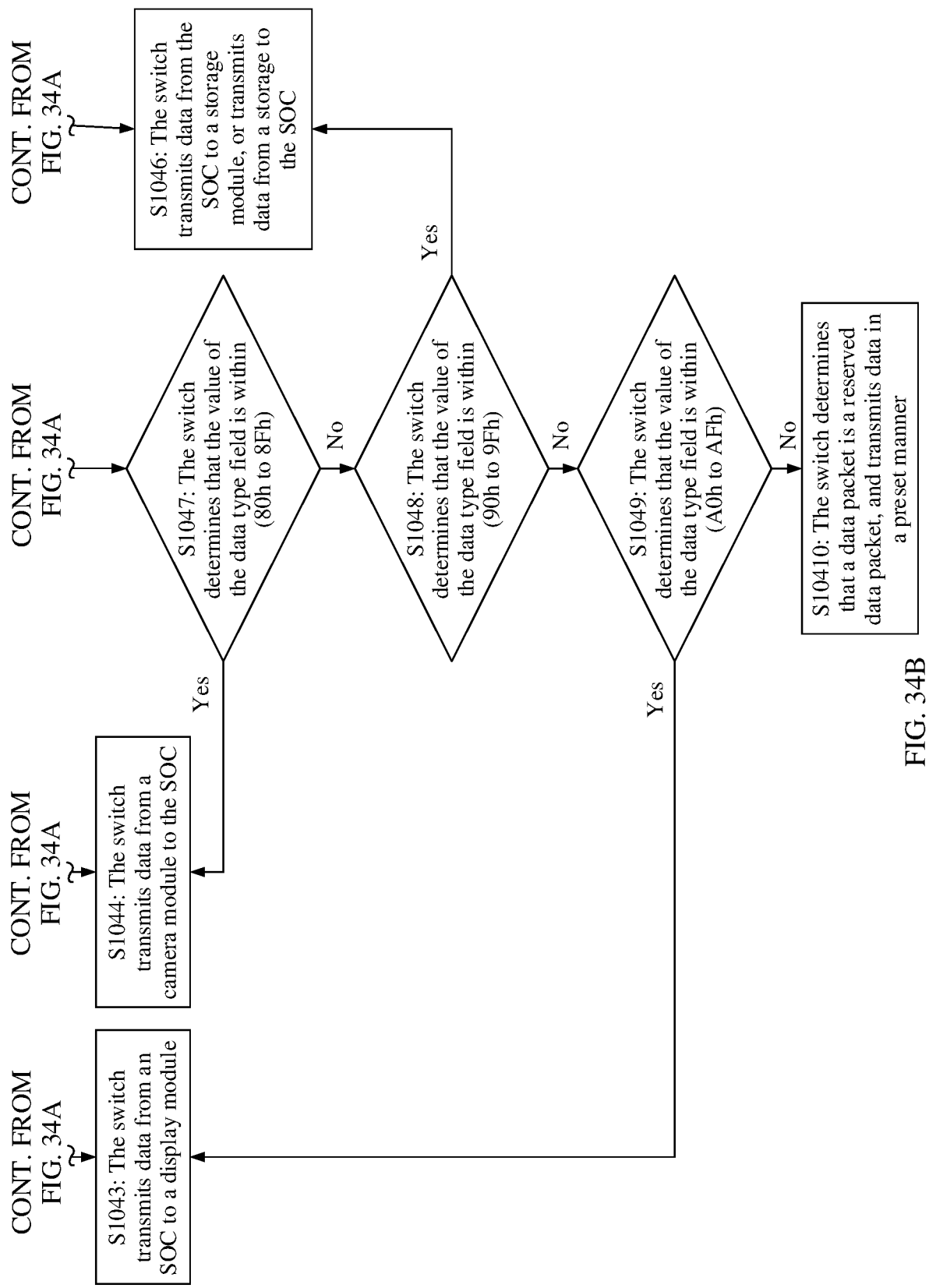

For example, as shown in FIG. 34A and FIG. 34B, step S104 may be specifically implemented as step S1041 to step S10410.

S1041: The switch determines that the value of the data type field is within (01h to 4Fh). If yes, step S1042 is performed. If no, step S1405 is performed.

In some embodiments, after obtaining the value of the data type field, the switch determines, based on Table 2, that the value is within a value range (01h to 4Fh), and a corresponding application scenario is a display scenario or a camera scenario.

S1042: The switch determines that the value of the data type field is within (01h to 1Fh). If yes, step S1043 is performed. If no, step S1044 is performed.

S1043: The switch transmits the data from the SOC to the display module.

S1044: The switch transmits the data from the camera module to the SOC.

In some embodiments, in step S1042 to step S1044, after determining that the value of the data type field is within the value range (01h to 4Fh), the switch further determines a specific range of the value. If it is determined that the value of the data type field is within a value range (01h to 1Fh), it is determined that the scenario corresponding to the data packet is the display scenario, and the data is transmitted from the SOC to the display module. If it is determined that the value of the data type field is not within a value range (01h to 1Fh), e.g., within a value range (20h to 4Fh), it is determined that the scenario corresponding to the data packet is the camera scenario, and the data is transmitted from the camera module to the SOC.

S1045: The switch determines that the value of the data type field is within (50h to 7Fh). If yes, step S1046 is performed. If no, step S1047 is performed.

S1046: The switch transmits the data from the SOC to the storage module, or transmits the data from the storage module to the SOC.

In some embodiments, in step S1045 and step S1046, after determining that the value of the data type field is not within the value range (01h to 4Fh), the switch determines whether the value of the data type field is within a value range (50h to 7Fh). If yes, it is determined that the scenario corresponding to the data packet is the storage scenario, and bidirectional data transmission is performed between the storage module and the SOC.

S1047: The switch determines that the value of the data type field is within (80h to 8Fh). If yes, step S1044 is performed. If no, step S1048 is performed.

In some embodiments, after determining that the value of the data type field is not within the value range (01h to 4Fh) and is not within the value range (50h to 7Fh), the switch determines whether the value of the data type field is within a value range (80h to 8Fh). If yes, the data is transmitted from the camera module to the SOC.

S1048: The switch determines that the value of the data type field is within (90h to 9Fh). If yes, step S1046 is performed. If no, step S1049 is performed.

In some embodiments, after determining that the value of the data type field is not within the value range (01h to 4Fh), is not within the value range (50h to 7Fh), and is not within the value range (80h to 8Fh), the switch determines whether the value of the data type field is within a value range (90h to 9Fh). If yes, bidirectional data transmission is performed between the storage module and the SOC.

S1049: The switch determines that the value of the data type field is within (A0h to AFh). If yes, step S1043 is performed. If no, step S10410 is performed.

S10410: The switch determines that the data packet is a reserved data packet, and transmits the data in a preset manner.

In some embodiments, after determining that the value of the data type field is not within the value range (01h to 4Fh), is not within the value range (50h to 7Fh), is not within the value range (80h to 8Fh), and is not within the value range (90h to 9Fh), the switch determines whether the value of the data type field is within a value range (A0h to AFh). If yes, the data is transmitted from the SOC to the display module. If no, it is determined that the data packet is a reserved data packet (reserved packet), and the data may be transmitted in the preset manner. The preset manner is a transmission manner predefined by a developer. For example, it is predefined that some values of the data type field indicate the switch to transmit data to the display module.

S105: The transmitter sequentially sends data to the switch based on preset priorities. Then, step S104 is performed.

For example, it is assumed that the preset priorities are in descending order of the camera module, the storage module, and the display module. The comparison module compares the value of S0 and the value of S1. If S0>S1, all data packets cannot be transmitted at the same time, and data of each module needs to be sequentially transmitted based on the preset priorities.

For example, based on the preset priorities, the SOC first determines whether a camera system has data that needs to be transmitted, and if the camera system has data that needs to be transmitted, transmits the data of the camera module to the SOC. If the camera system does not have data that needs to be transmitted, the SOC continues to determine whether a storage system has data that needs to be transmitted. If the storage system has data that needs to be transmitted, based on a requirement, the data is transmitted from the SOC to the storage module, or the data is transmitted from the storage module to the SOC. If the storage system does not have data that needs to be transmitted, the SOC continues to determine whether a display system has data that needs to be transmitted. If the display system has data that needs to be transmitted, the data is transmitted from the SOC to the display module.

The following describes a specific implementation of step S103 to step S105, e.g., a specific data transmission method in a process in which a transmitter sends data to a receiver in different scenarios.

Figure 35:
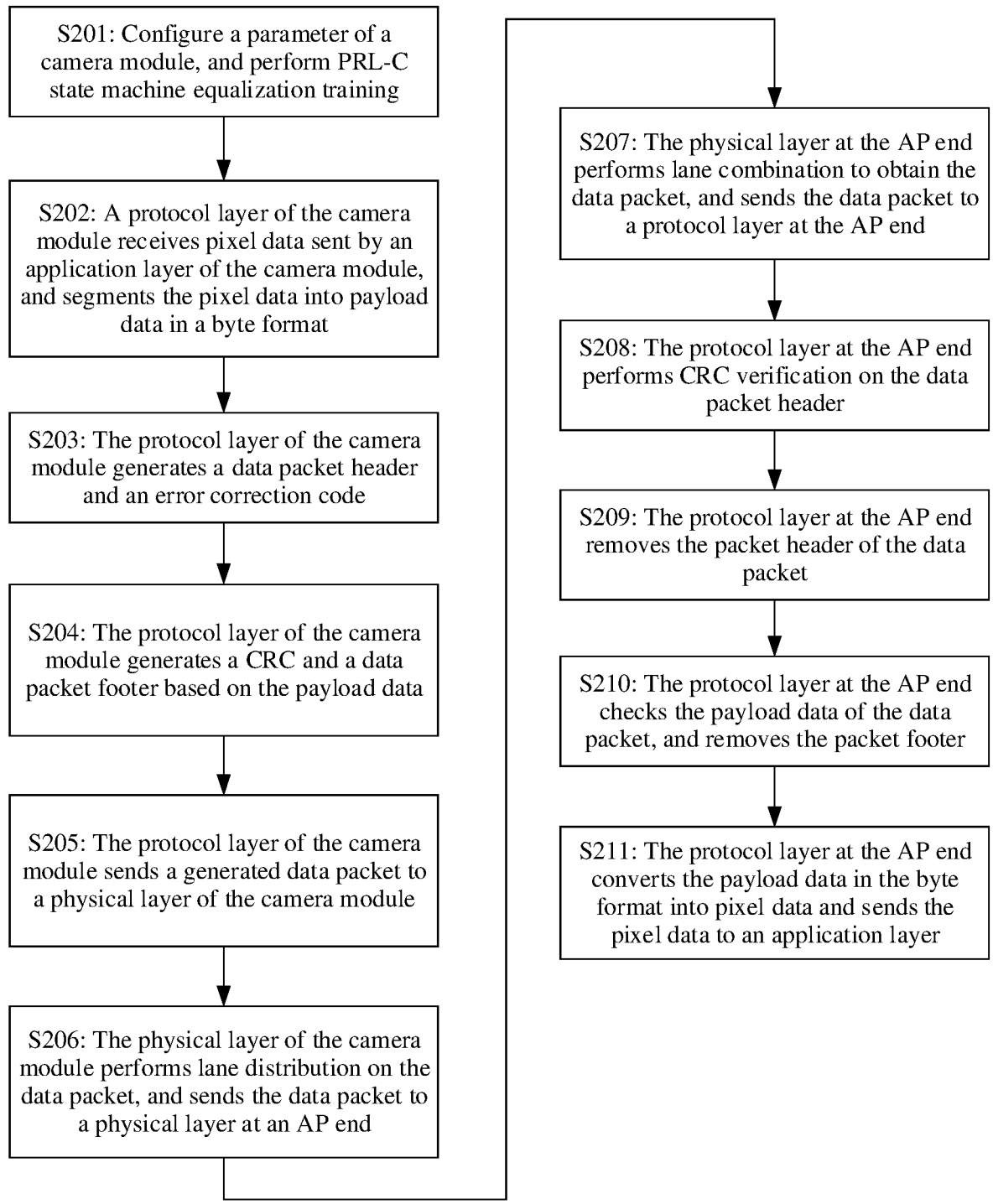
FIG. 35 is a flowchart 3 of a data transmission method according to an embodiment of this application.

In some scenarios, the data transmission method provided in this embodiment of this application can be applied to the camera scenario. For example, FIG. 35 shows a data transmission method applicable to the camera scenario according to an embodiment of this application. Based on the protocol architecture shown in FIG. 11, as shown in FIG. 35, the method includes S201 to S211.

S201: Configure a parameter of a camera module, and perform PRL-C state machine equalization training.

The camera module is, for example, the camera shown in FIG. 11, or may be described as an image processing unit.

In some embodiments, a CPU completes parameter configuration of the camera module, and trains a PRL-C state machine, to ensure that a PRL-C parameter is stable and a lane environment and a system environment are stable. This can ensure that data transmission can be stably performed in a subsequent running process, and a bit error rate is within a preset threshold. For a specific state machine equalization training process, refer to the conventional technology. Details are not described herein again.

S202: A protocol layer of the camera module receives pixel data sent by an application layer of the camera module, and segments the pixel data into payload data in a byte format.

For example, as shown in FIG. 11, the application layer 1001 of the camera module obtains an image data stream, e.g., pixel data, and sends the pixel data to the protocol layer 1002. The protocol layer 1002 segments the pixel data by using the pixel byte packing formats function 1101, for example, segment the pixel data into payload data of an 8-bit field, to complete a pixel byte packing process.

S203: The protocol layer of the camera module generates a data packet header and an error correction code.

For example, as shown in FIG. 11, by using the packet header and error correction code generation (packet header & ECC generation) function 1102 and based on the data packet structure shown in FIG. 16 to FIG. 22, the protocol layer 1002 of the camera module generates a data packet header and an error correction code and adds a data packet header sub-packet to a payload data sub-packet. For example, as shown in FIG. 21, the protocol layer 1002 adds a data type field, a data count field, an SOF field, an EOF field, an SOL field, a VC number field, and a CRI field to the payload data. In addition, the fields are encoded by using an ECC algorithm to form an ECC error correction field, and the ECC error correction field (ECC of PH field) is added after the fields to generate the data packet header sub-packet. The ECC algorithm includes, for example, an extended Hamming code algorithm. The fields are encoded by using a 7-bit extended Hamming code algorithm to form a 7-bit ECC error correction field.

S204: The protocol layer of the camera module generates a CRC and a data packet footer based on the payload data.

For example, as shown in FIG. 11, the protocol layer 1002 of the camera module encodes the payload data by using the payload CRC and packet footer generation (payload CRC & packet footer generation) function 1103, for example, to generate a 16-bit CRC field, and form a data packet footer sub-packet. For example, encoding is performed by using X16+X12+X5+X0 as a polynomial to generate the CRC field. For a process of generating the CRC, refer to the conventional technology, and details are not described herein again.

It should be noted that an execution sequence of the functions in step S202 to step S204 is not specifically limited in this embodiment of this application, and a data packet packing process is completed by using step S202 to step S204 at the protocol layer 1002.

S205: The protocol layer of the camera module sends a generated data packet to a physical layer of the camera module.

For example, as shown in FIG. 11, the protocol layer 1002 of the camera module sends the generated data packet to the physical layer 1003.

S206: The physical layer of the camera module performs lane distribution on the data packet, and sends the data packet to a physical layer at an AP end.

For example, as shown in FIG. 11, the physical layer 1003 completes allocation of a transmission lane of the received data packet as required by using the logical physical layer lane distribution and coding (logical PHY lane distribution & coding) function 1104, and sends the data packet to the physical layer 1006 at the receiver. For example, when the logical physical layer lane distribution and coding function 1104 on the camera side and the logical physical layer lane distribution and coding function 1109 on the AP side in FIG. 11 are implemented, through corresponding lane management shown in FIG. 11, a transmission lane of data in each data packet is allocated through negotiation. For example, a lane 0 is used to transmit a byte 1, and a lane 1 is used to transmit a byte 2. For a specific lane allocation process, refer to the conventional technology, and details are not described herein again.

S207: The physical layer at the AP end performs lane combination to obtain the data packet, and sends the data packet to a protocol layer at the AP end.

For example, as shown in FIG. 11, after receiving the data packet, the physical layer at the receiver (e.g., the AP side) combines data of a plurality of lanes as required by using the logical physical layer lane distribution and coding (logical PHY lane distribution & coding) function 1109, and then sends the obtained data packet to the protocol layer 1005.

S208: The protocol layer at the AP end performs CRC verification on the data packet header.

For example, as shown in FIG. 11, the protocol layer 1005 of the AP determines, by using the packet header correction and report function 1110, whether an error occurs in data packet header sub-packet information. For example, the data type field, the data count field, the SOF field, the EOF field, the SOL field, the VC number field, and the CRI field are added to the payload data through ECC decoding. In addition, the fields are encoded by using the same encoding rule as that at the transmitter, to form a 7-bit ECC' error correction field, and then an exclusive OR calculation is performed on the ECC and the ECC'. If a result is 0, it indicates that packet header information is correct, and then data packet header fields are unpacked. If a result is not 0, and an XOR result indicates that there is a 1-bit error, error correction may be performed on an error bit indicated by the XOR result, and then the packet header sub-packet is unpacked. In addition, another XOR result indicates that an uncorrectable error (for example, a quantity of error bits is greater than or equal to 2 bits) occurs in the packet header of the data packet. In this case, a preset error processing solution is performed on the incorrect data packet. For example, the incorrect data packet is discarded, the incorrect data packet is skipped, or the incorrect data packet is retransmitted. A specific solution may be preconfigured by research and development personnel in the system.

S209: The protocol layer at the AP end removes the packet header of the data packet.

For example, as shown in FIG. 11, if the protocol layer 1005 of the AP determines, by using the packet header correction and report function 1110, that there is no error in the packet header of the data packet or that the error is eliminated, the protocol layer removes the packet header of the data packet.

S210: The protocol layer at the AP end checks the payload data of the data packet, and removes the packet footer.

For example, as shown in FIG. 11, the protocol layer 1005 of the AP checks the payload data based on the payload error check and report function 1111 by using the CRC field in the data packet, to determine whether the payload data is correctly transmitted. For example, based on the payload error check and report function 1111, the CRC field in the data packet is divided by the X16+X12+X5+X0 polynomial modulo 2. If a remainder is 0, it indicates that the received payload data is correct data. If a remainder is not 0, the received payload data is incorrect data. In this case, a preset error processing solution is performed on the incorrect data packet. For example, the incorrect data packet is discarded, the incorrect data packet is skipped, or the incorrect data packet is retransmitted. A specific solution may be preconfigured by research and development personnel in the system.

Further, as shown in FIG. 11, after it is determined that the payload data is normal by using the payload error check and report function 1111, the packet footer of the data packet is removed.

S211: The protocol layer at the AP end converts the payload data in the byte format into pixel data and sends the pixel data to an application layer.

For example, as shown in FIG. 11, the protocol layer 1005 converts payload data in a unit of an 8-bit field into pixel data by using the byte to pixel unpacking formats (byte to pixel unpacking formats) function 1112, and transmits the pixel data to the application layer 1004 of the AP, to complete a data transmission process.

It should be noted that the physical layers at the transmitter and the receiver support a transmission rate of 16 Gbps/lane or higher, support 128B/132B codec, and support a lane distribution and combination function. An execution sequence of the functions in step S208 to step S211 is not specifically limited in this embodiment of this application, and a data packet unpacking process is completed by using step S208 to step S211 at the protocol layer 1005.

Figure 36:
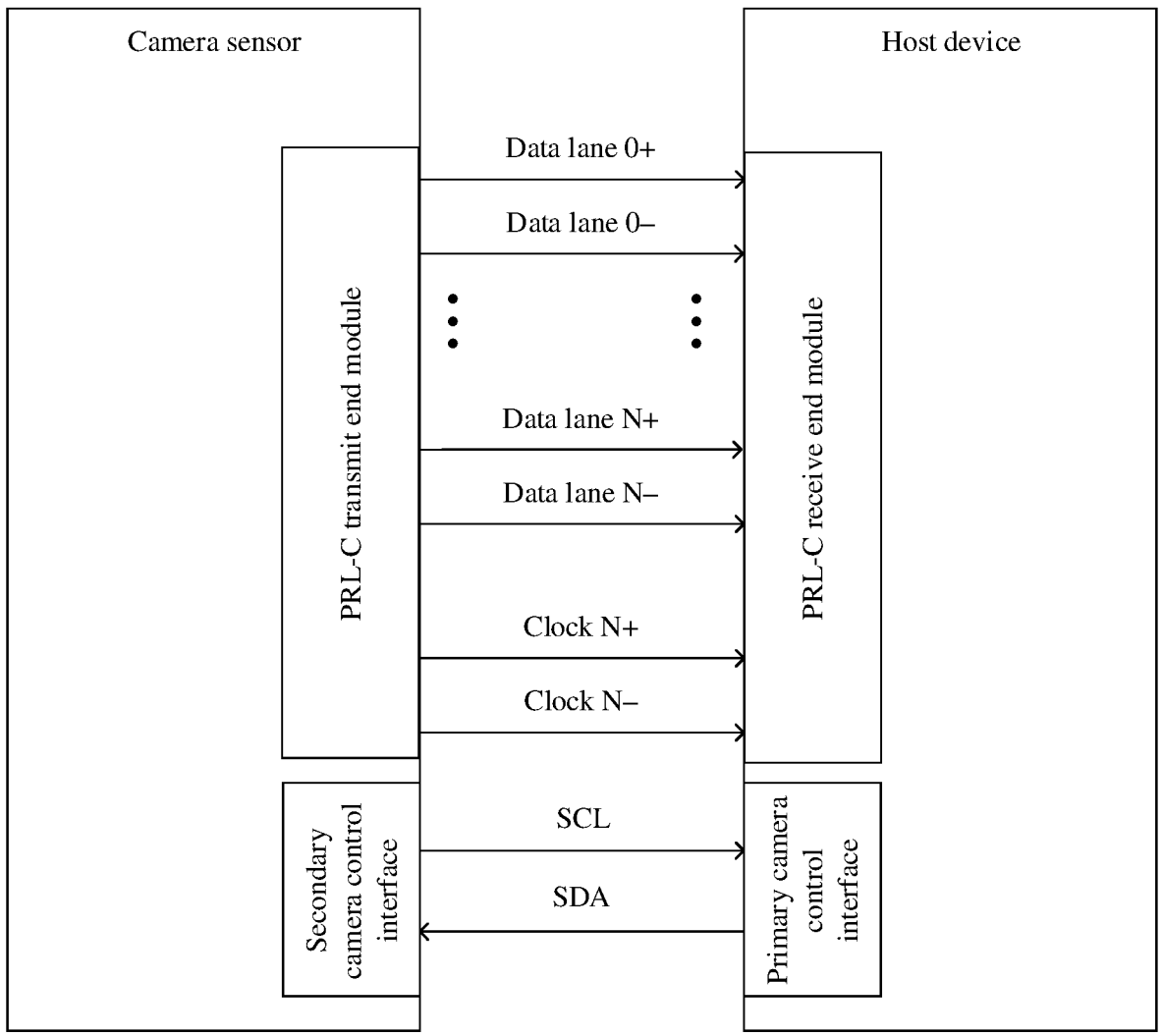
FIG. 36 is a structure of a PRL-C image transmission system according to an embodiment of this application.

For example, as shown in FIG. 14, by using the data transmission method, the camera module can send data to the SOC through the high-speed transmission interface. In a structure of a PRL-C image transmission system shown in FIG. 36, a data lane and a clock lane are established between a PRL-C transmitter module and a PRL-C receiver module in a camera module, to transmit data. In addition, a serial clock line (SDA) and a serial data line (SDA) are established between a control interface of a primary device (for example, an SOC) and a control interface of a secondary device (for example, the camera module), to configure a parameter of the camera module.

Therefore, the data transmission method provided in this embodiment of this application is applied to the camera scenario, and can meet a quality requirement of a user for a photographed image and ensure transmission efficiency. In addition, a line layout of a circuit is not increased, and a requirement of the user for a light and thin electronic device is met, for example, a light and thin design trend of a mobile phone. For example, the camera scenario includes a scenario that has a strict requirement on imaging quality, such as a Vlog, a short video, a live broadcast of a large-scale competition, and AR.

Figure 37:
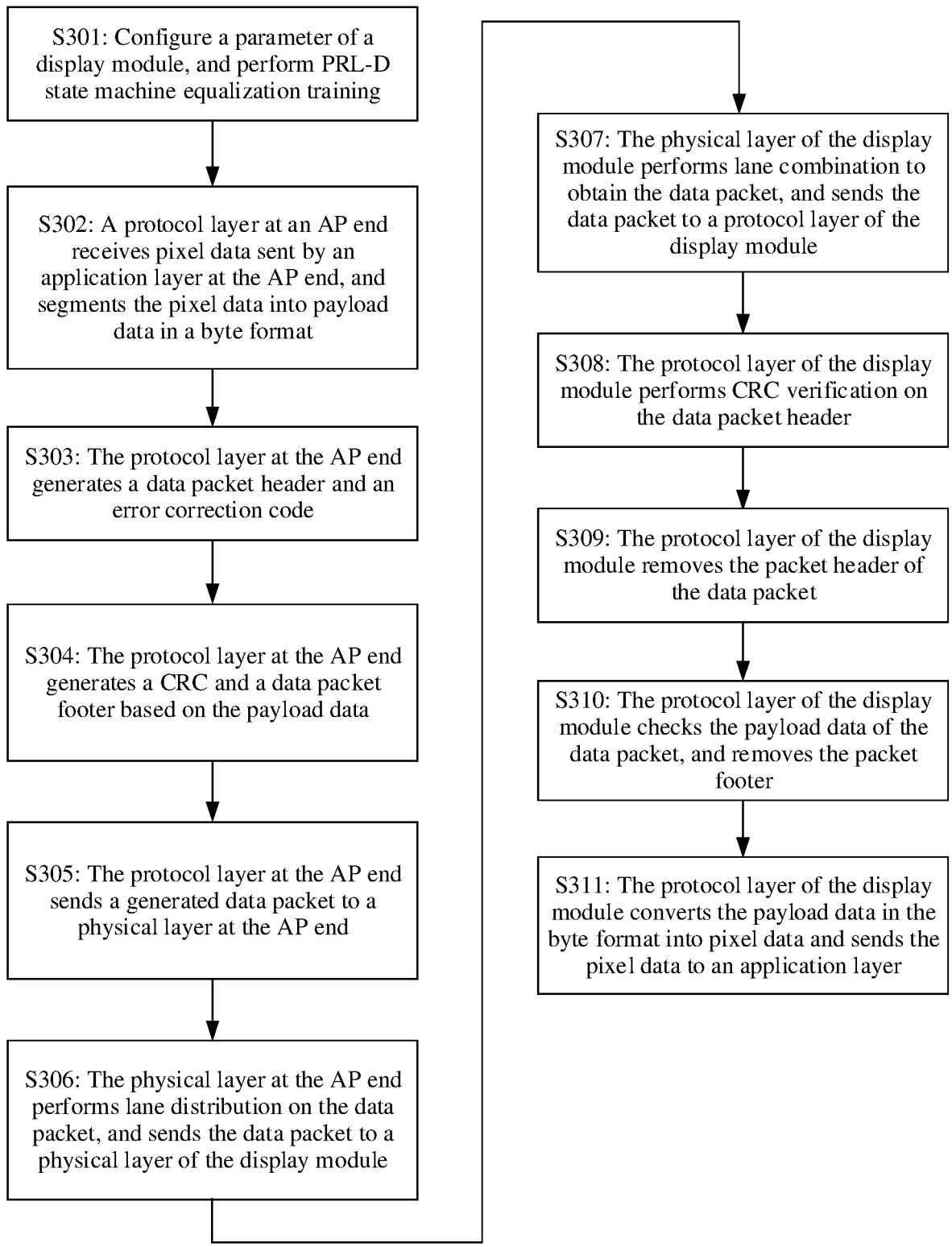
FIG. 37 is a flowchart 4 of a data transmission method according to an embodiment of this application.

In some other scenarios, the data transmission method provided in this embodiment of this application can be applied to the display scenario. For example, FIG. 37 shows a data transmission method applicable to the display scenario according to an embodiment of this application. Based on the protocol architecture shown in FIG. 12, as shown in FIG. 37, the method includes S301 to S311.

S301: Configure a parameter of a display module, and perform PRL-D state machine equalization training.

The display module is, for example, the DDIC shown in FIG. 12, or may be described as an image display unit.

In some embodiments, a CPU completes parameter configuration of the display module, and trains a PRL-D state machine, to ensure that a PRL-D parameter is stable. This can ensure that data transmission can be stably performed in a subsequent running process. For a specific state machine equalization training process, refer to the conventional technology. Details are not described herein again.

S302: A protocol layer at an AP end receives pixel data sent by an application layer at the AP end, and segments the pixel data into payload data in a byte format.

For example, as shown in FIG. 12, the application layer 1001 of at the AP end obtains an image data stream, e.g., pixel data, and sends the pixel data to the protocol layer 1002. The protocol layer 1002 segments the pixel data by using the pixel byte packing formats function 1101, for example, segment the pixel data into payload data of an 8-bit field, to complete a pixel byte packing process.

S303: The protocol layer at the AP end generates a data packet header and an error correction code.

For example, as shown in FIG. 12, by using the packet header and error correction code generation function 1102 and based on the data packet structure shown in FIG. 16 to FIG. 22, the protocol layer 1002 at the AP end generates a data packet header and an error correction code and adds a data packet header sub-packet to a payload data sub-packet. For example, as shown in FIG. 21, the protocol layer 1002 adds a data type field, a data count field, an SOF field, an EOF field, an SOL field, a VC number field, and a CRI field to the payload data. In addition, the fields are encoded by using a 7-bit extended Hamming code to form a 7-bit ECC error correction field, and the 7-bit ECC error correction field (ECC of PH field) is added at an end, to generate the data packet header sub-packet.

S304: The protocol layer at the AP end generates a CRC and a data packet footer based on the payload data.

For example, as shown in FIG. 12, the protocol layer 1002 at the AP end encodes the payload data by using the payload CRC and packet footer generation function 1103, for example, to generate a 16-bit CRC field, and form a data packet footer sub-packet. For example, encoding is performed by using X16+X12+X5+X0 as a polynomial to generate the CRC field. For a process of generating the CRC, refer to the conventional technology, and details are not described herein again.

Then, a data packet generation process is completed by using the three modules at the protocol layer.

It should be noted that an execution sequence of the functions in step S302 to step S304 is not specifically limited in this embodiment of this application, and a data packet packing process is completed by using step S302 to step S304 at the protocol layer 1002.

S305: The protocol layer at the AP end sends a generated data packet to a physical layer at the AP end.

For example, as shown in FIG. 12, the protocol layer 1002 at the AP end sends the generated data packet to the physical layer 1003.

S306: The physical layer at the AP end performs lane distribution on the data packet, and sends the data packet to a physical layer of the display module.

For example, as shown in FIG. 12, after receiving the data packet, the physical layer 1003 on the AP side completes allocation of a transmission lane of the data packet as required by using the logical physical layer lane distribution and coding function 1104, and sends the data packet to the physical layer 1006 on the DDIC side. For a specific lane allocation process, refer to the conventional technology, and details are not described herein again.

S307: The physical layer of the display module performs lane combination to obtain the data packet, and sends the data packet to a protocol layer of the display module.

For example, as shown in FIG. 12, after receiving the data packet by using the logical physical lane connection and coding function 1109, the physical layer 1006 of the display module (e.g., the DDIC) combines data of a plurality of lanes as required, and then sends the obtained data packet to the protocol layer 1005.

S308: The protocol layer of the display module performs CRC verification on the data packet header.

For example, as shown in FIG. 12, the protocol layer 1005 of the display module determines, by using the packet header correction and report function 1110, whether an error occurs in data packet header sub-packet information. For example, the data type field, the data count field, the SOF field, the EOF field, the SOL field, the VC number field, and the CRI field are added to the payload data through ECC decoding. In addition, the fields are encoded by using the same encoding rule as that at the transmitter, to form a 7-bit ECC' error correction field, and then an exclusive OR calculation is performed on the ECC and the ECC'. If a result is 0, it indicates that packet header information is correct, and then data packet header fields are unpacked. If a result is not 0, and an XOR result indicates that there is a 1-bit error, error correction may be performed on an error bit indicated by the XOR result, and then the data packet header sub-packet is unpacked. In addition, another XOR result indicates that an uncorrectable error (for example, a quantity of error bits is greater than or equal to 2 bits) occurs in the packet header of the data packet. In this case, a preset error processing solution is performed on the incorrect data packet. For example, the incorrect data packet is discarded, the incorrect data packet is skipped, or the incorrect data packet is retransmitted. A specific solution may be preconfigured by research and development personnel in the system.

S309: The protocol layer of the display module removes the packet header of the data packet.

For example, as shown in FIG. 12, if the protocol layer 1005 of the display module determines, by using the packet header correction and report function 1110, that there is no error in the packet header of the data packet or that the error is eliminated, the protocol layer removes the packet header of the data packet.

S310: The protocol layer of the display module checks the payload data of the data packet, and removes the packet footer.

For example, the protocol layer 1005 of the display module checks the payload data by using the payload error check and report function 1111 and the CRC field in the data packet, to determine whether the payload data is correctly transmitted. For example, the payload error check and report function 1111 is used to divide the CRC field in the data packet by the X16+X12+X5+X0 polynomial modulo 2. If a remainder is 0, it indicates that the received payload data is correct data. If a remainder is not 0, the received payload data is incorrect data. In this case, a preset error processing solution is performed on the incorrect data packet. For example, the incorrect data packet is discarded, the incorrect data packet is skipped, or the incorrect data packet is retransmitted. A specific solution may be preconfigured by research and development personnel in the system.

Further, as shown in FIG. 12, after it is determined that the payload data is normal by using the payload error check and report function 1111, the packet footer of the data packet is removed.

S311: The protocol layer of the display module converts the payload data in the byte format into pixel data and sends the pixel data to an application layer.

For example, as shown in FIG. 12, the protocol layer 1005 of the display module converts payload data in a unit of an 8-bit field into pixel data by using the byte to pixel unpacking formats function 1112, and transmits the pixel data to the application layer 1004 of the display module, to complete a data transmission process.

It should be noted that an execution sequence of the functions in step S308 to step S311 is not specifically limited in this embodiment of this application, and a data packet unpacking process is completed by using step S308 to step S311 at the protocol layer 1005.

For example, as shown in FIG. 14, by using the data transmission method, the SOC can send data to the display module through the high-speed transmission interface.

Therefore, the data transmission method provided in this embodiment of this application is applied to the display scenario, and can meet a high-speed data transmission requirement of a display system, thereby implementing high-definition and ultra-high-definition display.

Figure 38:
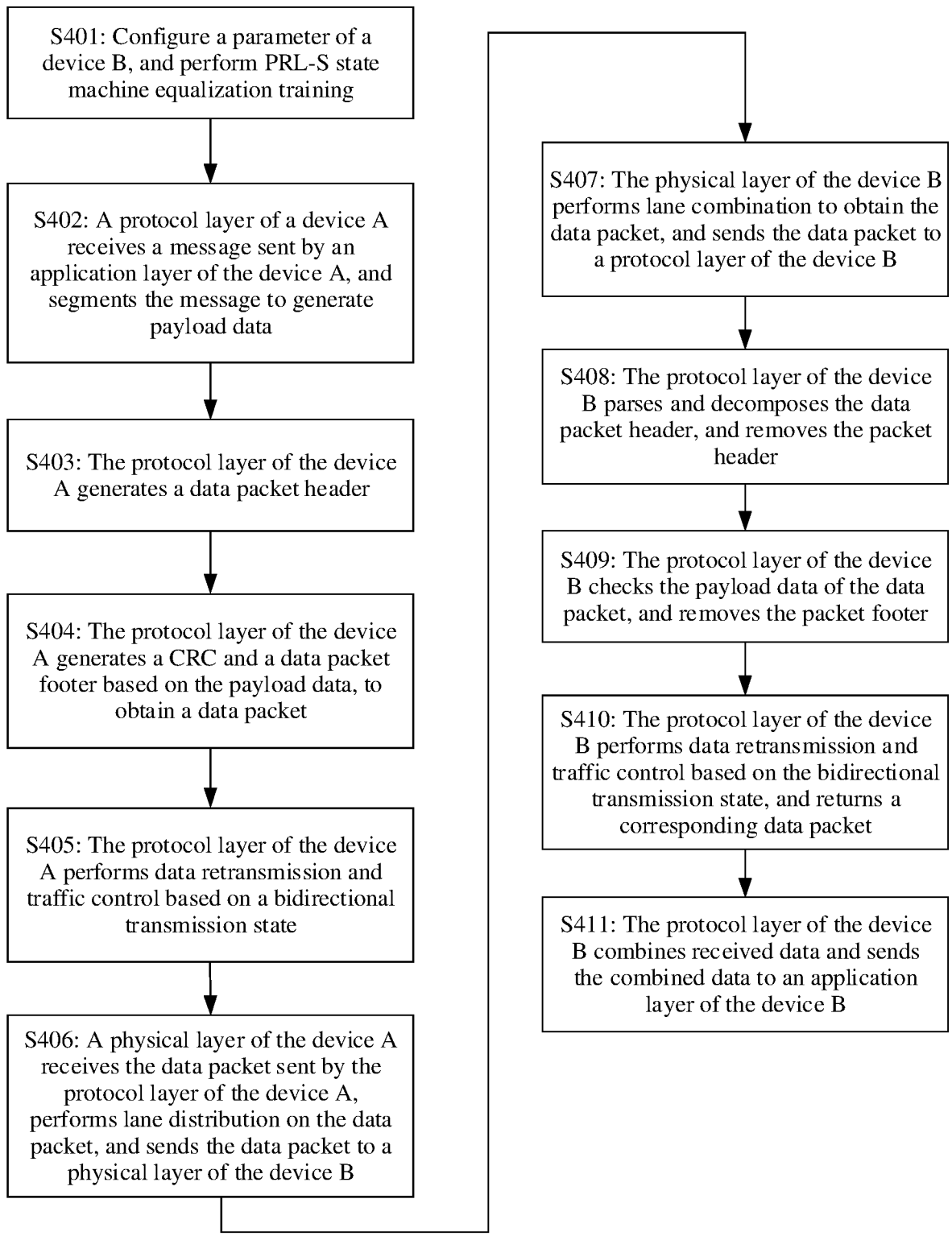
FIG. 38 is a flowchart 5 of a data transmission method according to an embodiment of this application.

In some other scenarios, the data transmission method provided in this embodiment of this application can be applied to the storage scenario. For example, FIG. 38 shows a data transmission method applicable to the storage scenario according to an embodiment of this application. Based on the protocol architecture shown in FIG. 13, as shown in FIG. 38, the method includes S401 to S411.

S401: Configure a parameter of a device B, and perform PRL-S state machine equalization training.

A device A and the device B are, for example, the device A and the device B shown in FIG. 13, or may be described as a storage module and an SOC. Bidirectional data transmission can be implemented between the device A and the device B.

In some embodiments, the device A sends data to the device B, and the device A completes parameter configuration of the device B. For example, the device A generates a parameter configuration control packet based on a parameter configuration requirement, and sends the parameter configuration control packet to the device B through link management. The device B sets a corresponding parameter based on the parameter configuration control packet, completes configuration, and feeds back a configuration result to the device A, thereby completing a configuration process. It should be noted that in the parameter configuration process, an example in which the device A sends data to the device B is used for description. Therefore, the device A configures the parameter of the device B. Therefore, correspondingly, the parameter configuration process is also applicable to a scenario in which the device B sends data to the device A. In this case, the device B needs to configure a parameter of the device A.

Further, a PRL-S state machine further needs to be trained to ensure that a parameter of the PRL-S state machine is stable. This can ensure that data transmission can be stably performed in a subsequent running process. For a specific state machine equalization training process, refer to the conventional technology. Details are not described herein again.

S402: A protocol layer of the device A receives a message sent by an application layer of the device A, and segments the message to generate payload data.

For example, as shown in FIG. 13, the application layer 1001 of the device A obtains application data (which may also be described as a data message), and sends the data message to the protocol layer 1002. The protocol layer 1002 segments the data message by using the message segmentation and reassembly function 1301. Specifically, the data message is decomposed into one or more data packets based on different lengths, and a length of a decomposed data packet cannot exceed a specified maximum value. The maximum value may be obtained experimentally, specified in a protocol, or may be an empirical value.

S403: The protocol layer of the device A generates a data packet header.

For example, as shown in FIG. 13, by using the packet header generation and parsing function 1302 based on the data packet structure shown in FIG. 16 to FIG. 22, the protocol layer 1002 of the device A generates a data packet header, and adds a data packet header sub-packet to a payload data sub-packet. For example, as shown in FIG. 18, the protocol layer adds a data type field, a data count field, an EOM field, a frame number field, and a reserved field to the payload data, and generates the data packet header sub-packet.

S404: The protocol layer of the device A generates a CRC and a data packet footer based on the payload data, to obtain a data packet.

For example, as shown in FIG. 13, the protocol layer 1002 of the device A encodes the payload data by using the CRC generation and check function 1303, to generate a 16-bit CRC field, and form a data packet footer sub-packet. For example, encoding is performed by using X16+X12+X5+X0 as a polynomial to generate the CRC field. For a process of generating the CRC, refer to the conventional technology, and details are not described herein again.

It should be noted that an execution sequence of the functions in step S402 to step S404 is not specifically limited in this embodiment of this application, and a data packet packing process is completed by using step S402 to step S404 at the protocol layer 1002.

S405: The protocol layer of the device A performs data retransmission and flow control based on a bidirectional transmission state.

For example, as shown in FIG. 13, the protocol layer 1002 of the device A performs data retransmission and traffic control by using the data retransmission and traffic control function 1305 based on a bidirectional transmission state.

S406: A physical layer of the device A receives the data packet sent by the protocol layer of the device A, performs lane distribution on the data packet, and sends the data packet to a physical layer of the device B.

For example, as shown in FIG. 13, after receiving, by using the logical physical layer lane distribution and coding function 1105, the data packet sent by the protocol layer 1002, the protocol layer 1003 completes allocation of a transmission lane of the data packet as required, and sends the data packet to the physical layer 1006 of the device B. For a specific lane allocation process, refer to the conventional technology, and details are not described herein again.

S407: The physical layer of the device B performs lane combination to obtain the data packet, and sends the data packet to a protocol layer of the device B.

For example, as shown in FIG. 13, after receiving the data packet by using the logical physical layer lane distribution and coding function 1109, the physical layer 1006 of the device B combines data of a plurality of lanes as required, and then sends the obtained data packet to the protocol layer 1005.

S408: The protocol layer of the device B parses and decomposes the data packet header, and removes the packet header.

For example, as shown in FIG. 13, the protocol layer 1005 of the device B parses and decomposes the data packet header by using the packet header generation and parsing function 1310, and removes the packet header.

S409: The protocol layer of the device B checks the payload data of the data packet, and removes the packet footer.

For example, the protocol layer 1005 of the device B checks the payload data based on the CRC generation and check function 1311 by using the CRC field in the data packet, to determine whether the payload data is correctly transmitted. For example, based on the CRC generation and check function 1311, the CRC field in the data packet is divided by the X16+X12+X5+X0 polynomial modulo 2. If a remainder is 0, it indicates that the received payload data is correct data. If a remainder is not 0, the received payload data is incorrect data. In this case, a preset error processing solution is performed on the incorrect data packet. For example, the incorrect data packet is discarded, the incorrect data packet is skipped, or the incorrect data packet is retransmitted. A specific solution may be preconfigured by research and development personnel in the system.

S410: The protocol layer of the device B performs data retransmission and traffic control based on the bidirectional transmission state, and returns a corresponding data packet.

For example, as shown in FIG. 13, the protocol layer 1005 of the device B performs data retransmission and traffic control by using the data retransmission and traffic control function 1313 based on the bidirectional transmission state, and returns a corresponding data packet.

S411: The protocol layer of the device B combines received data and sends the combined data to an application layer of the device B.

For example, as shown in FIG. 13, the protocol layer 1005 of the device B combines received payload data by using the message segmentation and reassembly function 1309, to combine the received payload data into a big data message that can be received by the physical layer, and transmits the data message to the application layer 1004, to complete a data transmission process.

It should be noted that an execution sequence of the functions in step S408 to step S411 is not specifically limited in this embodiment of this application, and a data packet unpacking process is completed by using step S408 to step S411 at the protocol layer 1005.

For example, as shown in FIG. 14, by using the data transmission method, bidirectional data transmission can be implemented between the storage module and the SOC through the high-speed transmission interface.

Therefore, the data transmission method provided in this embodiment of this application is applied to a high-speed storage scenario, and can support high-speed data transmission of 16 Gbit/s on a single lane. Data storage at a higher speed is implemented in limited space of an electronic device. Further, a corresponding physical layer adaptation circuit may be added and disposed on another serdes-based physical layer circuit, to implement high-speed data storage. In this way, the protocol architecture provided in embodiments of this application can be applied to fields such as high-speed data collection, video image processing, modern communication, satellite remote sensing measurement, and real-time data computing, and meet requirements of the foregoing scenarios for high-speed and large-capacity data transmission and storage.

In some scenarios, the electronic device has a low requirement for a transmission bandwidth. For example, a smartwatch has a low requirement for a transmission bandwidth. Alternatively, internal space of the electronic device is large enough to allow a large quantity of interconnection interface lines between components in the electronic device. Huawei Vision is used as an example. Although a high bandwidth is required for display, due to the large internal space, the single-lane low-speed interface technology may be used. In this case, although there are many cables, costs caused by a high-speed interface can be reduced. In other words, optionally, when the electronic device has a low bandwidth requirement or large internal space, a relatively low-speed PHY layer technology may be applied to a physical layer, to reduce transmission costs. It should be noted that the relatively low-speed physical layer can ensure that a low bandwidth is provided, but the physical layer can still implement functions implemented by the physical layer in the protocol architecture provided in embodiments of this application. In addition, functions of an application layer and a protocol layer that are based on the low-speed physical layer are also the same as functions implemented by the application layer and the protocol layer in the protocol architecture provided in embodiments of this application.

Figure 39:
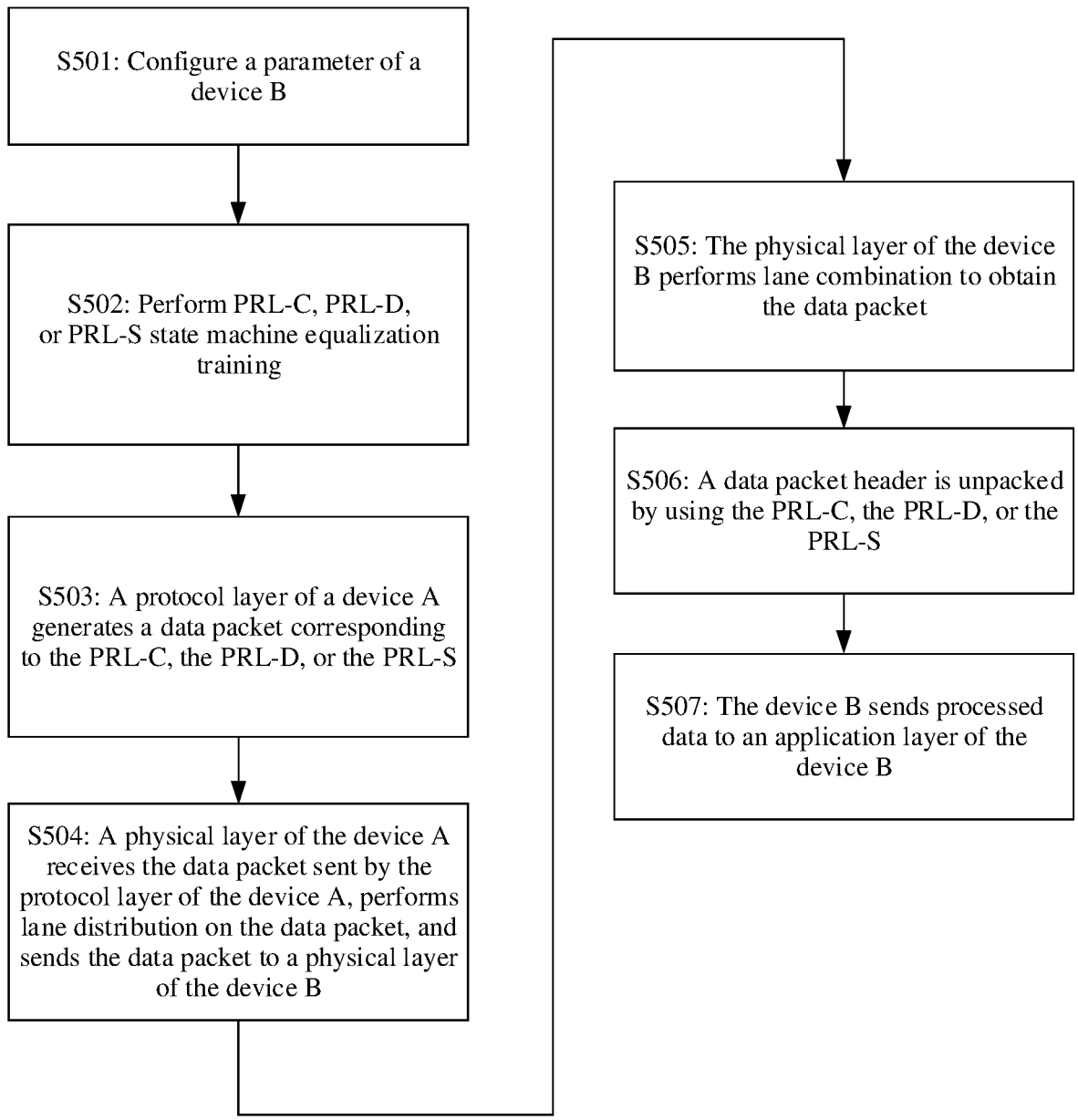
FIG. 39 is a flowchart 6 of a data transmission method according to an embodiment of this application.

For example, FIG. 39 shows a data transmission method according to an embodiment of this application. As shown in FIG. 39, the method includes S501 to S507.

S501: Configure a parameter of a device B.

In some embodiments, a device A configures the parameter of the device B through link management. For a specific configuration method and supplementary description, refer to related content in step S401. Details are not described herein again.

S502: Perform PRL-C, PRL-D, or PRL-S state machine equalization training.

S503: A protocol layer of the device A generates a data packet corresponding to the PRL-C, the PRL-D, or the PRL-S.

S504: A physical layer of the device A receives a data packet sent by the protocol layer of the device A, performs lane distribution on the data packet, and sends the data packet to a physical layer of the device B.

S505: The physical layer of the device B performs lane combination to obtain the data packet.

S506: A data packet header is unpacked by using the PRL-C, the PRL-D, or the PRL-S.

S507: The device B sends processed data to an application layer of the device B.

For specific implementations of step S502 to step S507, refer to related content of step S201 to step S211, step S301 to step S311, or step S401 to step S411 based on different application scenarios. Details are not described herein again.

Figure 40:
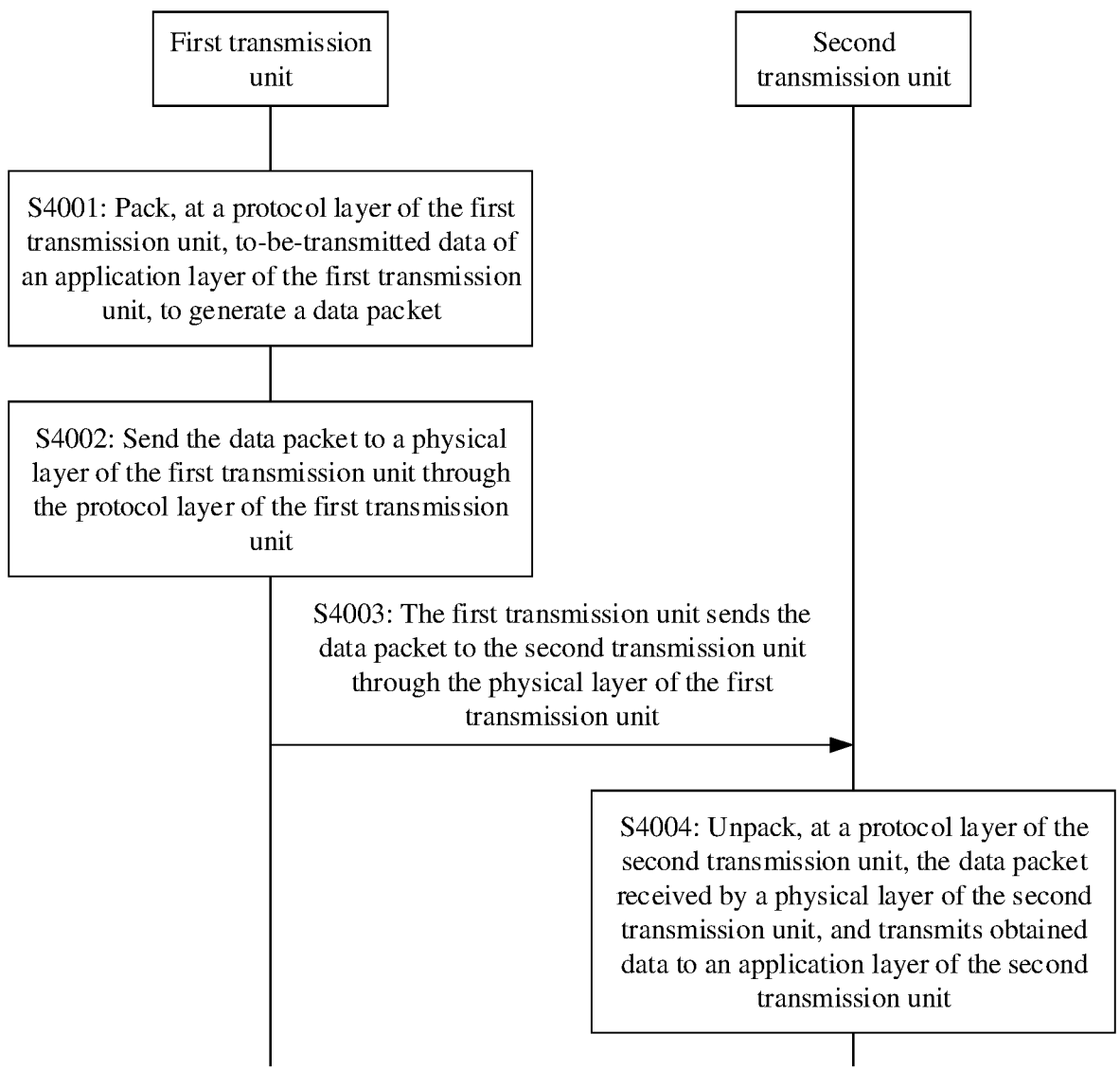
FIG. 40 is a flowchart 7 of a data transmission method according to an embodiment of this application.

For example, FIG. 40 is a schematic diagram of a data transmission method according to an embodiment of this application. As shown in FIG. 40, the method includes S4001 to S4004.

S4001: A first transmission unit packs, at a protocol layer of the first transmission unit, to-be-transmitted data of an application layer of the first transmission unit, to generate a data packet.

For example, in a camera scenario, the first transmission unit is, for example, a camera module, and a second transmission unit is, for example, an SOC. In a display scenario, the first transmission unit is, for example, an SOC, and a second transmission unit is, for example, a DDIC. In a storage scenario, the first transmission unit is, for example, a storage module, and a second transmission unit is, for example, an SOC. Alternatively, the first transmission unit is, for example, an SOC, and a second transmission unit is, for example, a storage module.

In some embodiments, in the packing process, the first transmission unit uses a data type field included in a data packet header sub-packet to indicate an application scenario of a currently transmitted data packet. For example, the application scenario includes, for example, the camera scenario, the display scenario, or the storage scenario.

Optionally, for a data packet structure, refer to related content shown in FIG. 16 to FIG. 22. For the packing process, refer to related content described in step S202 to step S204 shown in FIG. 35. Alternatively, for the packing process, refer to related content described in step S302 to step S304 shown in FIG. 37. Alternatively, for the packing process, refer to related content described in step S402 to step S405 shown in FIG. 38. Alternatively, for the packing process, refer to related content described in step S503 shown in FIG. 39. Details are not described herein again.

S4002: The first transmission unit sends the data packet to a physical layer of the first transmission unit through the protocol layer of the first transmission unit.

Optionally, for a process in which a protocol layer of a transmitter sends, to a physical layer, a data packet generated through packing, refer to related content described in step S205 shown in FIG. 35. Alternatively, for the packing process, refer to related content described in step 305 shown in FIG. 37. Alternatively, for the packing process, refer to related content described in step S406 shown in FIG. 38. Alternatively, for the packing process, refer to related content described in step S504 shown in FIG. 39. Details are not described herein again.

S4003: The first transmission unit sends the data packet to the second transmission unit through the physical layer of the first transmission unit.

Optionally, for a specific implementation method of a data transmission process, refer to related content shown in FIG. 33 and FIG. 34A and FIG. 34B. Alternatively, for a data transmission process, refer to related content described in step 206 and step S207 shown in FIG. 35. Alternatively, for a data transmission process, refer to related content described in step 306 and step S307 shown in FIG. 37. Alternatively, for a data transmission process, refer to related content described in step 406 and step S407 shown in FIG. 38. Alternatively, for a data transmission process, refer to related content described in step 504 and step S505 shown in FIG. 39. For a data retransmission method in the data transmission process, refer to related content shown in FIG. 23 to FIG. 30. Details are not described herein again.

S4004: The second transmission unit unpacks, at a protocol layer of the second transmission unit, the data packet received by a physical layer of the second transmission unit, and transmits obtained data to an application layer of the second transmission unit.

Optionally, for the unpacking process, refer to related content described in step S208 to step S211 shown in FIG. 35. Alternatively, for the unpacking process, refer to related content described in step S308 to step S311 shown in FIG. 37. Alternatively, for the unpacking process, refer to related content described in step S408 to step S411 shown in FIG. 38. Alternatively, for the unpacking process, refer to related content described in step S506 and step S507 shown in FIG. 39. Details are not described herein again.

Therefore, according to the data transmission method provided in this embodiment of this application, transmission units in an electronic device can perform data transmission by using a same data transmission protocol and a same data packet structure. In addition, data type information included in a data packet indicates a current application scenario of the data packet, thereby improving data transmission efficiency.

Figure 41:
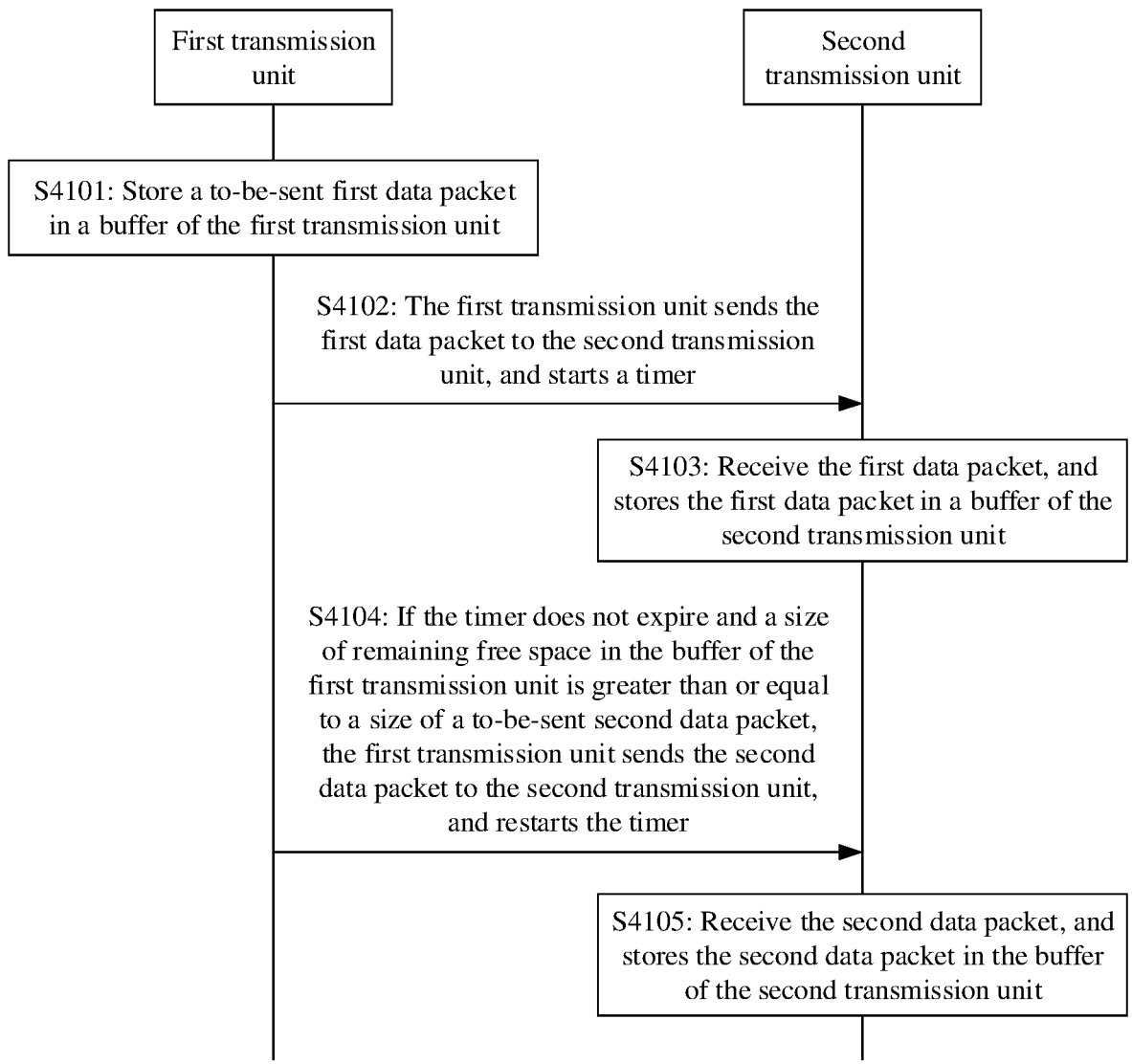
FIG. 41 is a flowchart 8 of a data transmission method according to an embodiment of this application.

For example, FIG. 41 is a schematic diagram of another data transmission method according to an embodiment of this application. As shown in FIG. 40, the method includes S4101 to S4105.

S4101: A first transmission unit stores a to-be-sent first data packet in a buffer of the first transmission unit.

Optionally, for step S401, refer to related content described in step 1-1 shown in FIG. 27A and FIG. 28, or refer to related content described in step 2-1 shown in FIG. 29A and FIG. 30. Details are not described herein again.

S4102: The first transmission unit sends the first data packet to a second transmission unit, and starts a timer.

Optionally, for step S402, refer to related content described in step 1-2 shown in FIG. 27A and FIG. 28, or refer to related content described in step 2-2 shown in FIG. 29A and FIG. 30. Details are not described herein again.

S4103: The second transmission unit receives the first data packet, and stores the first data packet in a buffer of the second transmission unit.

Optionally, for step S402, refer to related content described in step 1-3 shown in FIG. 27A and FIG. 28, or refer to related content described in step 2-3 shown in FIG. 29A and FIG. 30. Details are not described herein again.

It should be noted that the buffer is configured in each of the first transmission unit and the second transmission unit, and when a data packet needs to be buffered, the data packet is buffered in the respective buffers.

S4104: If the timer does not expire and a size of remaining free space in the buffer of the first transmission unit is greater than or equal to a size of a to-be-sent second data packet, the first transmission unit sends the second data packet to the second transmission unit, and restarts the timer.

S4105: The second transmission unit receives the second data packet, and stores the second data packet in the buffer of the second transmission unit.

In some embodiments, in step S4104 and step S4105, if the size of the remaining space in the buffer of the first transmission unit can be used to buffer a next to-be-sent data packet, the data packet continues to be sent. In addition, a timer is configured at a data link layer of the first transmission unit. Each time a data packet is sent, the timer is refreshed to restart timing, until all data packets are sent.

Optionally, the first transmission unit is further configured to perform the steps performed by the transmitter in FIG. 27A to FIG. 30, and the second transmission unit is further configured to perform the steps performed by the receiver in FIG. 27A to FIG. 30. Details are not described herein again.

In this way, the first transmission unit uses a buffer mechanism to send a subsequent data packet without waiting for the second transmission unit to feed back a response signal, thereby improving data transmission efficiency.

It should be noted that a sequence of performing step S4103 and step S4104 is not specifically limited in this embodiment of this application. For example, step S4104 is performed first, and then step S4103 is performed. To be specific, when the second transmission unit does not receive the first data packet, the first transmission unit may send a next data packet.

The foregoing describes in detail the data transmission methods provided in embodiments of this application. The following describes in detail a data transmission apparatus provided in an embodiment of this application with reference to FIG. 42.

Figure 42:
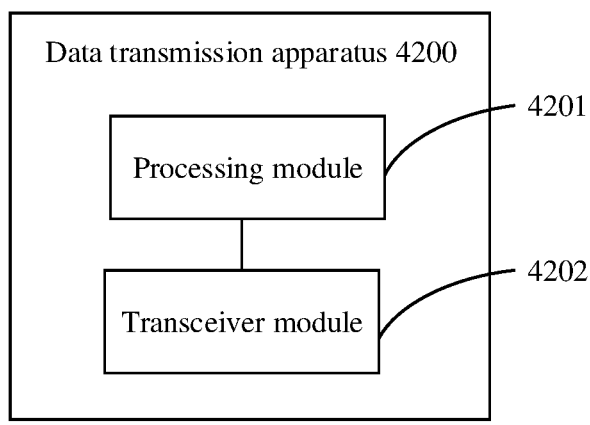
FIG. 42 is a schematic diagram of a structure of a data transmission apparatus according to an embodiment of this application.

In a possible design, FIG. 42 is a schematic diagram of a structure of the data transmission apparatus according to this embodiment of this application. The data transmission apparatus may be configured to implement the methods recorded in the foregoing method embodiments. For example, as shown in FIG. 14, a data transmission apparatus 4200 includes a processing module 4201 and a transceiver module 4202.

Optionally, the processing module 4201 is configured to: support the data transmission apparatus 4200 in performing step S4001 and step S4002 in FIG. 40, and/or support the data transmission apparatus 4200 in performing step S4101 in FIG. 41 and/or another process for the techniques described herein.

Optionally, the transceiver module 4202 is configured to: support the data transmission apparatus 4200 in performing step S4003 in FIG. 40, and/or support the data transmission apparatus 4200 in performing step S4102 and step S4104 in FIG. 41 and/or another process for the techniques described herein.

All related content of the steps in the method embodiments may be cited in function descriptions of corresponding function modules. Details are not described herein again.

Optionally, the data transmission apparatus 4200 shown in FIG. 42 may further include a storage unit (not shown in FIG. 42), and the storage unit stores a program or instructions. When the processing module 4201 and the transceiver module 4202 execute the program or the instructions, the data transmission apparatus 4200 shown in FIG. 42 is enabled to perform the data transmission methods in the method embodiments.

Optionally, the transceiver module may include a receiving module and a sending module. The receiving module is configured to receive a feedback signal sent by a second transmission unit. The sending module is configured to send data to the second transmission unit. A specific implementation of the transceiver module is not specifically limited in this embodiment of this application.

For technical effect of the data transmission apparatus 4200 shown in FIG. 42, refer to the technical effect of the data transmission methods in the method embodiments. Details are not described herein again.

An embodiment of this application further provides a chip system, including a processor. The processor is coupled to a memory, the memory is configured to store a program or instructions, and when the program or the instructions is/are executed by the processor, the chip system is enabled to implement the method in any one of the foregoing method embodiments.

Optionally, there may be one or more processors in the chip system. The processor may be implemented by hardware or software. When being implemented by hardware, the processor may be a logic circuit, an integrated circuit, or the like. When being implemented by software, the processor may be a general-purpose processor, and is implemented by reading software code stored in the memory.

Optionally, there may also be one or more memories in the chip system. The memory may be integrated with the processor, or may be disposed separately from the processor. This is not limited in embodiments of this application. For example, the memory may be a non-transitory processor, for example, a read-only memory ROM. The memory and the processor may be integrated on a same chip, or may be separately disposed on different chips. A type of the memory and a manner of setting the memory and the processor are not specifically limited in embodiments of this application.

For example, the chip system may be a field programmable gate array (FPGA), an application-specific integrated circuit (ASIC), a system on chip (SoC), a central processing unit (CPU), a network processor (NP), a digital signal processor (DSP), a micro controller unit (MCU), or a programmable logic device (PLD) or another integrated chip.

It should be understood that, steps in the foregoing method embodiments may be implemented by using a hardware integrated logical circuit in the processor, or by using instructions in a form of software. The steps of the methods disclosed with reference to embodiments of this application may be directly performed by a hardware processor, or may be performed by a combination of hardware and software modules in the processor.

An embodiment of this application further provides a storage medium, configured to store instructions used by the foregoing communication apparatus.

An embodiment of this application further provides a computer-readable storage medium. The computer-readable storage medium stores computer instructions. When the computer instructions are run on a server, the server is enabled to perform the foregoing related method steps to implement the data transmission method in the foregoing embodiments.

An embodiment of this application further provides a computer program product. When the computer program product runs on a computer, the computer is enabled to perform the foregoing related steps to implement the data transmission method in the foregoing embodiments.

In addition, an embodiment of this application further provides an apparatus. The apparatus may be specifically a component or a module, and the apparatus may include one or more processors and a memory that are connected to each other. The memory is configured to store a computer program, and one or more computer programs include instructions. When the instructions are executed by the one or more processors, the apparatus is enabled to perform the data transmission method in the foregoing method embodiments.

The apparatus, the computer-readable storage medium, the computer program product, or the chip provided in embodiments of this application is configured to perform the corresponding method provided above. Therefore, for beneficial effects that can be achieved, refer to the beneficial effects in the corresponding method provided above. Details are not described herein again.

Methods or algorithm steps described in combination with the content disclosed in this application may be implemented by hardware, or may be implemented by a processor by executing software instructions. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, the storage medium is coupled to the processor, so that the processor can read information from the storage medium and write information to the storage medium. Certainly, the storage medium may alternatively be a component of the processor. The processor and the storage medium may be located in an application-specific integrated circuit (ASIC).

Based on the descriptions of the implementations, a person skilled in the art may clearly understand that for the purpose of convenient and brief descriptions, division into the foregoing functional modules is merely used as an example for descriptions. During actual application, the functions may be allocated to different functional modules for implementation based on a requirement. In other words, an inner structure of an apparatus is divided into different functional modules to implement all or some of the functions described above. For a detailed working process of the foregoing system, apparatus, and units, refer to a corresponding process in the foregoing method embodiments, and details are not described herein again.

In the several embodiments provided in this application, it should be understood that the disclosed methods may be implemented in another manner. For example, the foregoing apparatus embodiments are merely examples. For example, the module or unit division is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in an electrical form, a mechanical form, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of embodiments of this application. Any variation or replacement within the technical scope disclosed in embodiments of this application shall fall within the protection scope of embodiments of this application. Therefore, the protection scope of this application shall be subject to the protection scope of the claims.

What is claimed is:

1. A data transmission method, wherein the method comprises:
    generating a data packet by packing, by a first transmitter, at a protocol layer of the first transmitter, to-be-transmitted data of an application layer of the first transmitter, wherein the data packet comprises data type information, the data type information indicating an application scenario of the data packet, and the application scenario comprising a camera scenario, a display scenario, or a storage scenario;
    sending, by the first transmitter, the data packet to a physical layer of the first transmitter through the protocol layer of the first transmitter; and
    sending, by the first transmitter, the data packet to a second transmitter through the physical layer of the first transmitter.

2. The method according to claim 1, wherein:
    a data packet type of the data packet comprises a long packet and a short packet;
    the long packet comprises a data packet header sub-packet, a payload data sub-packet, and a data packet footer sub-packet; and
    the short packet comprises the data packet header sub-packet and the data packet footer sub-packet.

3. The method according to claim 2, wherein the data type information is carried in a data type field in the data packet header sub-packet, and a first value of the data type field indicates that the application scenario is the display scenario and that the data packet is a short data packet or a long data packet.

4. The method according to claim 2, wherein the data type information is carried in a data type field in the data packet header sub-packet, and a second value of the data type field indicates that the application scenario is the camera scenario and that the data packet is a short control packet or a long data packet.

5. The method according to claim 2, wherein the data type information is carried in a data type field in the data packet header sub-packet, and a third value of the data type field indicates that the application scenario is the storage scenario and that the data packet is a short acknowledgment (ACK) packet, a short negative acknowledgment (NACK) packet, a long data packet, or a long control packet.

6. The method according to claim 1, wherein the generating the data packet by packing, by the first transmitter, at the protocol layer of the first transmitter, the to-be-transmitted data of the application layer of the first transmitter comprises:
- receiving, by the first transmitter, at the protocol layer of the first transmitter, the to-be-transmitted data from the application layer of the first transmitter; and
- segmenting, by the first transmitter, the to-be-transmitted data at the protocol layer of the first transmitter, to generate payload data, a data packet header, a cyclic redundancy check (CRC) code, and a data packet footer; and
- generating the data packet after packing the payload data, the data packet header, and the data packet footer, wherein the data packet footer comprises a CRC field indicating the CRC code.

7. A data transmission method, wherein the method comprises:
- storing, by a first transmitter, a to-be-sent first data packet in a buffer of the first transmitter;
- sending, by the first transmitter, the first data packet to a second transmitter, and starting a timer in response to sending the first data packet to the second transmitter; and
- in response to the timer not expiring and a size of remaining free space in the buffer of the first transmitter being greater than or equal to a size of a to-be-sent second data packet, sending, by the first transmitter, the second data packet to the second transmitter, and restarting the timer in response to sending the second data packet to the second transmitter.

8. The method according to claim 7, wherein after the sending, by the first transmitter, the first data packet to the second transmitter, and starting the timer in response to sending the first data packet to the second transmitter, the method further comprises:
- receiving, by the first transmitter, a first acknowledgment (ACK) signal from the second transmitter;
- removing the first data packet from the buffer of the first transmitter; and
- restarting the timer in response to receiving the first ACK signal from the second transmitter, wherein the first ACK signal is a feedback signal corresponding to the first data packet.

9. The method according to claim 7, wherein the method further comprises:
- in response to the size of the remaining free space in the buffer of the first transmitter being less than the size of the to-be-sent second data packet, stopping, by the first transmitter, sending a data packet;
- in response to the timer expiring and the first transmitter still not receiving a second ACK signal, obtaining a fourth data packet with a smallest frame number in one or more third data packets buffered in the buffer of the first transmitter; and
- retransmitting, by the first transmitter, the fourth data packet to the second transmitter, and restarting the timer in response to transmitting the fourth data packet to the second transmitter.

10. The method according to claim 9, wherein after the retransmitting, by the first transmitter, the fourth data packet to the second transmitter, the method further comprises:
- retransmitting, by the first transmitter, the one or more third data packets to the second transmitter in ascending order of frame numbers, and restarting the timer each time a third data packet of the one or more third data packets is sent.

11. The method according to claim 7, wherein the method further comprises:
- receiving, by the first transmitter, a first negative acknowledgment (NACK) signal from the second transmitter, and stopping sending a data packet in response to receiving the first NACK signal from the second transmitter;
- determining, by the first transmitter, a fifth data packet corresponding to the first NACK signal; and
- retransmitting, by the first transmitter, the fifth data packet to the second transmitter, and restarting the timer in response to retransmitting the fifth data packet to the second transmitter.

12. The method according to claim 11, wherein after the retransmitting, by the first transmitter, the fifth data packet to the second transmitter, the method further comprises:
- retransmitting, by the first transmitter, one or more sixth data packets buffered in the buffer of the first transmitter to the second transmitter in ascending order of frame numbers of the one or more sixth data packets, and restarting the timer each time a sixth data packet of the one or more sixth data packets is sent, wherein a frame number of the fifth data packet is less than the frame numbers of the one or more sixth data packets.

13. An electronic device, comprising a processor and a memory, wherein the memory is coupled to the processor, the memory is configured to store computer instructions, and when the processor executes the instructions, the electronic device is configured to perform:
- generating a data packet by packing, at a protocol layer of a first transmitter of the electronic device, to-be-transmitted data of an application layer of the first transmitter, wherein the data packet comprises data type information, the data type information indicating an application scenario of the data packet, and the application scenario comprising a camera scenario, a display scenario, or a storage scenario;
- sending the data packet to a physical layer of the first transmitter through the protocol layer of the first transmitter; and
- sending the data packet to a second transmitter through the physical layer of the first transmitter.

14. The electronic device according to claim 13, wherein:
- a data packet type of the data packet comprises a long packet and a short packet;
- the long packet comprises a data packet header sub-packet, a payload data sub-packet, and a data packet footer sub-packet; and
- the short packet comprises the data packet header sub-packet and the data packet footer sub-packet.

15. The electronic device according to claim 14, wherein the data type information is carried in a data type field in the data packet header sub-packet, and a first value of the data type field indicates that the application scenario is the display scenario and that the data packet is a short data packet or a long data packet.

16. The electronic device according to claim 14, wherein the data type information is carried in a data type field in the data packet header sub-packet, and a second value of the data type field indicates that the application scenario is the camera scenario and that the data packet is a short control packet or a long data packet.

17. The electronic device according to claim 14, wherein the data type information is carried in a data type field in the data packet header sub-packet, and a third value of the data type field indicates that the application scenario is the storage scenario and that the data packet is a short acknowledgment ACK packet, a short negative acknowledgment NACK packet, a long data packet, or a long control packet.

18. The electronic device according to claim 13, when the processor execute the instructions, the electronic device is further configured to perform:
   receiving, at the protocol layer of the first transmitter, the to-be-transmitted data sent by the application layer of the first transmitter; and
   segmenting, the to-be-transmitted data at the protocol layer of the first transmitter, to generate payload data, a data packet header, a cyclic redundancy check (CRC) code, and a data packet footer; and
   generating the data packet after packing the payload data, the data packet header, and the data packet footer, wherein the data packet footer comprises a CRC field indicating the CRC code.

* * * * *